(12) United States Patent
Chen et al.

(10) Patent No.: US 12,475,210 B2
(45) Date of Patent: Nov. 18, 2025

(54) FUNCTION MIGRATION METHOD AND APPARATUS

(71) Applicant: Huawei Technologies Co., Ltd., Shenzhen (CN)

(72) Inventors: Donglang Chen, Shanghai (CN); Siyuan Bao, Shanghai (CN); Gaochao Cheng, Shanghai (CN); Huiping Deng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 18/474,795

(22) Filed: Sep. 26, 2023

(65) Prior Publication Data

US 2024/0028695 A1 Jan. 25, 2024

Related U.S. Application Data

(63) Continuation of application No. PCT/CN2022/083204, filed on Mar. 25, 2022.

(30) Foreign Application Priority Data

Mar. 31, 2021 (CN) .......................... 202110351292.3

(51) Int. Cl.
G06F 21/44 (2013.01)
G06F 21/62 (2013.01)
(52) U.S. Cl.
CPC ............ G06F 21/44 (2013.01); G06F 21/629 (2013.01)
(58) Field of Classification Search
CPC .. G06F 21/44; G06F 21/629; G06F 2209/545; G06F 3/04847; G06F 21/445; H04L 67/1095; H04L 67/51; H04L 63/0869; H04L 63/08; H04L 63/104; H04L 65/1094; H04L 67/10; H04L 12/18; H04W 92/18; H04W 4/00; H04W 12/06;
(Continued)

(56) References Cited

U.S. PATENT DOCUMENTS 10,616,337 B1 * 4/2020 Satyanarayana .... H04L 67/1097
10,650,015 B2 * 5/2020 Subramanian ........ G06F 16/254
(Continued)

FOREIGN PATENT DOCUMENTS

CN 107466089 A 12/2017
CN 109756618 A 5/2019
(Continued)

Primary Examiner — El Hadji M Sall
(74) Attorney, Agent, or Firm — Conley Rose, P.C.

(57) ABSTRACT

A method for function migration includes a first device that sends a first request carrying an identifier of the first device to a second device. The second device receives the first request from the first device. The second device sends a first response to the first device, where the first response indicates a first group created by the second device, and a member in the first group includes the second device. The first device receives the first response from the second device. The first device sends a second request to the second device, where the second request is for applying for adding the first device to the first group. The first device migrates a first function in a first application to the second device, where the first application is any application in the first device, and the first function includes one or more graphical user interfaces.

20 Claims, 71 Drawing Sheets

(58) Field of Classification Search
CPC .......... H04M 1/72469; H04M 1/2755; H04M 2250/52; H04M 1/72412; H04N 21/4126; H04N 21/4223; H04N 21/43076; H04N 21/43637; H04N 21/4367; H04N 21/44227

See application file for complete search history.

(56) References Cited

U.S. PATENT DOCUMENTS

| | | | | |
|---|---|---|---|---|
| 2003/0065947 | A1* | 4/2003 | Song | H04L 63/08 |
| | | | | 713/150 |
| 2009/0293004 | A1* | 11/2009 | Emam | G06F 3/0481 |
| | | | | 715/762 |
| 2014/0136729 | A1* | 5/2014 | Chan | H04L 65/613 |
| | | | | 709/231 |
| 2023/0094272 | A1 | 3/2023 | Zhang et al. | |

FOREIGN PATENT DOCUMENTS

| | | |
|---|---|---|
| CN | 111028052 A | 4/2020 |
| EP | 3115261 A1 | 1/2017 |
| WO | 2017004570 A1 | 1/2017 |

* cited by examiner

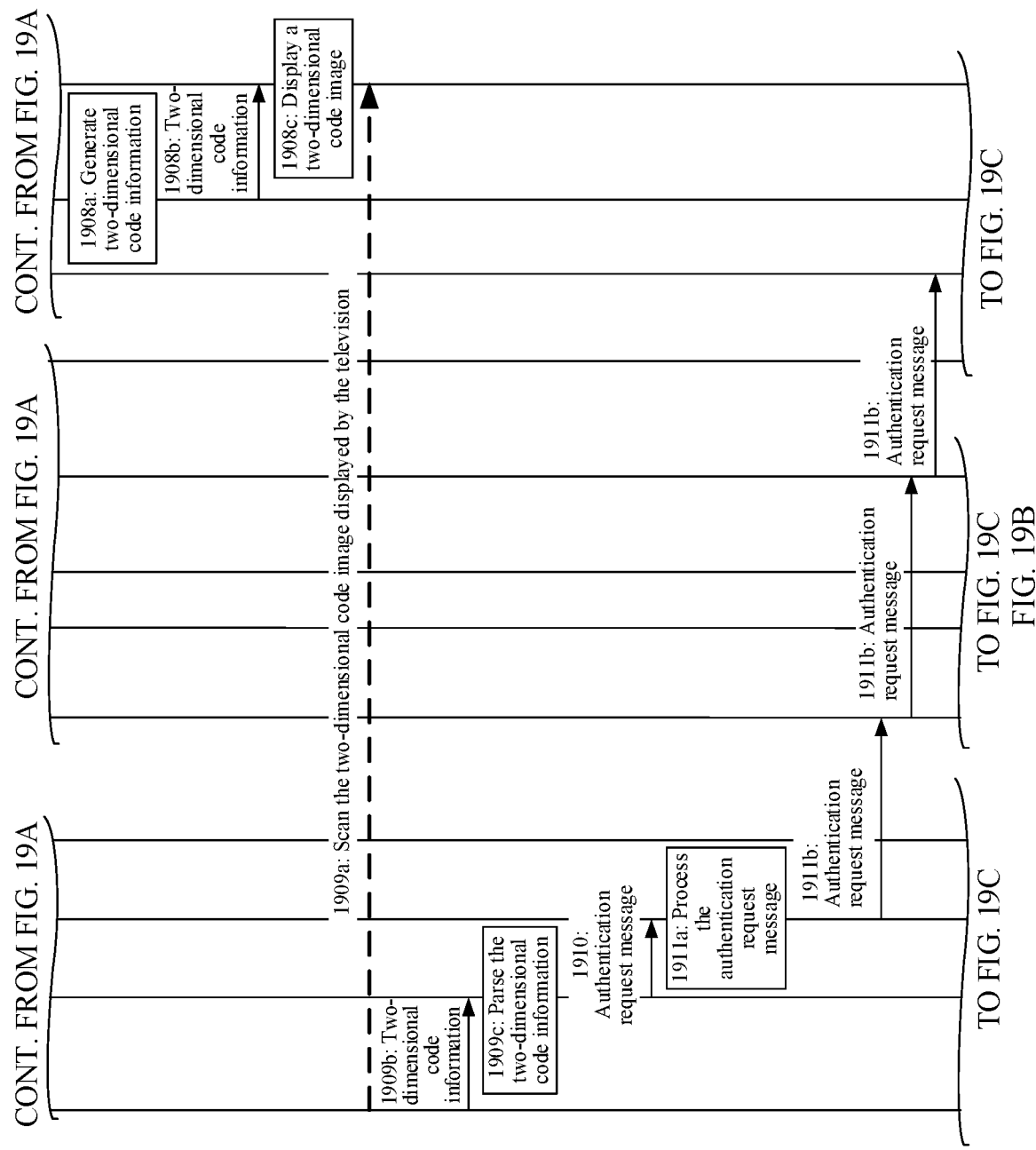

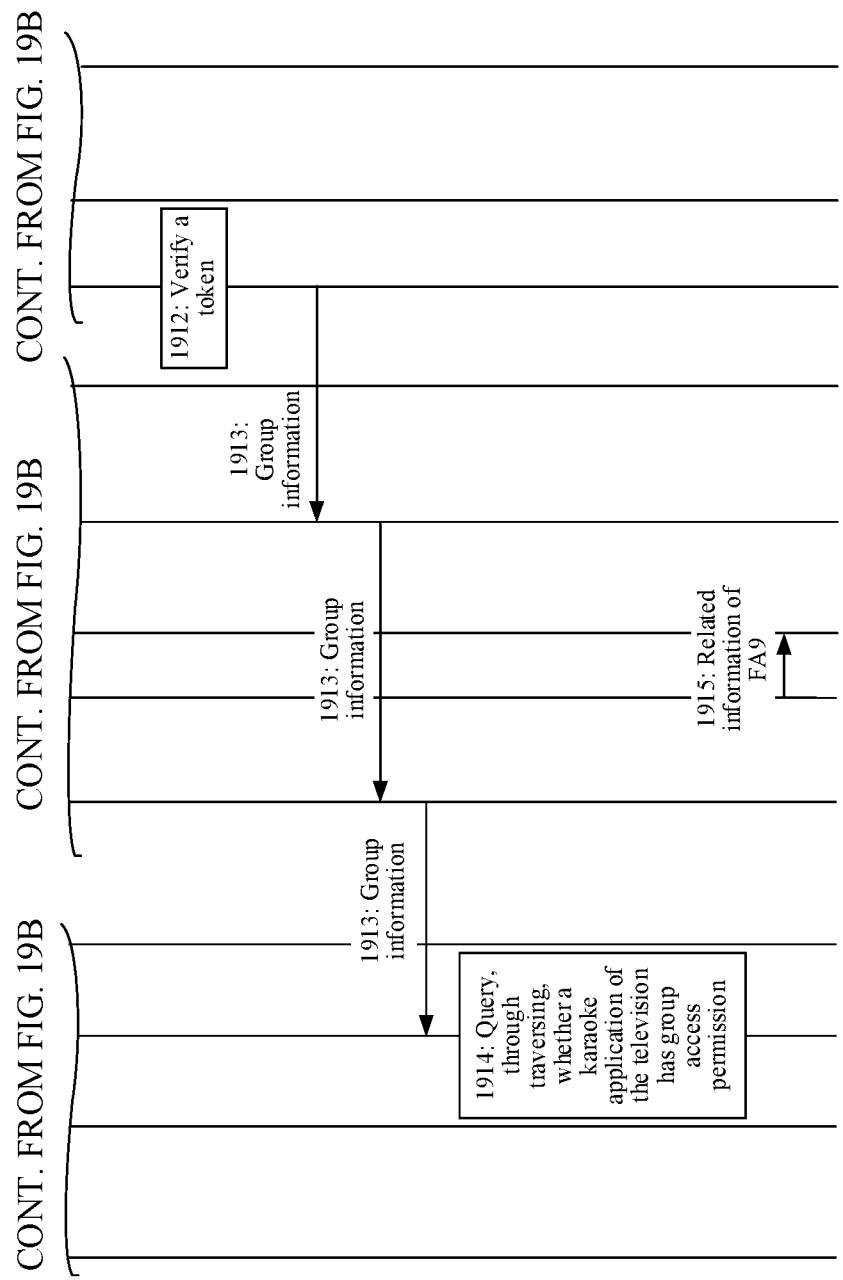

FUNCTION MIGRATION METHOD AND APPARATUS

CROSS-REFERENCE TO RELATED APPLICATIONS

This is a continuation of International Patent Application No. PCT/CN2022/083204 filed on Mar. 25, 2022, which claims priority to Chinese Patent Application No. 202110351292.3 filed on Mar. 31, 2021. The disclosures of the aforementioned applications are hereby incorporated by reference in their entireties.

TECHNICAL FIELD

This disclosure relates to the field of terminals, and in particular, to a function migration method and an apparatus.

BACKGROUND

With popularization and development of digital devices such as smartphones, tablet computers, and personal computers (PCs), a quantity of personal terminals increases sharply, and requirements for sharing service data between different devices are imposed. Therefore, how to share the service data and ensure security and reliability of the data becomes a problem to be urgently resolved.

SUMMARY

Embodiments of this disclosure provide a function migration method and an apparatus, to ensure security and reliability of data sharing.

According to a first aspect, an embodiment of this disclosure provides a function migration method, applied to a first device, where the method includes sending a first request to a second device, where the first request carries an identifier of the first device, an identifier of a first application, and an identifier of a second application, receiving a first response from the second device, where the first response indicates a first group created by the second device, and a member in the first group includes the second application of the second device, sending a second request to the second device, where the second request is for applying for adding the first application of the first device to the first group, and migrating a first function in the first application to the second application of the second device, where the first function includes one or more graphical user interfaces (UIs).

According to the method provided in this embodiment of this disclosure, the first application of the first device and the second application of the second device may join the first group, through negotiation between the first device and the second device, in other words, members in the first group may include the first application of the first device and the second application of the second device. Because the first group is created through the negotiation between the first device and the second device, migrating function data between the members in the first group, for example, migrating the one or more UIs of the first function, can ensure security and reliability of data sharing.

In a possible implementation, the first response includes a personal identification number (PIN) corresponding to the first group and/or communication connection information of the second device, and sending a second request to the second device includes sending the second request to the second device based on the PIN and/or the communication connection information of the second device. In this way, when the first device needs to join the group created by the second device, the PIN corresponding to the group may be carried in the request, so that the second device may check security of the first device based on the PIN, to ensure the security and the reliability of the data sharing.

In a possible implementation, the method further includes receiving a second response, where the second response indicates that the first application of the first device has joined the first group. In this way, the first device may learn that the first application has joined the first group, so that the function migration can be directly performed subsequently.

In a possible implementation, the method further includes creating a second group, where members in the second group include the first application of the first device and the second application of the second device. In other words, the first device may locally create a group (namely, the second group), and the group is the same as the group created by the second device. In this way, when the second application of the second device migrates a function to the first application of the first device, if the first device determines that the second group is locally stored, the first device may consider that the second application of the second device is secure and trusted, and the function migration can be directly performed.

In a possible implementation, the method further includes displaying a first pop-up box in response to a first operation performed by a user on the first application of the first device, where the first pop-up box includes an identifier of a device that is in a same network as the first device, and sending a first request to a second device includes sending the first request to the second device in response to a second operation of selecting the second device by the user in the first pop-up box. In this way, the user may select, through the first pop-up box, the device to which the function needs to be migrated.

In a possible implementation, the device that is in the same network as the first device includes a trusted device and an untrusted device, where the trusted device includes a device that logs in to a same account as the first device, a device that has performed device-level authentication with the first device, or a device that has performed application-level authentication with the first application of the first device, and the untrusted device includes a device that does not log in to the same account as the first device, a device that has not performed device-level authentication with the first device, or a device that has not performed application-level authentication with the first application of the first device. In this way, the trusted device and the untrusted device may be notified to the user, to help the user manage a corresponding device.

In a possible implementation, the method further includes scanning a two-dimensional code image displayed by the second device, where the two-dimensional code image includes the PIN corresponding to the first group and/or the communication connection information of the second device, and sending a second request to the second device includes sending the second request to the second device based on the PIN and/or the communication connection information of the second device. An example in which an identifier is the two-dimensional code image is used herein for description. The two-dimensional code image may be replaced with another type of identifier, for example, a bar code or a character string. This is not limited in this disclosure.

In a possible implementation, migrating a first function in the first application to the second device includes sending service information of the first function to the second device, where when the first application is a live streaming application, the service information of the first function includes at least one of a video stream, an audio stream, and bullet screen information of a live streaming studio of the first device, when the first application is a photographing application, the service information of the first function includes a photographing preview image or menu bar information of a photographing interface, when the first application is a karaoke application, the service information of the first function includes at least one of a song title, lyrics, audio information of a song, video information of the song, and a control interface of the song, when the first application is a shopping application, the service information of the first function includes commodity information in a shopping cart, or when the first application is a mailbox application, the service information of the first function includes at least one of a subject, text, and an attachment of an e-mail.

In this way, in different scenarios, a part of functions of different applications (for example, the live streaming application, the photographing application, the karaoke application, the mailbox application, or the shopping application) on the first device may be migrated to the second device, so that a requirement for cross-device function migration can be met.

In a possible implementation, the communication connection information of the second device includes a WI-FI address or a BLUETOOTH address of the second device.

In a possible implementation, the method further includes sending a third request to a third device, where the third request carries the identifier of the first device, a package name of the first application, and a package name of a third application, and requests to migrate the first function of the first application to the third application of the third device, receiving a third response, where the third response includes information indicating that the migration is agreed to and a group name of a third group created by the third device, and members in the third group include the first application of the first device and the third application of the third device, sending a fourth request to the third device, where the fourth request is for applying for joining the third group, and includes the group name of the third group, and migrating the first function in the first application to the third device.

In a possible implementation, the method further includes updating the member in the locally stored first group, where members in an updated first group include the first application of the first device, the second application of the second device, and the third application of the third device.

In a possible implementation, a package name of the second application is the same as the package name of the first application.

In a possible implementation, the trusted device includes the third device, and a group related to the third device is deleted in response to an operation of deleting the third device from the trusted device by the user.

In a possible implementation, the first group is set to be permanently valid or valid within a preset period of time.

In a possible implementation, when the first application is the karaoke application, the method further includes re-orchestrating a song pick-up control UI, and sending song pick-up or song cut-off information to the second device in response to a song pick-up or song cut-off operation performed by the user in the song pick-up control UI.

In a possible implementation, when the first application is the shopping application, the service information of the first function includes the commodity information in the shopping cart, and the commodity information includes at least one of a commodity name, a commodity link, and commodity price information.

In a possible implementation, when the first application is the mailbox application, the service information of the first function includes the at least one of a subject, text, and an attachment of an e-mail.

According to a second aspect, an embodiment of this disclosure provides a function migration method, applied to a second device, where the method includes receiving a first request from a first device, where the first request carries an identifier of the first device, an identifier of a first application, and an identifier of a second application, creating a first group, where a member in the first group includes the second application of the second device, sending a first response to the first device, where the first response indicates the first group, receiving a second request from the first device, where the second request is for applying for adding the first application of the first device to the first group, and receiving a first function that is in the first application and that is migrated by the first device, where the first function includes one or more graphical UIs.

According to the method provided in this embodiment of this disclosure, the first application of the first device and the second application of the second device may join the first group, through negotiation between the first device and the second device, in other words, members in the first group may include the first application of the first device and the second application of the second device. Because the first group is created through the negotiation between the first device and the second device, migrating function data between the members in the first group, for example, migrating the one or more UIs of the first function, can ensure security and reliability of data sharing.

In a possible implementation, the first response includes a PIN corresponding to the first group and/or communication connection information of the second device. In this way, the second device may check security of the first device based on the PIN, to ensure the security and the reliability of the data sharing.

In a possible implementation, the method further includes sending a second response to the first device, where the second response indicates that the first application of the first device has joined the first group. In this way, the first device may learn that the first application has joined the first group, so that the function migration can be directly performed subsequently.

In a possible implementation, after receiving a first request from a first device, the method further includes displaying a first pop-up box, where the first pop-up box notifies a user whether to agree to add the first application of the first device to the first group, and receiving an agreement instruction from the user. In this way, the user may be notified through the first pop-up box to add the first application of the first device to the first group.

In a possible implementation, before creating a first group, the method further includes determining, based on the identifier of the first device, that the second device currently has no second group, where members in the second group include the first device and the second device. To be specific, when it is determined that no group is created between the first device and the second device, in other words, when no trusted connection was previously established between the first device and the second device, the first group may be created.

In a possible implementation, before creating a first group, the method further includes determining, based on the identifier of the first device, the identifier of the first application, and the identifier of the second application, that the second device currently has no third group, where members in the third group include the first application of the first device and the second application of the second device. To be specific, when it is determined that no group is created between the first application of the first device and the second application of the second device, in other words, when no trusted connection was previously established between the first application of the first device and the second application of the second device, the first group may be created.

In a possible implementation, the method further includes displaying a two-dimensional code image, where the two-dimensional code image includes the PIN corresponding to the first group and/or the communication connection information of the second device. An example in which an identifier is the two-dimensional code image is used herein for description. The two-dimensional code image may be replaced with another type of identifier, for example, a bar code or a character string. This is not limited in this disclosure.

In a possible implementation, receiving a first function that is in the first application and that is migrated by the first device includes receiving service information of the first function from the first device, where when the first application is a live streaming application, the service information of the first function includes at least one of a video stream, an audio stream, and bullet screen information of a live streaming studio of the first device, when the first application is a photographing application, the service information of the first function includes a photographing preview image or menu bar information of a photographing interface, when the first application is a karaoke application, the service information of the first function includes at least one of a song title, lyrics, audio information of a song, video information of the song, and a control interface of the song, when the first application is a shopping application, the service information of the first function includes commodity information in a shopping cart, or when the first application is a mailbox application, the service information of the first function includes at least one of a subject, text, and an attachment of an e-mail.

In this way, in different scenarios, a part of functions of different applications (for example, the live streaming application, the photographing application, the karaoke application, the mailbox application, or the shopping application) on the first device may be migrated to the second device, so that a requirement for cross-device function migration can be met.

In a possible implementation, the communication connection information of the second device includes a WI-FI address or a BLUETOOTH address of the second device.

In a possible implementation, a package name of the second application is the same as a package name of the first application.

In a possible implementation, the first group is set to be permanently valid or valid within a preset period of time.

In a possible implementation, after receiving a first request from a first device, the method further includes displaying a second pop-up box, where the second pop-up box notifies the user whether to agree to migrate the first function to the second device by the first device.

In a possible implementation, if the live streaming application is installed on the second device, the second device detects whether the live streaming application is logged in to, and if the live streaming application is in a logged-in state, the live streaming application presents the first function on a live streaming image of the second device.

In a possible implementation, if the live streaming application is not installed on the second device, the second device presents the first function by using an audio player.

In a possible implementation, when the first application is the photographing application, the service information of the first function includes the photographing preview image and the menu bar information of the photographing interface.

In a possible implementation, the second device displays the photographing preview image of the first device and the menu bar of the photographing interface of the first device, and sends a photographing instruction to the first device in response to an operation of triggering, by the user on the second device, the first device to take a photograph. The first device photographs a picture or a video.

In a possible implementation, when the first application is the karaoke application, if the karaoke application is installed on the second device, it is detected whether the karaoke application is logged in to, and if the karaoke application is in a logged-in state, the karaoke application presents the first function.

In a possible implementation, when the first application is the karaoke application, if the karaoke application is not installed on the second device, the first function is presented by using an audio player.

In a possible implementation, when the first application is the shopping application, if the shopping application is installed on the second device, it is detected whether the shopping application is logged in to, and if the shopping application is in a logged-in state, the shopping application displays a shared shopping cart based on the service information of the first function, where the shared shopping cart includes all commodities in a shopping cart of the second device and all commodities in the shopping cart of the first device.

In a possible implementation, the second device sends a payment request to the first device in response to an operation of settling accounts of all the commodities in the shared shopping cart by the user, where the payment request includes a total amount of money of all the commodities in the shopping cart of the first device.

In a possible implementation, when the first application is the mailbox application, if the mailbox application is installed on the second device, it is detected whether the mailbox application is logged in to, and if the mailbox application is in a logged-in state, the mailbox application presents the first function.

In a possible implementation, when the first application is the mailbox application, if the mailbox application is not installed on the second device, the first function is encoded and rearranged by using an image-text editor for displaying.

According to a third aspect, an embodiment of this disclosure provides a function migration method, applied to a communication system including a first device and a second device, where the method includes the following. The first device sends a first request to the second device, where the first request carries an identifier of the first device. The second device receives the first request from the first device. The second device sends a first response to the first device, where the first response indicates a first group created by the second device, and a member in the first group includes the second device. The first device receives the first response from the second device. The first device sends a second request to the second device, where the second request is for applying for adding the first device to the first group. The first device migrates a first function in a first application to the second device, where the first application is any application in the first device, and the first function includes one or more graphical UIs.

In a possible implementation, the first response includes a PIN corresponding to the first group and/or communication connection information of the second device. Sending a second request to the second device includes sending the second request to the second device based on the PIN and/or the communication connection information of the second device. The method further includes receiving a second response from the second device, where the second response indicates that the first device has joined the first group.

In a possible implementation, the first device displays a first pop-up box in response to a first operation performed by a user, where the first pop-up box includes an identifier of one or more devices that have not performed authentication with the first device. That the first device sends a first request to the second device includes sending the first request to the second device in response to a second operation of selecting the second device by the user in the first pop-up box.

In a possible implementation, the method further includes the following. The first device creates a second group, where members in the second group include the first device and the second device.

In a possible implementation, the method further includes the following. The first device displays the first pop-up box in response to the first operation performed by the user on the first application of the first device, where the first pop-up box includes an identifier of a device that is in a same network as the first device. That the first device sends a first request to the second device includes the following. The first device sends the first request to the second device in response to the second operation of selecting the second device by the user in the first pop-up box.

In a possible implementation, the device that is in the same network as the first device includes a trusted device and an untrusted device, where the trusted device includes a device that logs in to a same account as the first device, a device that has performed device-level authentication with the first device, or a device that has performed application-level authentication with the first application of the first device, and the untrusted device includes a device that does not log in to the same account as the first device, a device that has not performed device-level authentication with the first device, or a device that has not performed application-level authentication with the first application of the first device.

In a possible implementation, the method further includes the following. The second device displays a two-dimensional code image, where the two-dimensional code image includes the PIN corresponding to the first group and/or the communication connection information of the second device. The first device scans the two-dimensional code image displayed by the second device. That the first device sends a second request to the second device includes the following. The first device sends the second request to the second device based on the PIN and/or the communication connection information of the second device.

In a possible implementation, that the first device migrates a first function in a first application to the second device includes sending service information of the first function to the second device, where when the first application is a live streaming application, the service information of the first function includes at least one of a video stream, an audio stream, and bullet screen information of a live streaming studio of the first device, when the first application is a photographing application, the service information of the first function includes a photographing preview image or menu bar information of a photographing interface, when the first application is a karaoke application, the service information of the first function includes at least one of a song title, lyrics, audio information of a song, video information of the song, and a control interface of the song, when the first application is a shopping application, the service information of the first function includes commodity information in a shopping cart, or when the first application is a mailbox application, the service information of the first function includes at least one of a subject, text, and an attachment of an e-mail.

According to a fourth aspect, an embodiment of this disclosure provides a function migration method, applied to a first device, where the method includes creating a first group, where a member in the first group includes a first application of the first device, receiving a first request from a second device, where the first request is for applying for adding a second application of the second device to the first group, adding the second application of the second device to the first group, and migrating a first function in the first application to the second application of the second device, where the first function includes one or more graphical UIs.

In a possible implementation, before receiving a first request from a second device, the method further includes displaying a first identifier indicating the first group, where the first request corresponds to the first identifier.

In a possible implementation, the first identifier includes a two-dimensional code image, and includes a PIN. After receiving a first request from a second device, the method further includes determining that the first request carries the PIN, and determining to add the second application of the second device to the first group.

In a possible implementation, migrating a first function in the first application to the second application of the second device includes sending service information of the first function to the second device, where when the first application is a live streaming application, the service information of the first function includes at least one of a video stream, an audio stream, and bullet screen information of a live streaming studio of the first device, when the first application is a photographing application, the service information of the first function includes a photographing preview image or menu bar information of a photographing interface, when the first application is a karaoke application, the service information of the first function includes at least one of a song title, lyrics, audio information of a song, video information of the song, and a control interface of the song, when the first application is a shopping application, the service information of the first function includes commodity information in a shopping cart, or when the first application is a mailbox application, the service information of the first function includes at least one of a subject, text, and an attachment of an e-mail.

According to a fifth aspect, an embodiment of this disclosure provides a function migration method, applied to a second device, where the method includes sending a first request to a first device, where the first request is for applying for adding a second application of the second device to a first group created by the first device, and members in the first group include a first application of the first device and the second application of the second device, and receiving a first function in the first application from the first device, where the first function includes one or more graphical UIs.

In a possible implementation, before sending a first request to a first device, the method further includes scanning a first identifier indicating the first group, where the first request corresponds to the first identifier.

In a possible implementation, the first identifier includes a two-dimensional code image, and includes a PIN, and sending a first request to a first device includes sending the first request to the first device, where the first request carries the PIN.

In a possible implementation, receiving a first function in the first application from the first device includes receiving service information of the first function from the first device, where when the first application is a live streaming application, the service information of the first function includes at least one of a video stream, an audio stream, and bullet screen information of a live streaming studio of the first device, when the first application is a photographing application, the service information of the first function includes a photographing preview image or menu bar information of a photographing interface, when the first application is a karaoke application, the service information of the first function includes at least one of a song title, lyrics, audio information of a song, video information of the song, and a control interface of the song, when the first application is a shopping application, the service information of the first function includes commodity information in a shopping cart, or when the first application is a mailbox application, the service information of the first function includes at least one of a subject, text, and an attachment of an e-mail.

According to a sixth aspect, this disclosure provides a first device, including one or more processors and one or more memories. The one or more memories are coupled to the one or more processors. The one or more memories are configured to store computer program code, and the computer program code includes computer instructions. When the one or more processors execute the computer instructions, the first device is enabled to perform the method in any possible implementation of the first aspect, the third aspect, or the fourth aspect.

According to a seventh aspect, this disclosure provides a second device, including one or more processors and one or more memories. The one or more memories are coupled to the one or more processors. The one or more memories are configured to store computer program code, and the computer program code includes computer instructions. When the one or more processors execute the computer instructions, the second device is enabled to perform the method in any possible implementation of the second aspect, the third aspect, or the fifth aspect.

According to an eighth aspect, an embodiment of this disclosure provides a computer program product. When the computer program product runs on a computer, the computer is enabled to perform the method in any possible implementation of any one of the foregoing aspects.

According to a ninth aspect, this disclosure provides a chip system. The chip system may be disposed in a first device. The chip system includes one or more interface circuits and one or more processors. The interface circuit and the processor are connected to each other through a line. The chip system may be used in an electronic device including a communication module and a memory. The interface circuit is configured to receive a signal from the memory and send the received signal to the processor, where the signal includes computer instructions stored in the memory. When the processor executes the computer instructions, the first device may perform the method in any one of the foregoing aspects and the possible implementations of the foregoing aspects.

According to a tenth aspect, an embodiment of this disclosure provides a computer storage medium, including computer instructions. When the computer instructions are run on a first device, the first device is enabled to perform the method in any possible implementation of any one of the foregoing aspects.

According to an eleventh aspect, an embodiment of this disclosure provides a function migration system, including at least two devices (for example, a first device and a second device), and each device may perform the method in any one of the foregoing aspects and the possible implementations of the foregoing aspects.

BRIEF DESCRIPTION OF DRAWINGS

FIG. 19A, FIG. 19B, and FIG. 19C are another schematic diagram of signal exchange according to an embodiment of this disclosure;

DESCRIPTION OF EMBODIMENTS

Figure 1:
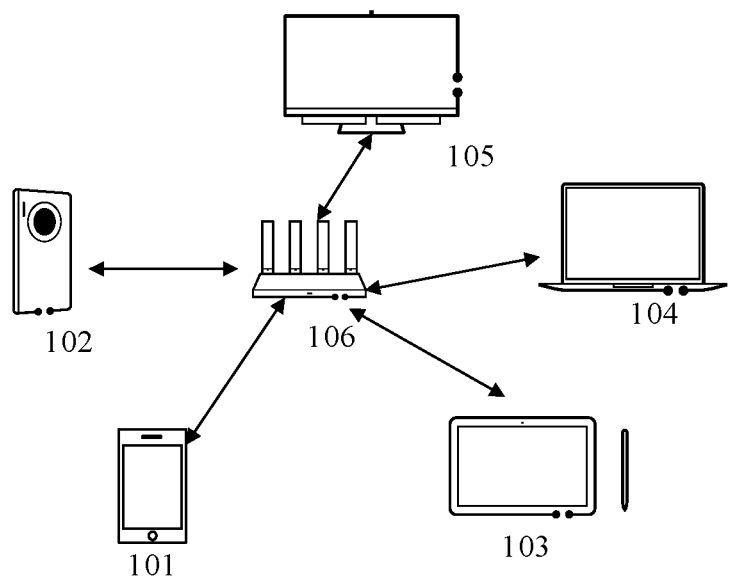
FIG. 1 is a schematic diagram of a system architecture according to an embodiment of this disclosure.

A system architecture in embodiments of this disclosure may include a plurality of electronic devices. Networking may be performed between the plurality of electronic devices, and the plurality of electronic devices may exchange information after the networking. Networking modes include but are not limited to the following:

(1) WI-FI networking mode: The plurality of electronic devices may access a same routing device (for example, a router). As shown in FIG. 1, a mobile phone 101, a mobile phone 102, a tablet computer 103, a notebook computer 104, and a smart television 105 may access a router 106 to form a home network. Alternatively, the plurality of electronic devices may join a same hotspot device (for example, access a hotspot of a same mobile phone). In this case, the information exchanged between the electronic devices may be forwarded by the hotspot device. For example, the mobile phone 102, the tablet computer 103, the notebook computer 104, and the smart television 105 may access the mobile phone 101 to form a hotspot network, and the mobile phone 101 may serve as the hotspot device to forward information for each electronic device.

Figure 2:
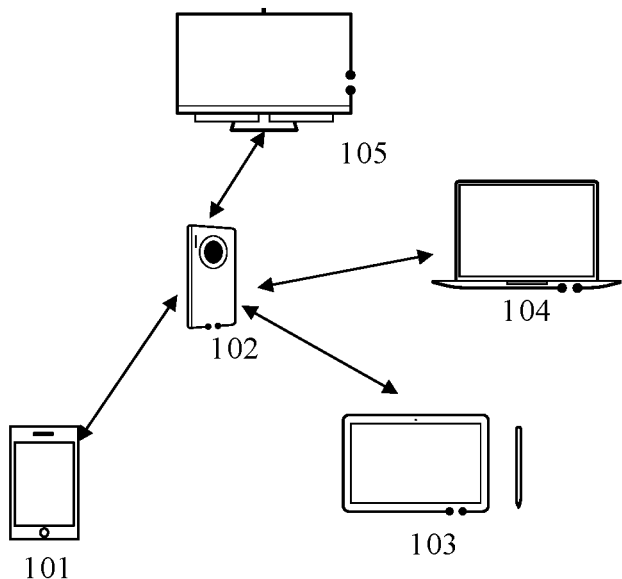
FIG. 2 is a schematic diagram of another system architecture according to an embodiment of this disclosure.

(2) BLUETOOTH networking mode: The plurality of electronic devices may be connected to a same BLUETOOTH device (for example, the mobile phone 102). In this case, the information exchanged between the electronic devices may be forwarded by the BLUETOOTH device. As shown in FIG. 2, the mobile phone 101, the tablet computer 103, the notebook computer 104, and the smart television 105 may access the mobile phone 102, to form a BLUETOOTH network, and the mobile phone 104 may serve as the BLUETOOTH device to forward information for each electronic device.

The plurality of electronic devices may use a plurality of networking modes, for example, use the WI-FI networking mode and the BLUETOOTH networking mode both. This is not limited in this disclosure.

Figure 3:
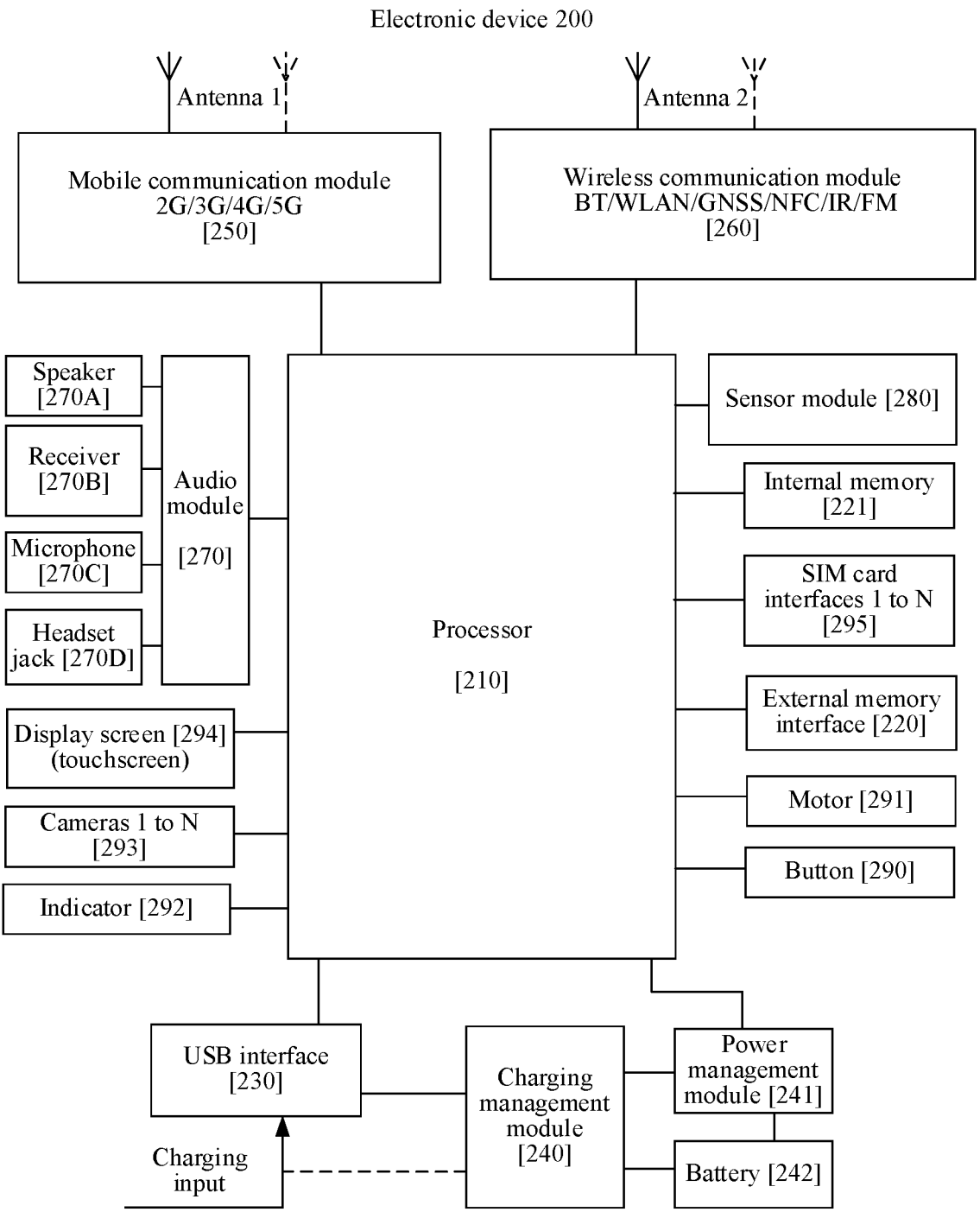
FIG. 3 is a schematic diagram of a hardware structure of an electronic device according to an embodiment of this disclosure.

As shown in FIG. 3, in an embodiment of this disclosure, an electronic device 200 (for example, a mobile phone) is used as an example to describe a structure of the electronic device provided in embodiments of this disclosure. The electronic device 200 (for example, the mobile phone) may include a processor 210, an external memory interface 220, an internal memory 221, a Universal Serial Bus (USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display screen 294, a subscriber identity module (SIM) card interface 295, and the like.

The sensor module 280 may include a pressure sensor, a gyroscope sensor, a barometric pressure sensor, a magnetic sensor, an acceleration sensor, a range sensor, a proximity light sensor, a fingerprint sensor, a temperature sensor, a touch sensor, an ambient light sensor, a bone conduction sensor, and the like.

It may be understood that the structure illustrated in this embodiment does not constitute a specific limitation on the electronic device 200. In some other embodiments, the electronic device 200 may include more or fewer components than those shown in the figure, some components may be combined, some components may be split, or there may be different component arrangement. The components shown in the figure may be implemented by hardware, software, or a combination of software and hardware.

The processor 210 may include one or more processing units. For example, the processor 210 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 200. The controller may generate an operation control signal based on an instruction operation code and a time sequence signal, to complete control of instruction reading and instruction execution.

A memory may be further disposed in the processor 210, and is configured to store instructions and data. In some embodiments, the memory in the processor 210 is a cache. The memory may store instructions or data just used or cyclically used by the processor 210. If the processor 210 needs to use the instructions or the data again, the processor 210 may directly invoke the instructions or the data from the memory. This avoids repeated access and reduces waiting time of the processor 210, so that system efficiency is improved.

In some embodiments, the processor 210 may include one or more interfaces. The interfaces may include an Inter-Integrated Circuit (I2C) interface, an I2C Sound (I2S) interface, a pulse-code modulation (PCM) interface, a universal asynchronous receiver/transmitter (UART) interface, a mobile industry processor interface (MIPI), a general-purpose input/output (GPIO) interface, a SIM interface, a USB interface, and/or the like.

It may be understood that an interface connection relationship between the modules that is illustrated in this embodiment is merely an example for description, and constitutes no limitation on the structure of the electronic device 200. In some other embodiments, the electronic device 200 may alternatively use an interface connection manner different from that in the foregoing embodiment, or use a combination of a plurality of interface connection manners.

The charging management module 240 is configured to receive a charging input from a charger. The charger may be a wireless charger or a wired charger. The charging management module 240 supplies power to the electronic device by using the power management module 241 while charging the battery 242.

The power management module 241 is configured to connect to the battery 242, the charging management module 240, and the processor 210. The power management module 241 receives an input of the battery 242 and/or the charging management module 240, to supply power to the processor 210, the internal memory 221, an external memory, the display screen 294, the camera 293, the wireless communication module 260, and the like. In some embodiments, the power management module 241 and the charging management module 240 may alternatively be disposed in a same component.

A wireless communication function of the electronic device 200 may be implemented by using the antenna 1, the antenna 2, the mobile communication module 250, the wireless communication module 260, the modem processor, the baseband processor, and the like. In some embodiments, the antenna 1 and the mobile communication module 250 of the electronic device 200 are coupled, and the antenna 2 and the wireless communication module 260 of the electronic device 200 are coupled, so that the electronic device 200 can communicate with a network and another device by using a wireless communication technology.

The antenna 1 and the antenna 2 are configured to transmit and receive an electromagnetic wave signal. Each antenna of the electronic device 200 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 250 may provide a solution that is to wireless communication such as second generation (2G)/third generation (3G)/fourth generation (4G)/fifth generation (5G) and that is applied to the electronic device 200. The mobile communication module 250 may include at least one filter, a switch, a power amplifier, a low-noise amplifier (LNA), and the like. The mobile communication module 250 may receive an electromagnetic wave through the antenna 1, perform processing such as filtering or amplification on the received electromagnetic wave, and transmit a processed electromagnetic wave to the modem processor for demodulation.

The mobile communication module 250 may further amplify a signal modulated by the modem processor, and convert the signal into an electromagnetic wave for radiation through the antenna 1. In some embodiments, at least a part of functional modules in the mobile communication module 250 may be disposed in the processor 210. In some embodiments, at least a part of functional modules in the mobile communication module 250 may be disposed in a same component as at least a part of modules in the processor 210.

The wireless communication module 260 may provide a solution, applied to the electronic device 200, to wireless communication including a wireless local area network (WLAN) (for example, a WI-FI network), BLUETOOTH (BT), a global navigation satellite system (GNSS), frequency modulation (FM), near-field communication (NFC), infrared (IR) technology, and the like.

The wireless communication module 260 may be one or more components integrating at least one communication processing module. The wireless communication module 260 receives an electromagnetic wave through the antenna 2, performs frequency modulation and filtering processing on an electromagnetic wave signal, and sends a processed signal to the processor 210. The wireless communication module 260 may further receive a to-be-sent signal from the processor 210, perform frequency modulation and amplification on the signal, and convert the signal into an electromagnetic wave for radiation through the antenna 2.

The electronic device 200 implements a display function by using the GPU, the display screen 294, the application processor, and the like. The GPU is a microprocessor for image processing, and is connected to the display screen 294 and the application processor. The GPU is configured to perform mathematical and geometric computation, and render an image. The processor 210 may include one or more GPUs that execute program instructions to generate or change display information.

The display screen 294 is configured to display an image, a video, and the like. The display screen 294 includes a display panel.

The electronic device 200 may implement a photographing function by using the ISP, the camera 293, the video codec, the GPU, the display screen 294, the application processor, and the like. The ISP is configured to process data fed back by the camera 293. The camera 293 is configured to capture a static image or a video. In some embodiments, the electronic device 200 may include one or N cameras 293, where N is a positive integer greater than 1.

The external memory interface 220 may be configured to connect to an external storage card, for example, a micro Secure Digital (SD) card, to extend a storage capability of the electronic device 200. The external storage card communicates with the processor 210 through the external memory interface 220, to implement a data storage function. For example, files such as music and a video are stored in the external storage card.

The internal memory 221 may be configured to store computer-executable program code. The executable program code includes instructions. The processor 210 runs the instructions stored in the internal memory 221, to perform various function applications and data processing of the electronic device 200. For example, in this embodiment of this disclosure, the processor 210 may execute the instructions stored in the internal memory 221, and the internal memory 221 may include a program storage area and a data storage area.

The program storage area may store an operating system, an application program required by at least one function (for example, a voice playing function or an image playing function), and the like. The data storage area may store data (such as audio data and a phone book) created when the electronic device 200 is used, and the like. In addition, the internal memory 221 may include a high-speed random-access memory (RAM), and may further include a nonvolatile memory, for example, at least one magnetic disk storage component, a flash memory component, or a Universal Flash Storage (UFS).

The electronic device 200 may implement audio functions such as music playing and recording through the audio module 270, the speaker 270A, the receiver 270B, the microphone 270C, the headset jack 270D, the application processor, and the like.

The button 290 includes a power button, a volume button, and the like. The button 290 may be a mechanical button, or may be a touch button. The motor 291 may generate a vibration prompt. The motor 291 may be configured to provide an incoming call vibration prompt and a touch vibration feedback. The indicator 292 may be an indicator light, and may be configured to indicate a charging status and a battery level change, or may be configured to indicate a message, a missed call, a notification, and the like. The SIM card interface 295 is configured to connect to a SIM card. The SIM card may be inserted into or extracted out of the SIM card interface 295 to contact with and separate from the electronic device 200. The electronic device 200 may support one or N SIM card interfaces, where N is a positive integer greater than 1. The SIM card interface 295 may support a nano-SIM card, a micro-SIM card, a SIM card, and the like.

Figure 4:
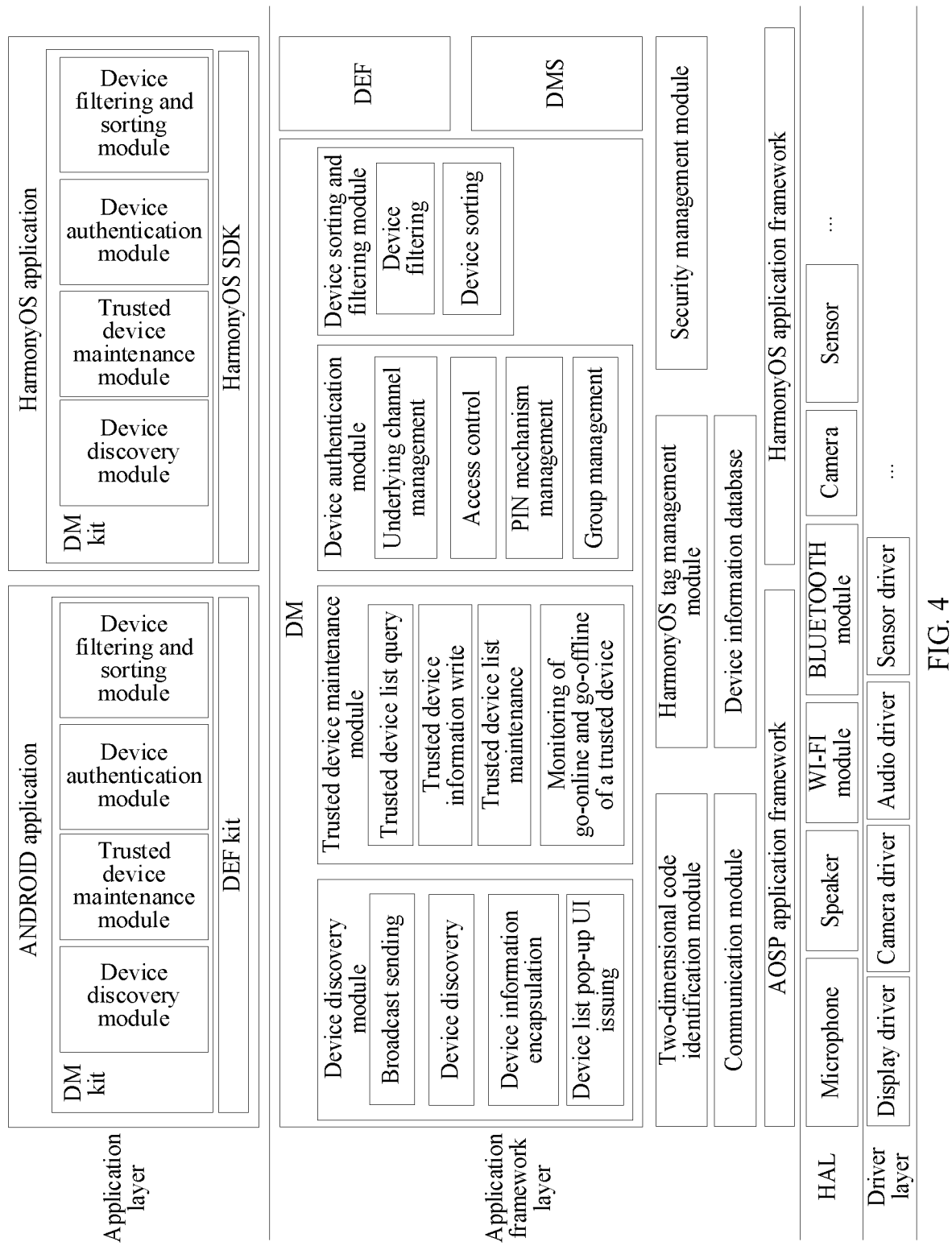
FIG. 4 is a schematic diagram of a software architecture of an electronic device according to an embodiment of this disclosure.

As shown in FIG. 4, a software structure of the electronic device provided in embodiments of this disclosure is described by using an example. The software architecture of the electronic device may include an application layer, an application framework layer, a hardware abstraction layer (HAL), and a driver layer. In this embodiment of this disclosure, an example in which an operating system of the electronic device is a dual-framework operating system (namely, an ANDROID system and HarmonyOS) is used for description. Alternatively, the electronic device may use the ANDROID system, HarmonyOS, an IOS system, or another operating system. This is not limited in embodiments of this disclosure.

The application layer may include an ANDROID application and a HarmonyOS application. The ANDROID application may include a device manager (DM) kit and a distributed execution framework (DEF) kit. The kit (a service) may be a software development kit (SDK) for providing a basic service for (the application of) the application layer. The DM kit may include a device discovery module, a trusted device maintenance module, a device authentication module, a device filtering and sorting module, and the like. The HarmonyOS application may include a DM kit and a HarmonyOS SDK. The SDK may be a set of related documents, instances, and tools that assist in developing a type of software.

The DM kit may include a device discovery module, a trusted device maintenance module, a device authentication module, and a device filtering and sorting module, and the like. Optionally, the application layer may further include applications such as camera, gallery, calendar, call, map, navigation, WLAN, BLUETOOTH, music, video, and Short Message/Messaging Service (SMS) message. This is not limited in this disclosure.

The application framework layer may include a DM, a DEF, a distributed scheduler manager service (DMS), a two-dimensional code identification module (hivision), a HarmonyOS tag management module, a security management module, a communication module, and a device information database (device profile). Certainly, the framework layer 302 may further include an activity manager, a window manager, a content provider, a resource manager, a notification manager, and the like. This is not limited in embodiments of this disclosure.

The DM module mainly provides device discovery, trusted device maintenance, and device authentication capabilities. Secure and trusted connections are established between devices with a same account or different accounts and between an ANDROID device and a HarmonyOS device by maintaining local device information, writing information into a two-dimensional code, scanning a code for identification, establishing a physical connection, and maintaining device group information. Optionally, the DM may include a device discovery module, a trusted device maintenance module, a device authentication module, and a device sorting and filtering module. The device discovery module is configured to perform processing such as sending a broadcast, discovering a device, encapsulating device information, and issuing a device list pop-up UI. The trusted device maintenance module is configured to perform processing such as querying a trusted device list, writing trusted device information, maintaining the trusted device list, and monitoring go-online and go-offline of a trusted device. The device authentication module is configured to perform processing such as underlying channel management, access control, PIN mechanism management, and group management. The device sorting and filtering module is configured to perform processing such as device filtering and device sorting.

The HarmonyOS tag management module is responsible for providing capabilities of HarmonyOS tag application, parsing, and formatting, HarmonyOS tag service query, and service distribution.

The DEF is responsible for providing discovery, registration, query, and migration of an atomic service, and is responsible for underlying data communication between devices and device discovery.

The two-dimensional code identification module provides HarmonyOS tag generation and code scanning capabilities, to generate a HarmonyOS two-dimensional code tag based on tag information provided by a tag service and scan the HarmonyOS two-dimensional code tag to trigger the tag service to parse the tag information.

The security management module (HiChain) manages groups in a distributed scenario and performs device group authentication, where the groups include a public group and an application-level private group, and provides secure and trusted communication and connections between devices and between applications in the distributed scenario.

The communication module manages self-discovery and self-networking of devices with a same account in the distributed scenario via a soft bus, discovers a device with a different account through scanning, and provides a channel for communication between different devices, to ensure secure and stable data transmission.

The DMS mainly provides capabilities of completing cross-device service binding and calling a cross-device ANDROID interface definition language (AIDL) interface. An AIDL is a description language for defining a communication interface between a server and a client.

The device information database is responsible for reading/writing, storing, and managing device information.

The HAL may include a microphone, a speaker, a WI-FI module, a BLUETOOTH module, a camera, a sensor, and the like.

The driver layer is a layer between hardware and software, and may also be referred to as a kernel layer. The kernel layer includes at least a display driver, a camera driver, an audio driver, and a sensor driver.

The foregoing software architecture may be deployed on a plurality of electronic devices (for example, the mobile phone 101, the mobile phone 102, the tablet computer 103, the notebook computer 104, the smart television 105, and the router 106 in FIG. 1 or FIG. 2) in a current networking environment.

The following describes technical solutions in embodiments of this disclosure with reference to the accompanying drawings in embodiments of this disclosure. In descriptions of this disclosure, unless otherwise specified, "at least one" means one or more, and "a plurality of" means two or more. In addition, to clearly describe the technical solutions in embodiments of this disclosure, terms such as "first" and "second" are used in embodiments of this disclosure to distinguish between same items or similar items that provide basically same functions or purposes. A person skilled in the art may understand that the terms such as "first" and "second" do not limit a quantity or an execution sequence, and do not indicate a definite difference.

For clear and brief descriptions of the following embodiments, related concepts or technologies are briefly described first.

Ability is an abstract of an ability of an application. One application may include one or more abilities. HarmonyOS supports deployment of the application in abilities. Abilities are classified into two types: an feature ability (FA) and an atom ability (AA).

AA is a program entity that is developed by a third party based on a HarmonyOS service and that implements a single function, is configured to provide an ability of running a task in background, and has no UI. The AA features multi-end deployment and distributed execution. AAs depend on a system service, but do not depend on each other.

The FA is configured to provide an ability (function) of interacting with a user. One FA may include one group of related pages (which may also be considered as one group of UIs). Each page may be represented by one AbilitySlice instance. The FA is a program entity that may call the AA to implement a complex function, is developed based on a new interface/data/logic separated structure, and may be independently packaged and released. The FA provides the following abilities: installation-free, independent running without relying on an application, cross-device UI migration, cross-device binary migration, and the like. The UI of the FA is partially similar to but actually different from that of an applet or a fast application. Differences therebetween may include two points: First, the FA may be migrated across devices (where for example, an FA of a mobile phone A may be migrated to a mobile phone B, so that the mobile phone B can control the FA of the mobile phone A). Second, the FA may be cross-platform, where for example, the FA may run in both an ANDROID system and HarmonyOS, and the applet or the fast application usually runs in the ANDROID system currently.

The FA may be shared between different devices by using an FA sharing technology, to be specific, an FA of a device may be migrated to another device for presentation and operation. Authentication needs to be performed before the FA sharing to ensure security and reliability of the FA sharing.

Embodiments of this disclosure provide a function migration method, including device-level authentication and application-level authentication. After the application-level authentication is performed between different devices, specific applications of the different devices can communicate with each other (in other words, the applications can exchange service data, for example, migrate an FA). For example, after a first application of a device A and a first application of a device B are mutually authenticated, the first application of the device A and the first application of the device B may communicate with each other, but another application (for example, a second application) of the device A and another application (for example, a second application) of the device B do not communicate with each other. After the device-level authentication, all applications of the different devices can communicate with each other.

For ease of understanding, the following uses a mobile phone A and a mobile phone B as an example to describe a UI for the device-level authentication provided in embodiments of this disclosure.

Figure 5A:
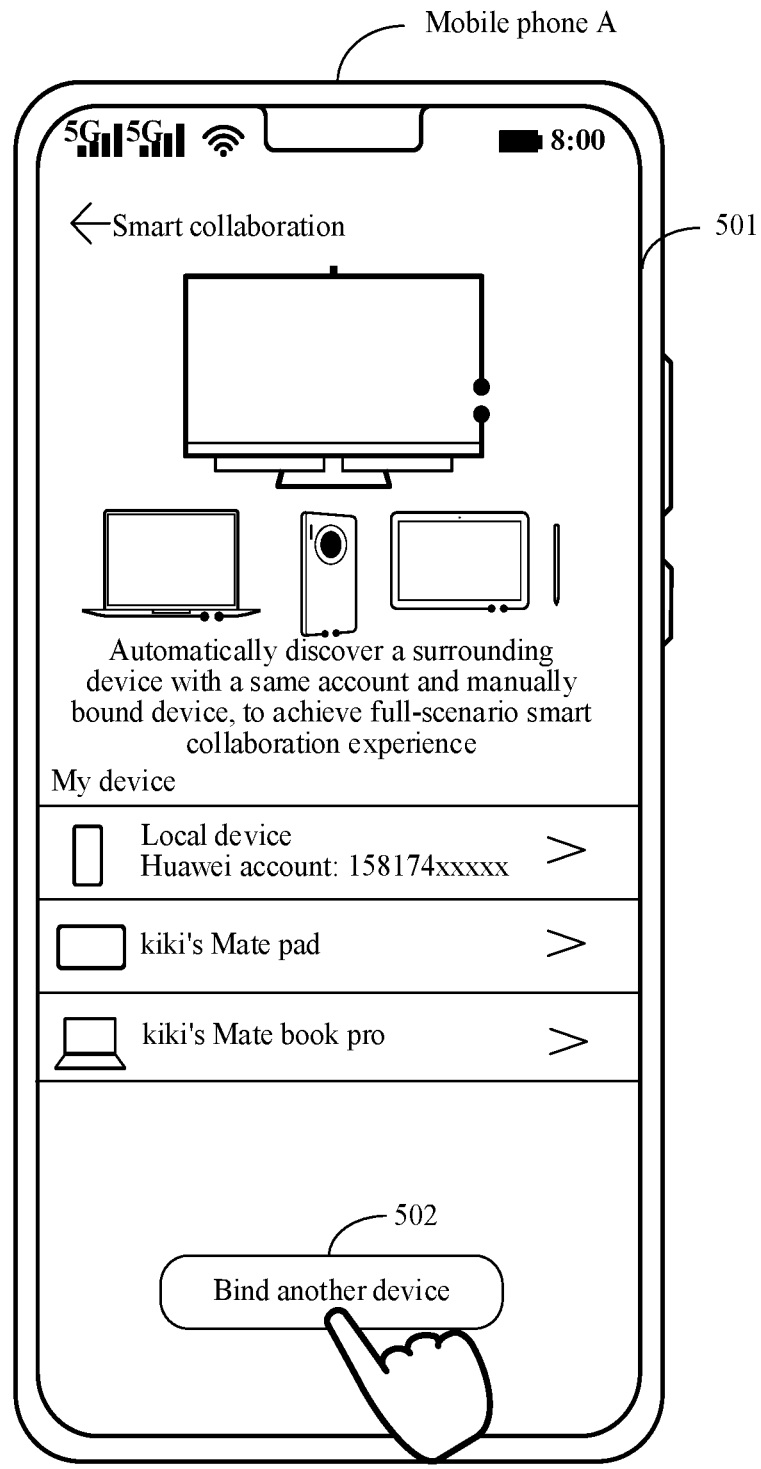
FIG. 5A and FIG. 5B are a schematic diagram of displaying according to an embodiment of this disclosure.

As shown in FIG. 5A, a user may enter a smart collaboration interface 501 through a setting application, and the smart collaboration interface 501 may include a list named "My device". "My device" includes a local device (namely, the mobile phone A), kiki's Mate pad, and kiki's Mate book pro. The local device, kiki's Mate pad, and kiki's Mate book pro may be devices with a same account (for example, sharing one HUAWEI account). Alternatively, the local device, kiki's Mate pad, and kiki's Mate book pro may be devices that have different accounts but have been authenticated (where for an authentication process, refer to the following related descriptions).

Figure 5B:
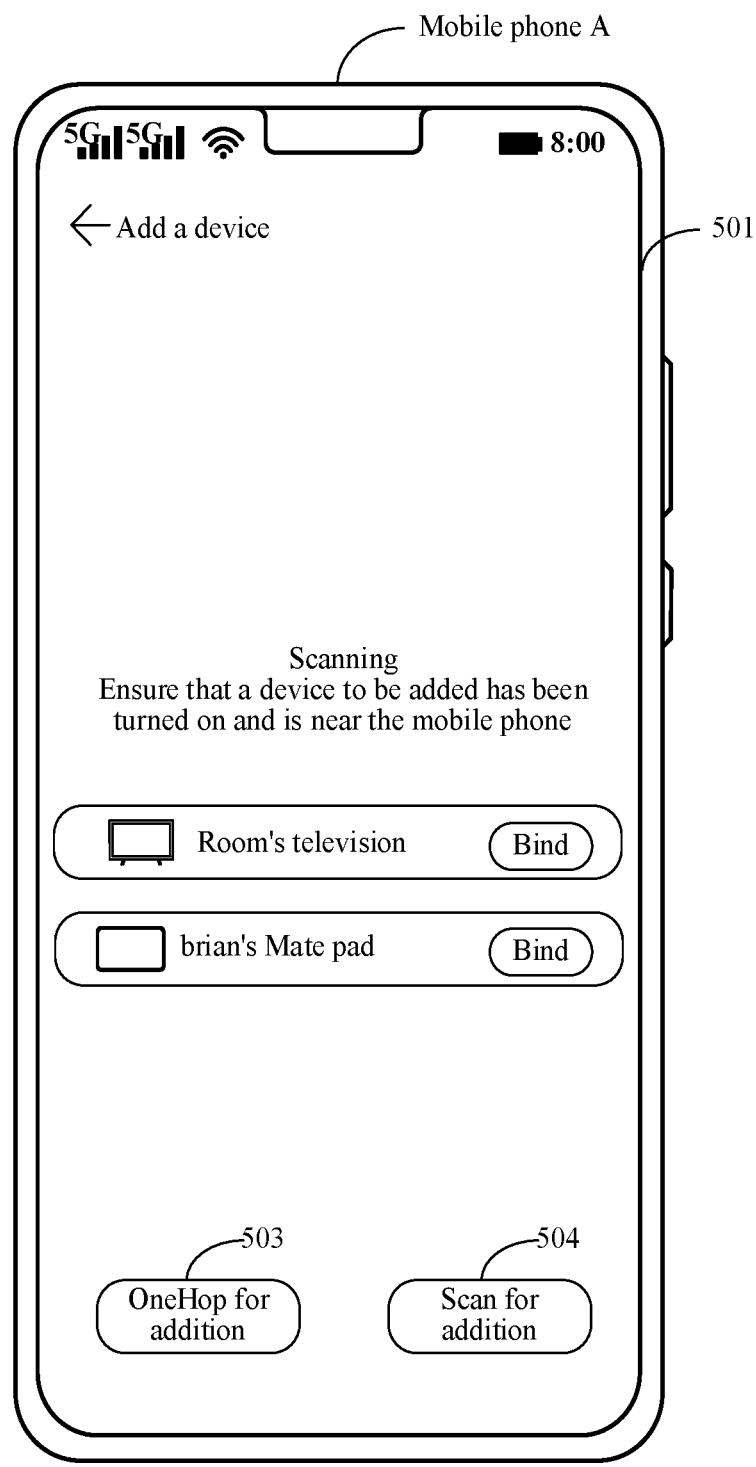

Optionally, the smart collaboration interface 501 may include a "Bind another device" button 502. In embodiments of this disclosure, binding means establishing a trust relationship between two devices, so that any applications of the two devices can communicate with each other, for example, can migrate an FA to each other without authentication. In response to an operation (for example, a tap operation) performed by the user on the "Bind another device" button 502, as shown in FIG. 5B, the mobile phone A may display a "OneHop for addition" button 503 and a "Scan for addition" button 504. It should be understood that locations, names, shapes, and the like of elements (for example, buttons, icons, and text) in UIs corresponding to FIG. 5A and FIG. 5B are not fixed, and may be freely combined or designed according to a requirement. For example, the button 502 in FIG. 5A may be replaced with the button 503 and the button 504 in FIG. 5B.

Figure 5C:
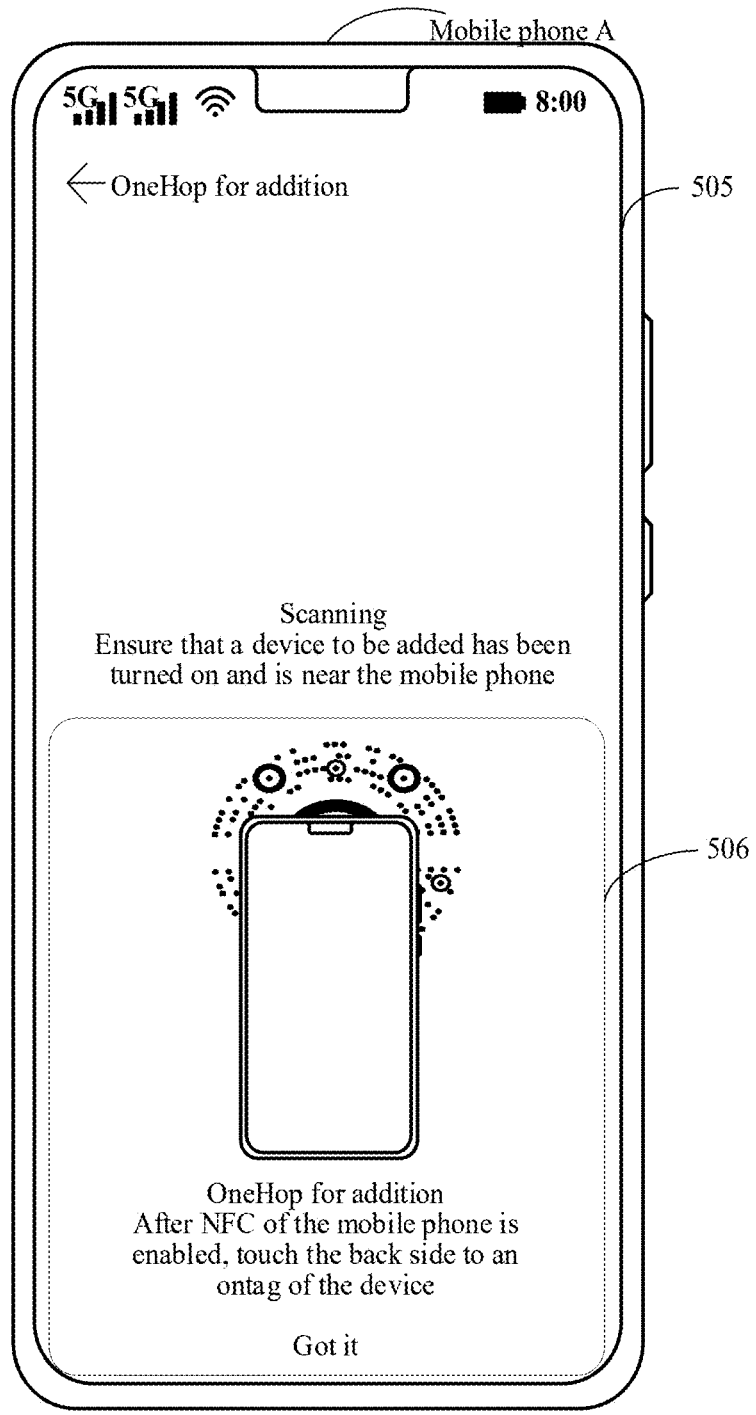
FIG. 5C and FIG. 5D are another schematic diagram of displaying according to an embodiment of this disclosure.
Figure 5D:
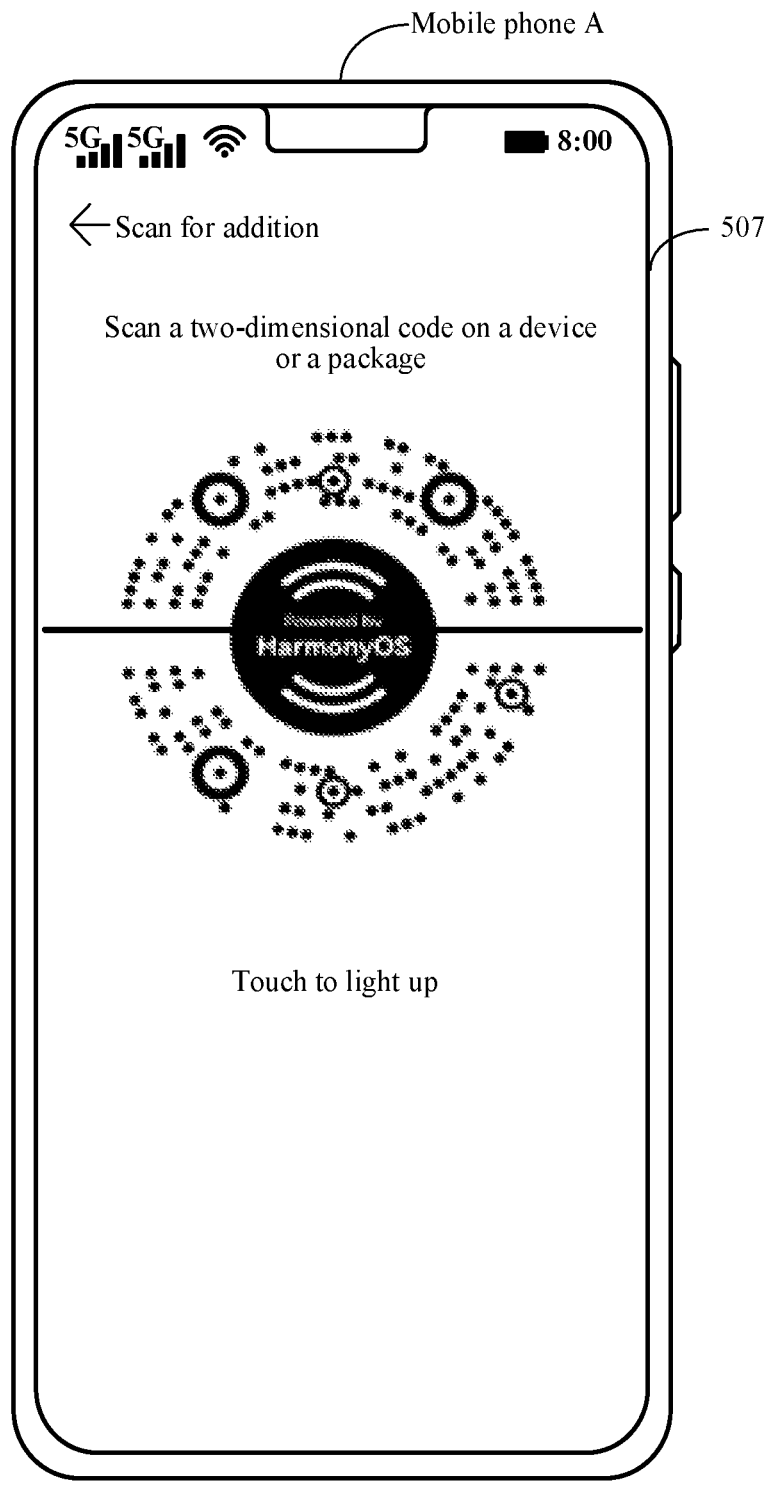

For example, in response to a tap operation performed by the user on the "OneHop for addition" button 503, as shown in FIG. 5C, the mobile phone A may display a "OneHop for addition" interface 505, and the "OneHop for addition" interface 505 may display a pop-up box 506. The pop-up box 506 includes a prompt picture and prompt information. The prompt information may be, for example, "OneHop for addition. After NFC of the mobile phone is enabled, touch the back side to an ontag of the device". The user may perform an operation based on the prompt information to add a new device in a OneHop manner. For another example, in response to a tap operation performed by the user on the "Scan for addition" button 504, as shown in FIG. the mobile phone A may display a "Scan for addition" interface 507. The "Scan for addition" interface 507 may include a prompt picture and prompt information. The prompt information may be, for example, "Scan a two-dimensional code on a device or a package". The user may perform an operation based on the prompt information to add a new device in a Scan manner.

Figure 5E:
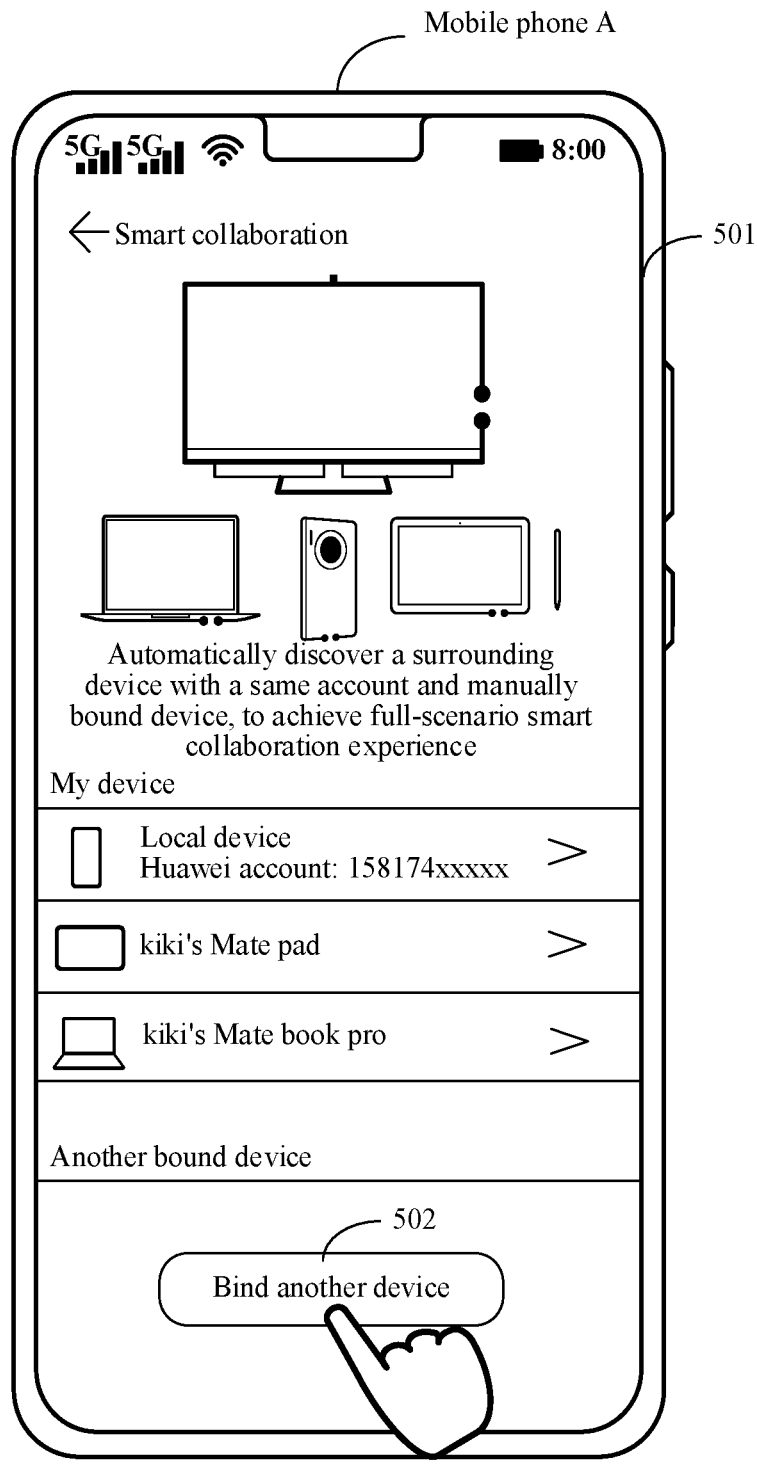
FIG. 5E and FIG. 5F are another schematic diagram of displaying according to an embodiment of this disclosure.
Figure 5F:
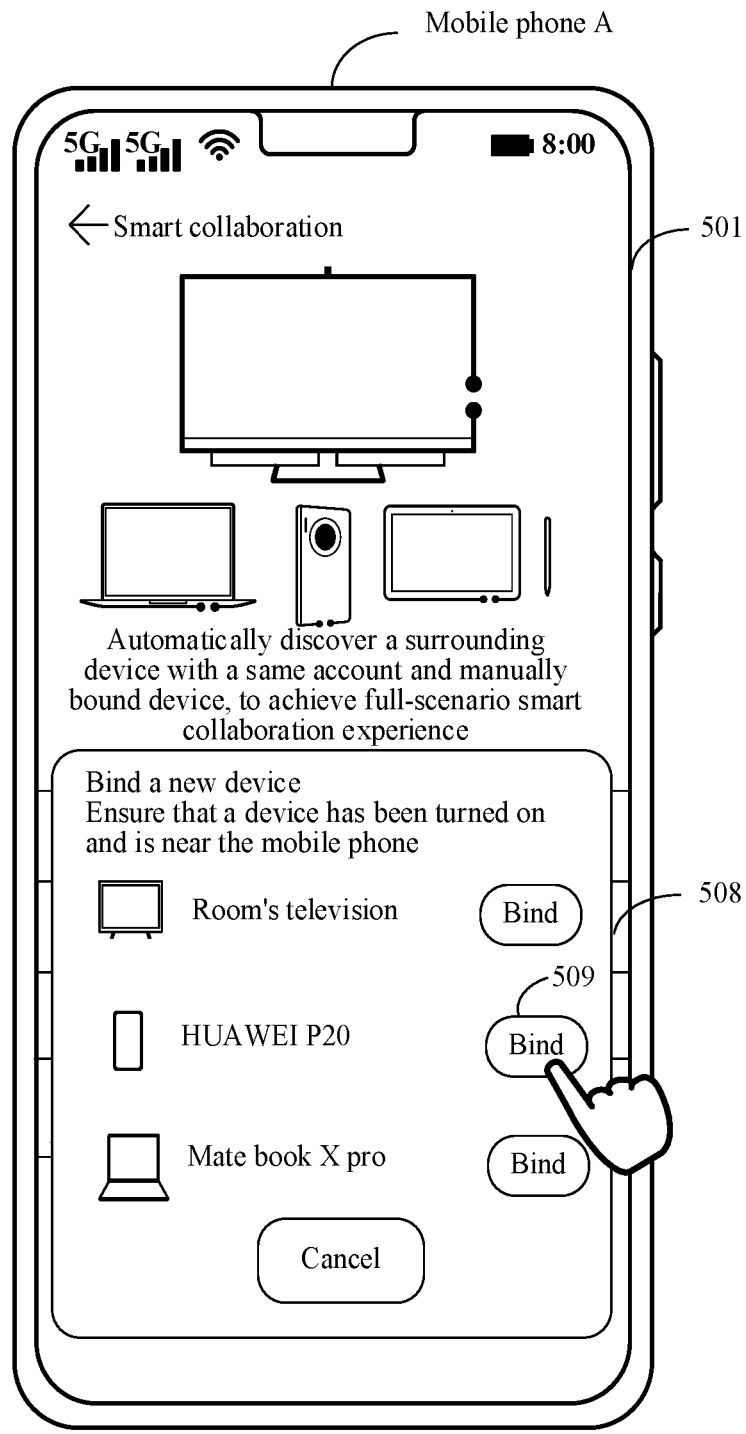
Figure 5G:
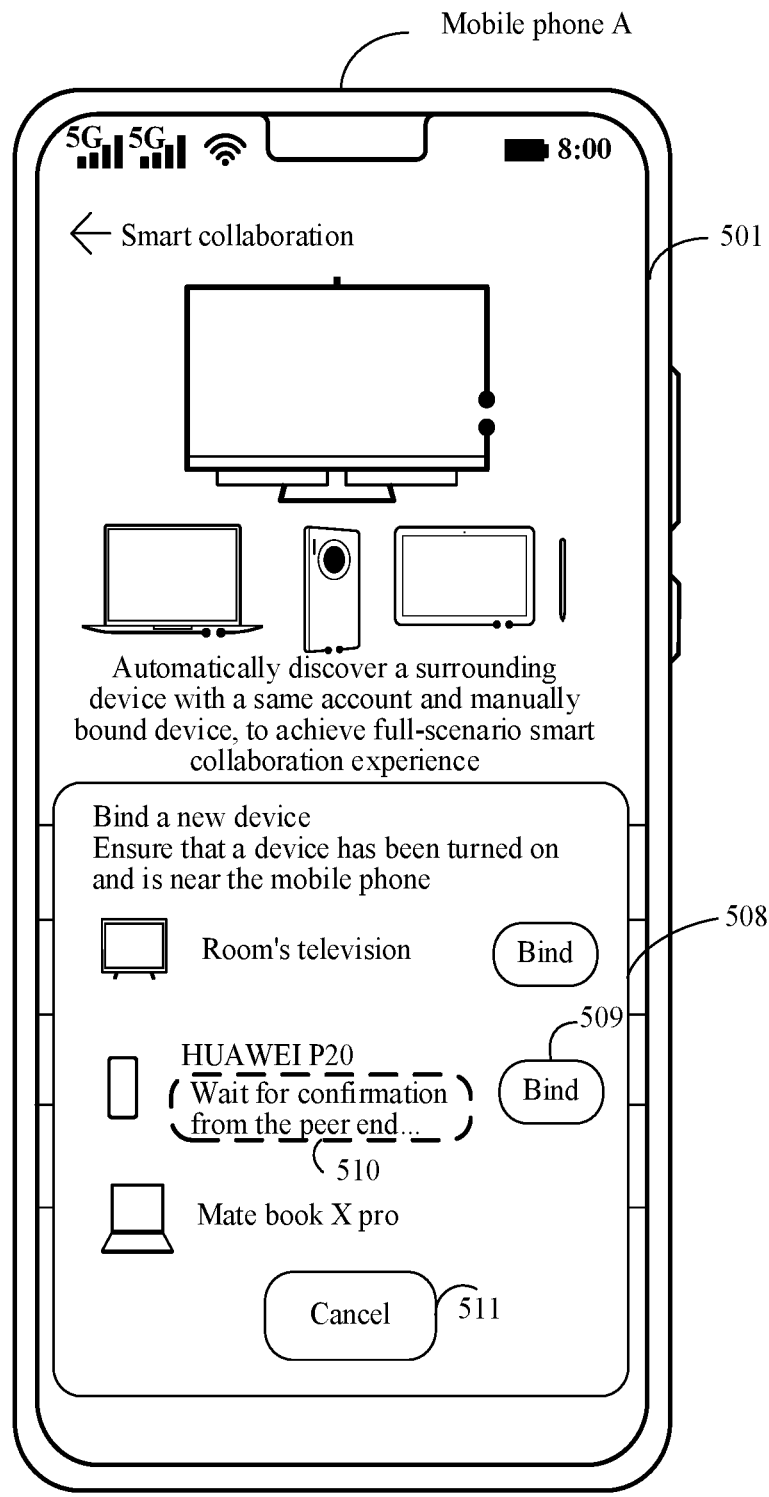
FIG. 5G and FIG. 5H are another schematic diagram of displaying according to an embodiment of this disclosure.

If the mobile phone A does not support adding a new device in the OneHop manner and the Scan manner, as shown in FIG. 5E, in response to an operation of tapping the "Bind another device" button 502 by the user, as shown in FIG. 5F, the mobile phone A may display a pop-up box 508. The pop-up box 508 includes prompt information "Ensure that a device has been turned on and is near the mobile phone", and may further include a device, for example, Room's television, HUAWEI P20, and Mate book X pro, detected by the mobile phone A through a short-distance communication network (for example, a WI-FI network or a BLUETOOTH network). Each device corresponds to one "Bind" button. In response to an operation performed by the user on a "Bind" button 509 corresponding to HUAWEI P20, as shown in FIG. 5G, prompt information 510 "Wait for confirmation from the peer end . . . " may be displayed below an identifier of HUAWEI P20. The pop-up box 508 may further include a "Cancel" button 511. In response to an operation of tapping the "Cancel" button 511 by the user, the mobile phone A may return to the interface shown in FIG.

Figure 5H:
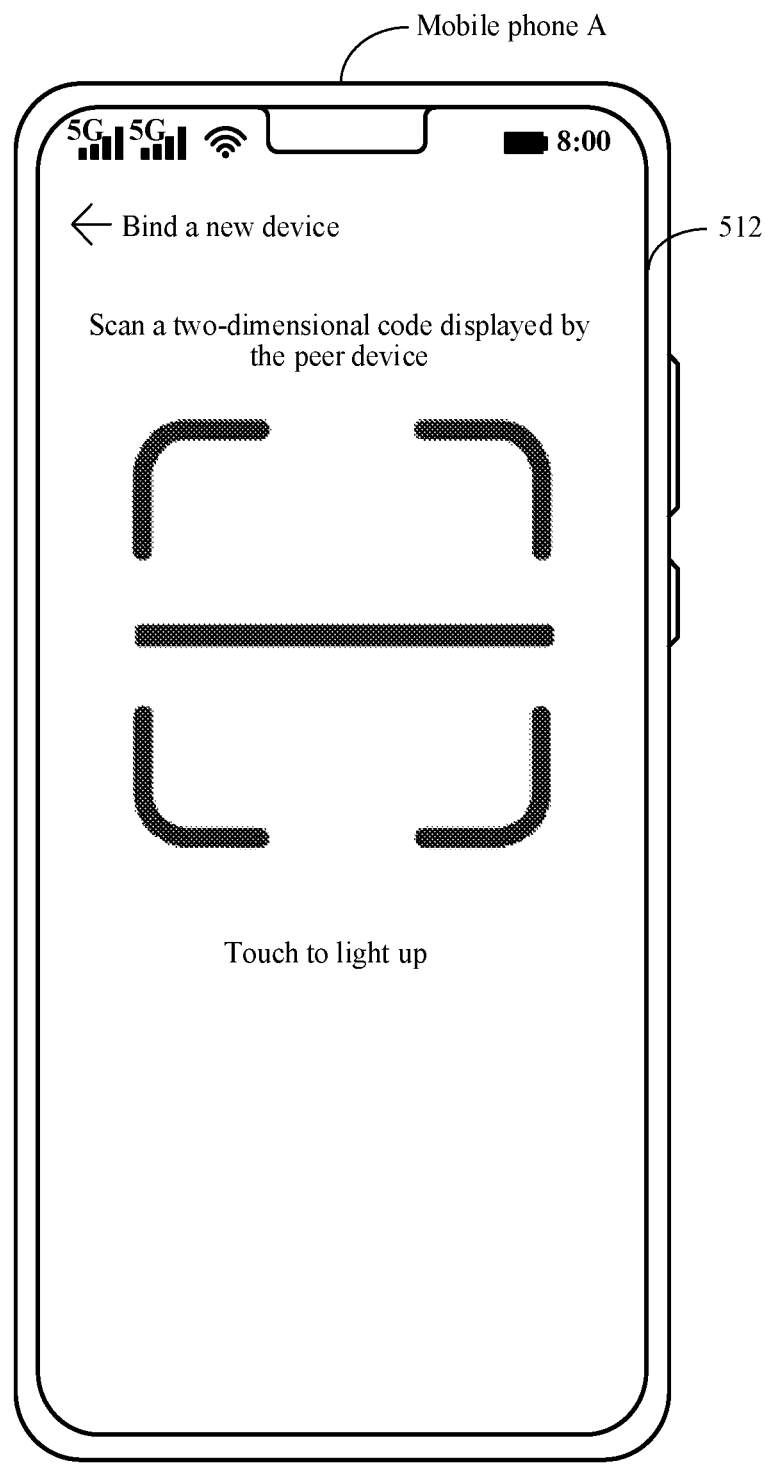

If the peer device makes a confirmation (for example, a user of the peer device agrees to the binding), as shown in FIG. 5H, the mobile phone A may display a "Bind a new device" interface 512, where the "Bind a new device" interface 512 may include prompt information "Scan a two-dimensional code displayed by the peer device". The user may perform an operation based on the prompt information, to add the new device. It should be understood that a jump relationship between different UIs is not limited in embodiments of this disclosure. For example, as shown in FIG. 5F, in response to the operation of tapping the "Bind" button 509 by the user, as shown in FIG. 5H, the mobile phone may directly display the scanning interface 512.

Figure 5I:
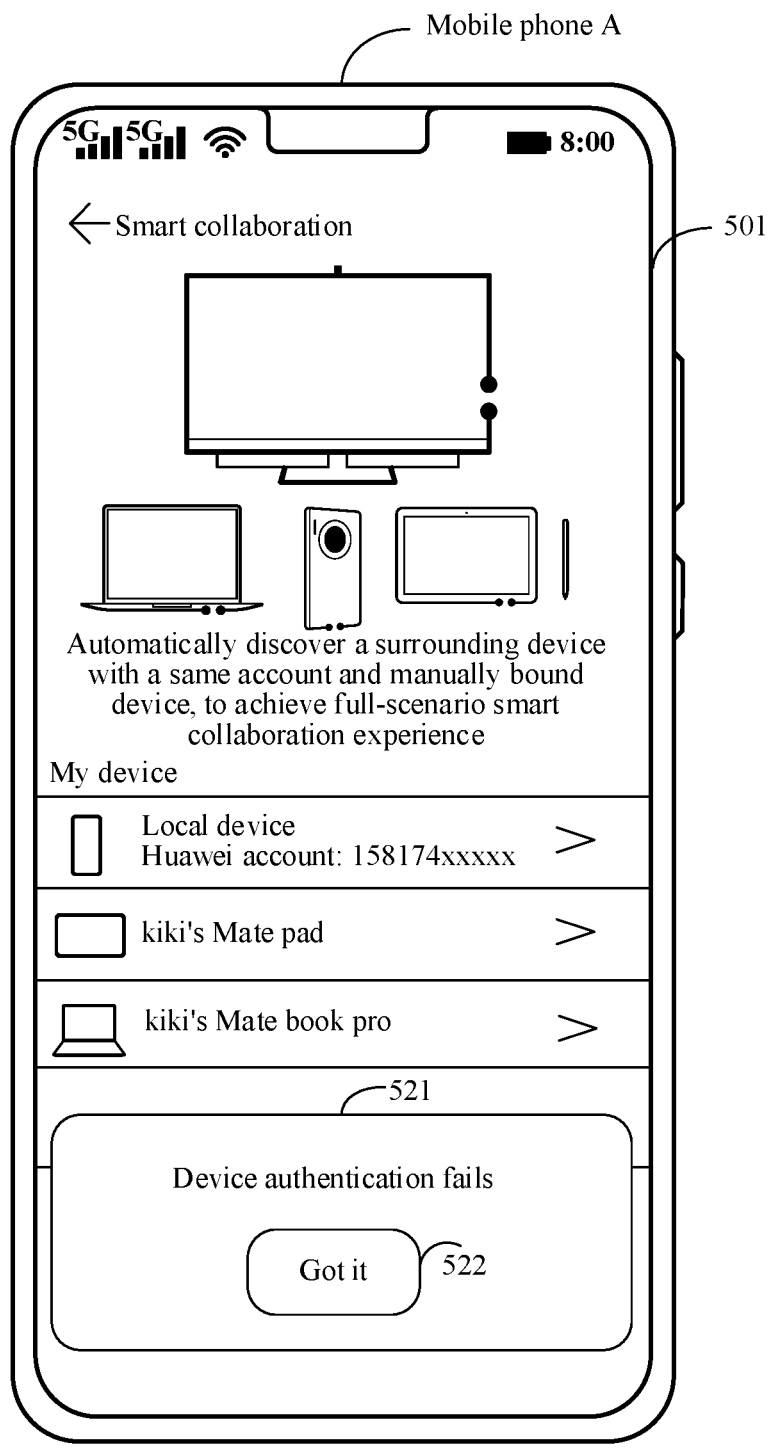
FIG. 5I, FIG. 5J, and FIG. 5K are another schematic diagram of displaying according to an embodiment of this disclosure.
Figure 5J:
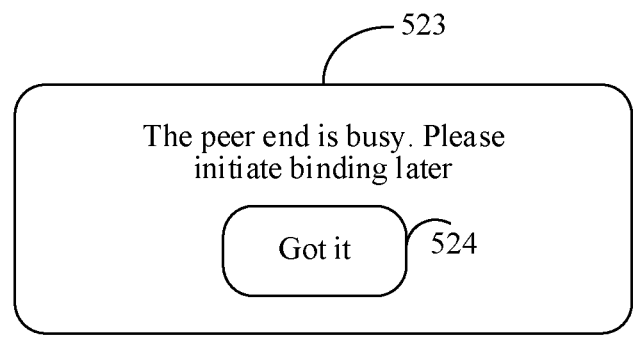
Figure 5K:
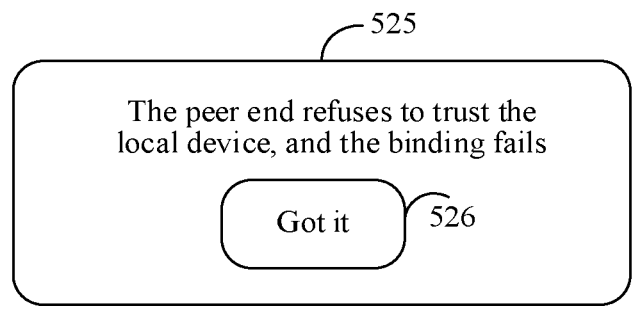
Figure 5L:
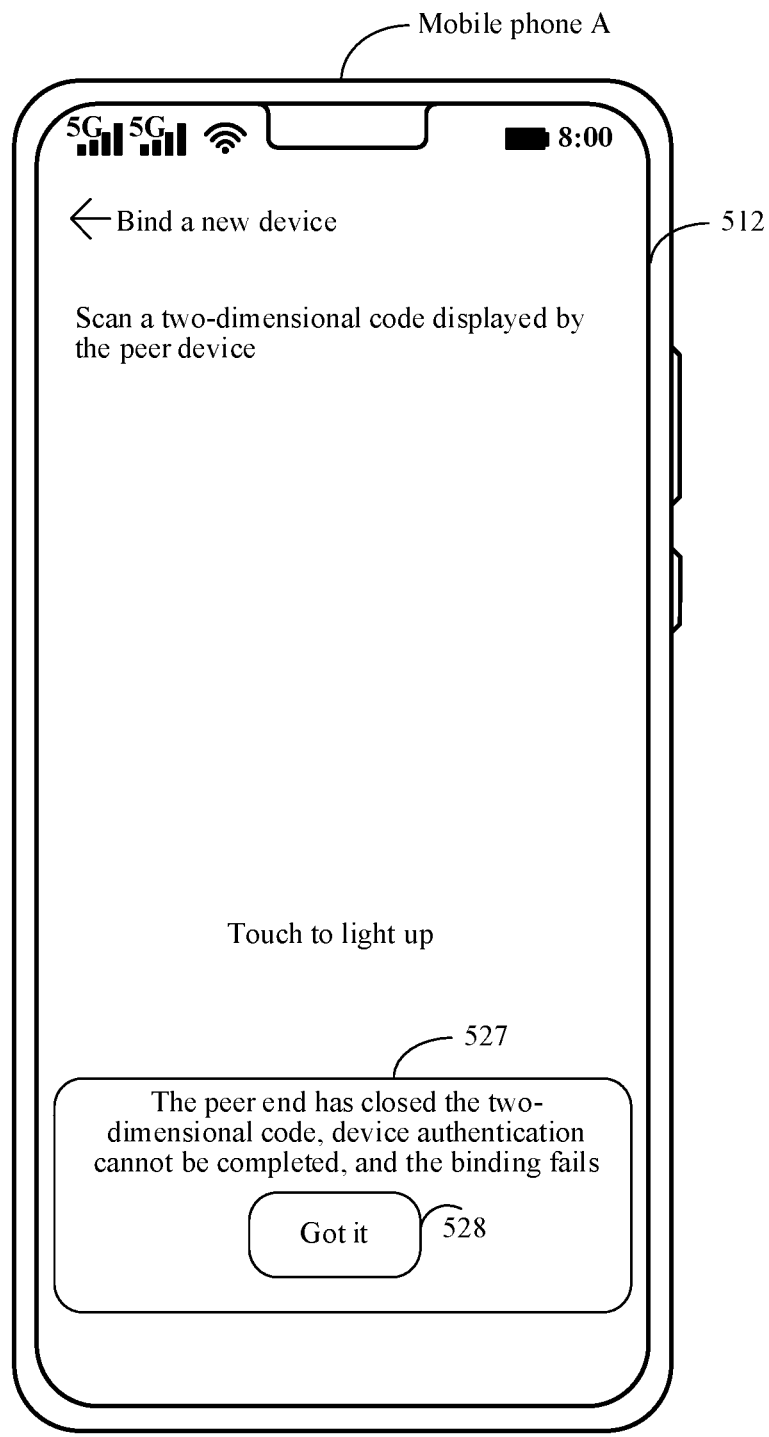
FIG. 5L is another schematic diagram of displaying according to an embodiment of this disclosure.

If the peer device does not make a confirmation (where for example, the peer device does not have a binding function, the binding times out, the peer device is busy, or a user of the peer device does not agree to the binding), as shown in FIG. 5I, the mobile phone A may display a pop-up box 521 to notify the user that "Device authentication fails". In response to an operation of tapping a "Get" button 522 by the user, the pop-up box 521 may be removed. Alternatively, the pop-up box 521 may be removed after a preset period of time (for example, 3 seconds (s)). In another possible design, as shown in FIG. 5J, the mobile phone A may display a pop-up box 523, to notify the user that "The peer end is busy. Please initiate binding later". In response to an operation of tapping a "Get" button 524 by the user, the pop-up box 523 may be removed. Alternatively, the pop-up box 523 may be removed after a preset period of time (for example, 3 s). In still another possible design, as shown in FIG. 5K, the mobile phone A may display a pop-up box 525, to notify the user that "The peer end refuses to trust the local device, and the binding fails". In response to an operation of tapping a "Get" button 526 by the user, the pop-up box 525 may be removed. Alternatively, the pop-up box 525 may be removed after a preset period of time (for example, 3 s). Alternatively, as shown in FIG. 5L, the mobile phone A may display a pop-up box 527 in the interface 512, to notify the user that "The peer end has closed the two-dimensional code, device authentication cannot be completed, and the binding fails". In response to an operation of tapping a "Get" button 528 by the user, the pop-up box 527 may be removed.

Figure 6A:
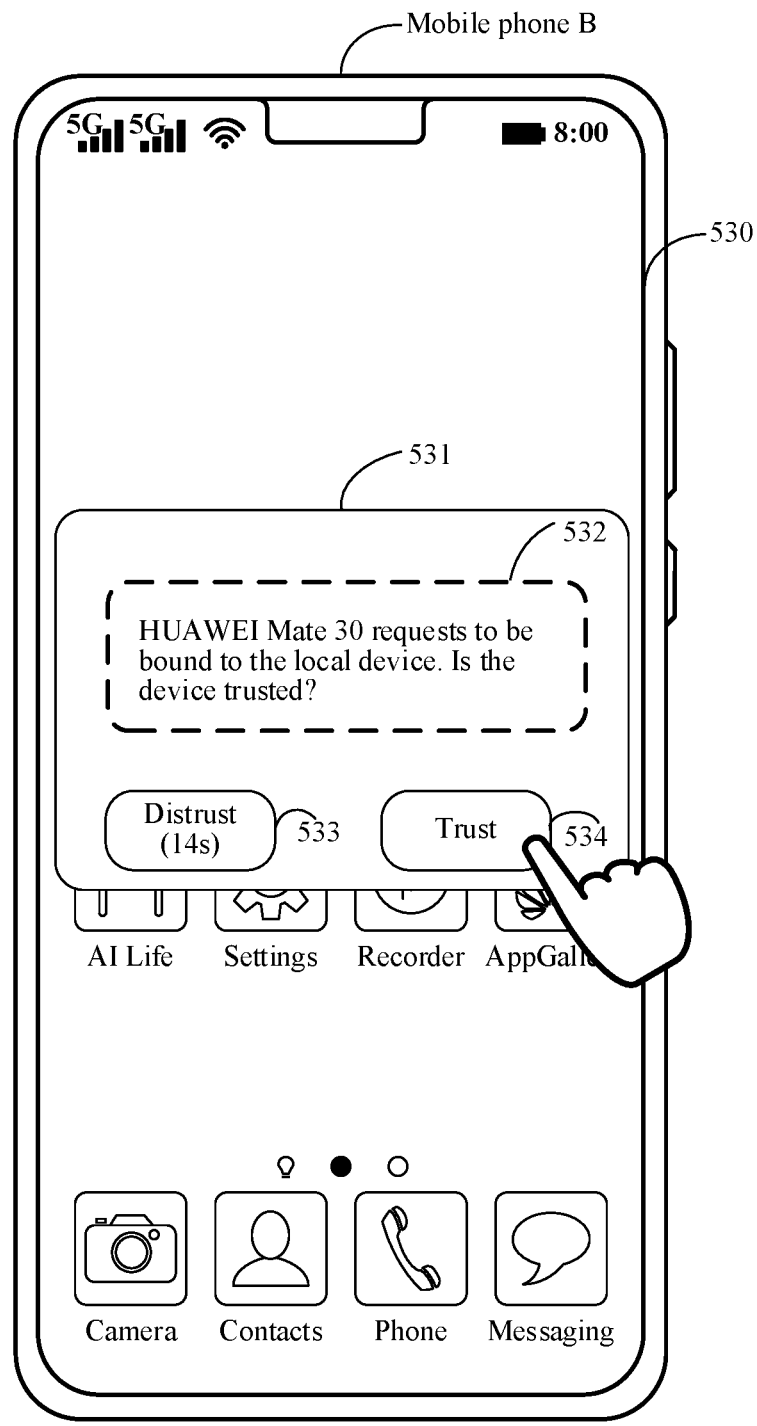
FIG. 6A and FIG. 6B are another schematic diagram of displaying according to an embodiment of this disclosure.

It is assumed that the peer device is the mobile phone B (which may be, for example, HUAWEI P20). If the mobile phone B receives a binding request of the mobile phone A when displaying a desktop 530, as shown in FIG. 6A, the mobile phone B may display a pop-up box 531. The pop-up box 531 may include prompt information 532 "HUAWEI Mate 30 requests to be bound to the local device. Is the device trusted?", and may further include a "Distrust" button 533 and a "Trust" button 534. A countdown (for example, 14 s) may be further displayed in the "Distrust" button. If the user does not tap any button when the countdown ends, the pop-up box 531 may be automatically removed. In response to an operation of tapping the "Trust" button 534 by the user, the mobile phone A may perform an authentication process with the mobile phone B (refer to related descriptions of step 718A to step 732 below), so that the mobile phone A can be bound to the mobile phone B.

Figure 6B:
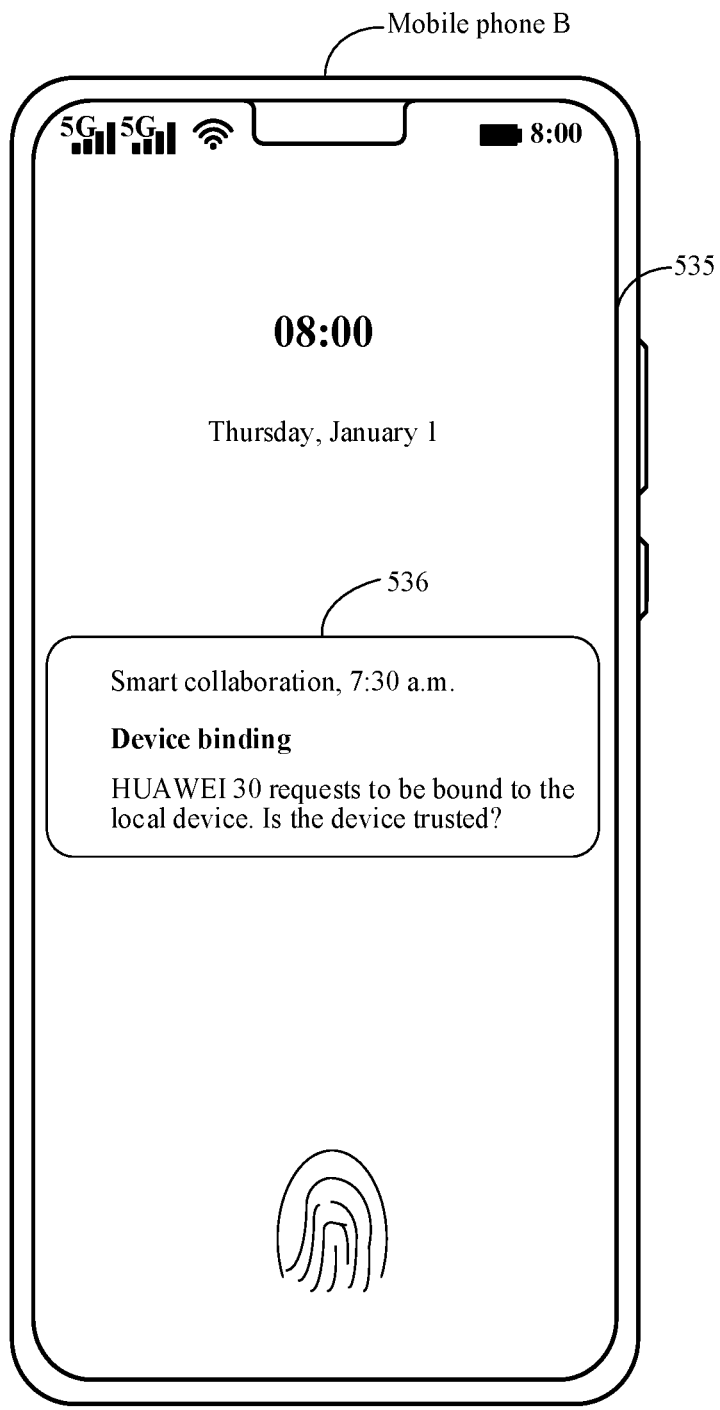

If the mobile phone B receives, in a screen-off state or a screen-locked state, a binding request of the mobile phone A, as shown in FIG. 6B, the mobile phone B may display a pop-up box 536 in a screen-locked interface 535. The pop-up box 536 may notify the user that a smart collaboration application receives the device binding request at 7:30 a.m., where the device binding request may be further "HUAWEI Mate 30 (namely, the mobile phone A) requests to be bound to the local device. Is the device trusted?". In response to an operation (for example, entering a password or a fingerprint) performed by the user to enter a desktop from the screen-locked state, as shown in FIG. 6A, the pop-up box 536 may be changed to a form of the pop-up box 531, and the user may choose to trust or distrust HUAWEI Mate 30 (namely, the mobile phone A).

Figure 6C:
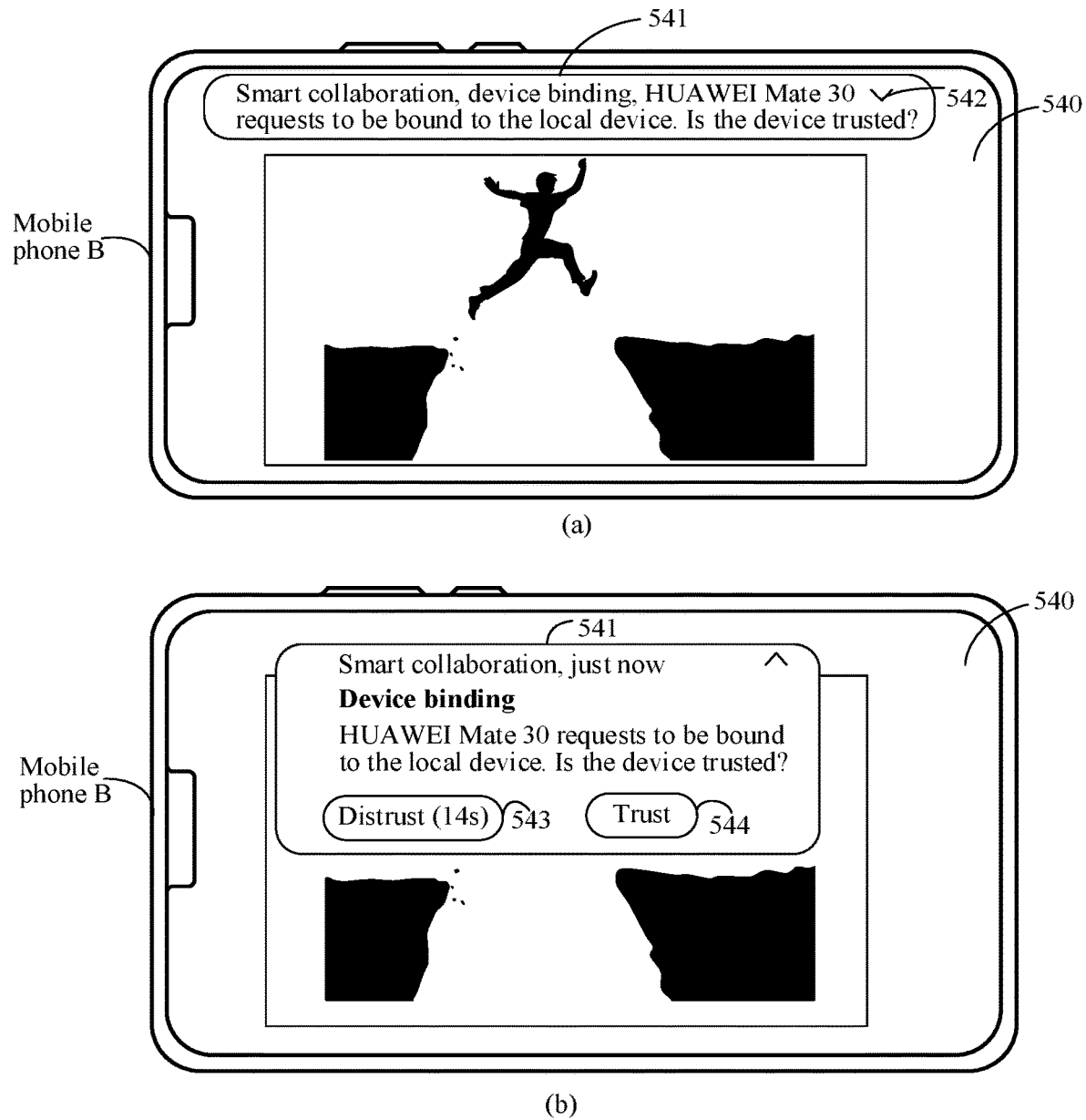
FIG. 6C is another schematic diagram of displaying according to an embodiment of this disclosure.

If the mobile phone B receives, in a video playing or game state, a binding request of the mobile phone A, as shown in (a) in FIG. 6C, the mobile phone B may display a pop-up box 541 in a video interface or a game interface 540. The pop-up box 541 may notify the user that a smart collaboration application receives the device binding request, where the device binding request may be further "HUAWEI Mate 30 requests to be bound to the local device. Is the device trusted?". In response to an operation of tapping a drop-down control 542 by the user, as shown in (b) in FIG. 6C, the pop-up box 541 may present more information, for example, may display a "Distrust" button 543 and a "Trust" button 544. A countdown (for example, 14 s) may be further displayed in the "Distrust" button 543. If the user does not tap any button when the countdown ends, the pop-up box 541 may be automatically removed. In response to an operation of tapping the "Trust" button 544 by the user, the mobile phone A may perform an authentication process with the mobile phone B (refer to related descriptions of step 718A to step 732 below).

Figure 6D:
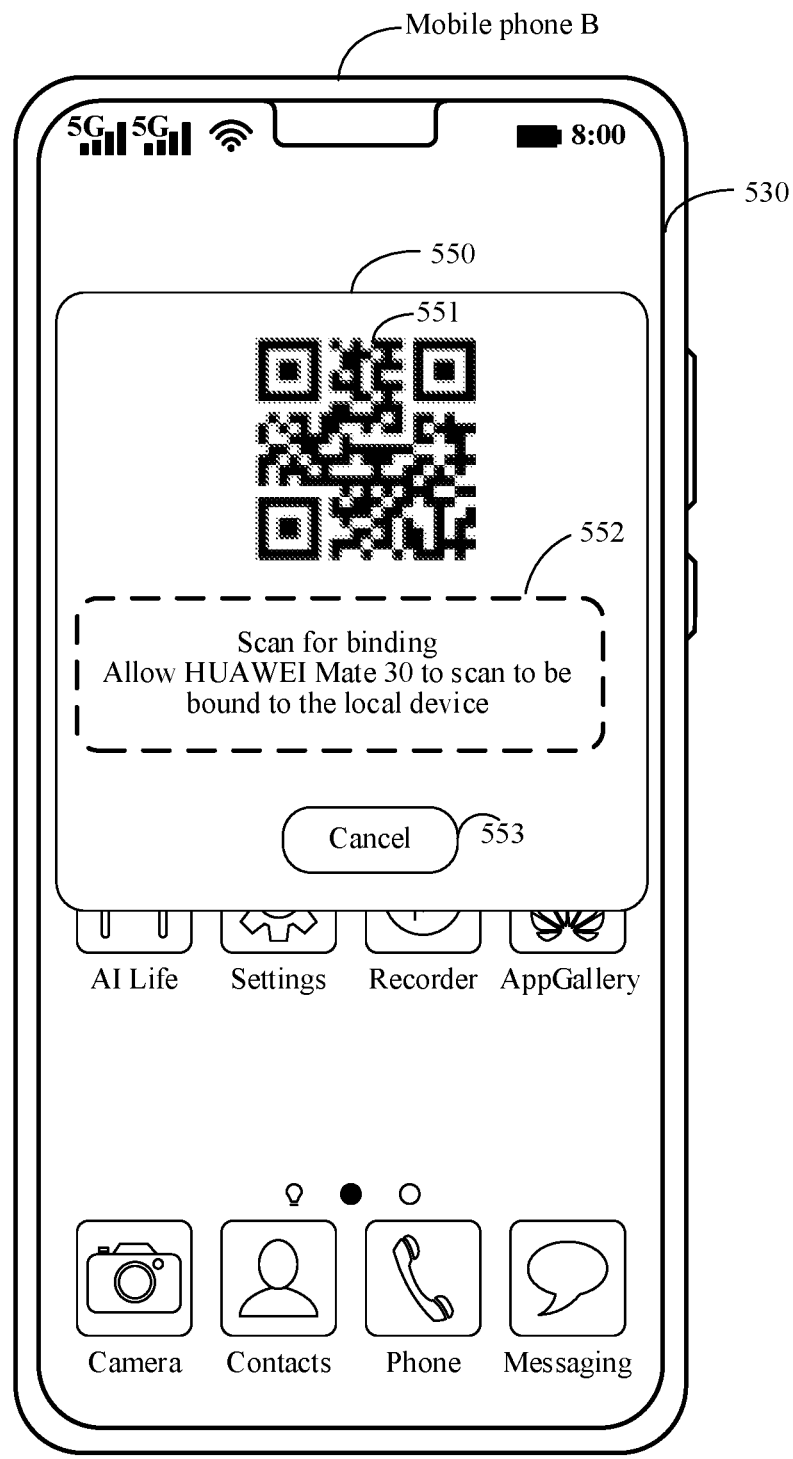
FIG. 6D is another schematic diagram of displaying according to an embodiment of this disclosure.

In a possible design, in response to the operation of tapping the "Trust" button by the user, as shown in FIG. 6D, the mobile phone B may return to the desktop 530, and display a pop-up box 550. The pop-up box 550 may include a two-dimensional code 551 generated by the mobile phone B, and may further include prompt information 552 "Scan for binding. Allow HUAWEI Mate 30 to scan to be bound to the local device". In this case, the user of the mobile phone A may scan, by using the mobile phone A, the two-dimensional code displayed by the mobile phone B, so that the mobile phone A is bound to the mobile phone B. The pop-up box 550 may further include a "Cancel" button 553. In response to an operation of tapping the "Cancel" button 553 by the user, the pop-up box 550 may be removed.

In some embodiments, if the mobile phone A and the mobile phone B log in to a same account (for example, a HUAWEI account), the mobile phone A may be directly bound to the mobile phone B (where for example, in FIG. 5F, the "Bind" button corresponding to the mobile phone B (HUAWEI P20) is tapped on the mobile phone A) without waiting for confirmation from the mobile phone B (for example, without waiting for the confirmation from the peer end as in FIG. 5G, or without scanning, as in FIG. 5H, the two-dimensional code displayed by the peer end).

Figure 7A:
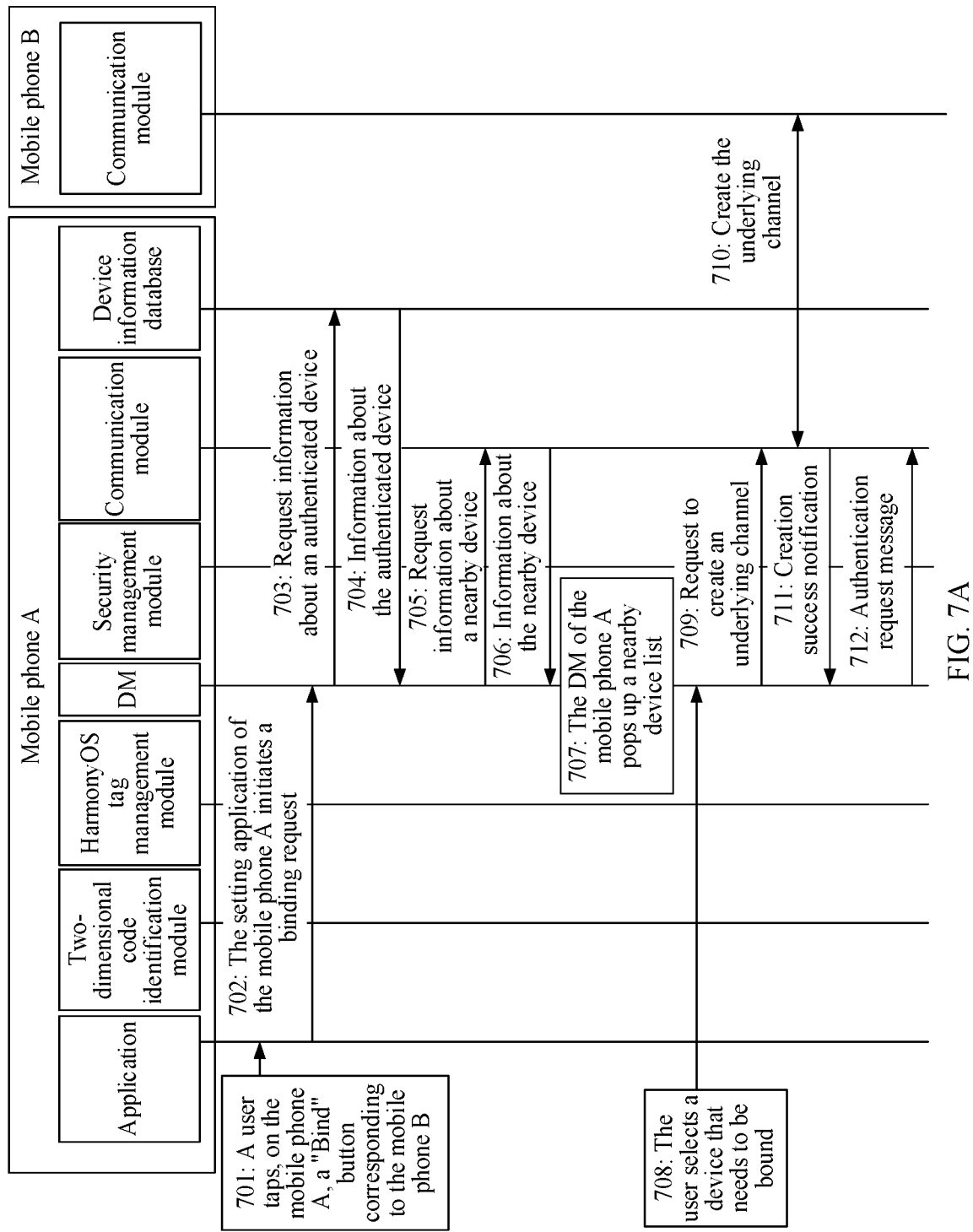
FIG. 7A is a schematic diagram of signal exchange according to an embodiment of this disclosure.

The following uses the mobile phone A and the mobile phone B as an example to describe a specific implementation of a device-level authentication method provided in embodiments of this disclosure. The mobile phone A and the mobile phone B are devices with different accounts. As shown in FIG. 7A, the method includes the following steps.

701: A user triggers, on the mobile phone A, an operation of binding the mobile phone B.

For example, the user may tap, on the mobile phone A, a "Bind" button corresponding to the mobile phone B. For example, as shown in FIG. 5F, the mobile phone A performs step 702 in response to an operation of tapping, by the user on the mobile phone A, the "Bind" button 509 corresponding to the mobile phone B (HUAWEI P20).

702: A setting application of the mobile phone A initiates a binding request to a DM of the mobile phone A.

The setting application is an application named "Settings". The setting application is for configuration of a basic function of the mobile phone A, for example, network configuration, display and brightness configuration, sound and vibration configuration, and application management configuration.

Information carried in the binding request may include a name (for example, HUAWEI MATE 30) of the mobile phone A.

703: Optionally, after receiving the binding request sent by the setting application, the DM of the mobile phone A requests information about an authenticated device from a device information database of the mobile phone A.

The DM of the mobile phone A may read the information about the authenticated device from the device information database. The device information database stores the information about the device that has performed authentication with the mobile phone A. The information about the authenticated device may include a device name and a device identifier (ID). The device ID may be, for example, an international mobile equipment identity (IMEI). For example, the information about the device that has performed authentication with the mobile phone A may be enumerated in Table 1.

TABLE 1

| Device name | Device ID (IMEI) |
| --- | --- |
| kiki's Mate pad | 123456XXXXXXX |
| kiki's Mate book pro | 654321XXXXXXX |

704: Optionally, the device information database of the mobile phone A returns the information about the authenticated device to the DM of the mobile phone A.

In a possible design, after the mobile phone A and the mobile phone B are mutually authenticated, the information about the authenticated device may include information about the mobile phone B.

It should be understood that when the mobile phone A and the mobile phone B perform device-level authentication, step 703 and step 704 are optional. If step 703 and step 704 are performed, in other words, if the information about the authenticated device is obtained, the mobile phone A may present the authenticated device to the user. The authenticated device may be in a bound state by default, or may be re-bound.

Step 703 and step 704 are a schematic implementation of obtaining the information about the authenticated device by the DM of the mobile phone A. The DM of the mobile phone A may alternatively obtain the information about the authenticated device in another manner (for example, by reading the information about the authenticated device from preset storage space). This is not limited in this disclosure.

705: The DM of the mobile phone A requests information about a nearby device from a communication module of the mobile phone A.

The device manager may call the communication module of the device A by using a resident service to continuously send a broadcast to surroundings. In this way, the device manager may discover a total quantity of near-field devices (namely, all devices in near-field communication, where the near-field communication may include WI-FI communication, BLUETOOTH communication, and the like) by registering a broadcast monitoring service. Further with reference to the information, about the authenticated device, that is read from the device information database, the DM may display, in an icon form, the authenticated device (for example, kiki's Mate pad and kiki's Mate book pro shown in FIG. 5E) and an unauthenticated device (for example, Room's television, HUAWEI P20, and Mate book X pro shown in FIG. 5F) in the total quantity of near-field devices by category.

It should be noted that there is no necessary execution sequence between step 703 and step 705. This is not limited in this embodiment.

706: The communication module of the mobile phone A returns the information about the nearby device to the DM of the mobile phone A.

707: The DM of the mobile phone A pops up a nearby device list.

As shown in FIG. 5F, the DM of the mobile phone A may call a pop-up box capability, to pop up the pop-up box 508 (namely, the nearby device list) on a display screen of the mobile phone A. The pop-up box 508 includes nearby devices such as Room's television, HUAWEI P20, and Mate book X pro.

708: The user selects a device that needs to be bound.

For example, as shown in FIG. 5F, the user may select, from the nearby device list, the device that needs to be bound. For example, the user may select HUAWEI P20 (namely, the mobile phone B).

709: The DM of the mobile phone A requests the communication module of the mobile phone A to create an underlying channel.

The underlying channel may be a BLUETOOTH channel, a WI-FI channel, or the like. This is not limited in this disclosure.

710: The communication module of the mobile phone A exchanges information with a communication module of the mobile phone B to create the underlying channel.

711: Optionally, the communication module of the mobile phone A sends a creation success notification to the DM of the mobile phone A.

To be specific, the communication module of the mobile phone A sends an underlying channel creation success notification to the DM of the mobile phone A, where the underlying channel creation success notification indicates that the underlying channel is successfully created between the communication module of the mobile phone A and the communication module of the mobile phone B.

It should be understood that when the mobile phone A and the mobile phone B perform device-level authentication, step 711 is optional. If step 711 is performed, the DM of the mobile phone A may subsequently learn in time that the underlying channel is successfully created, so that data can be subsequently transmitted through the underlying channel. Alternatively, creation success of the underlying channel may be learned of in another manner. For example, if an underlying channel creation failure notification is not received within a preset period of time, it may be considered that the underlying channel is successfully created.

712: The DM of the mobile phone A sends an authentication request message to the mobile phone B through the communication module of the mobile phone A.

The authentication request message may include an identifier (for example, a name or an ID) of the mobile phone A and identity authentication information generated by the mobile phone A, and the identity authentication information generated by the mobile phone A may include a token generated by the mobile phone A. The name of the mobile phone A may be, for example, HUAWEI MATE30. The token may be, for example, a random character string having several bits.

The token may be for identity authentication. In this embodiment of this disclosure, the mobile phone A may send the token to the mobile phone B. The token may be a device number/device media access controller (MAC) address of the mobile phone A, or may be another identifier for determining the mobile phone A. After receiving the token of the mobile phone A, the mobile phone B may add information about the token to a two-dimensional code image subsequently generated by the mobile phone B, so that the two-dimensional code image can be used only by the mobile phone A.

Figure 7B:
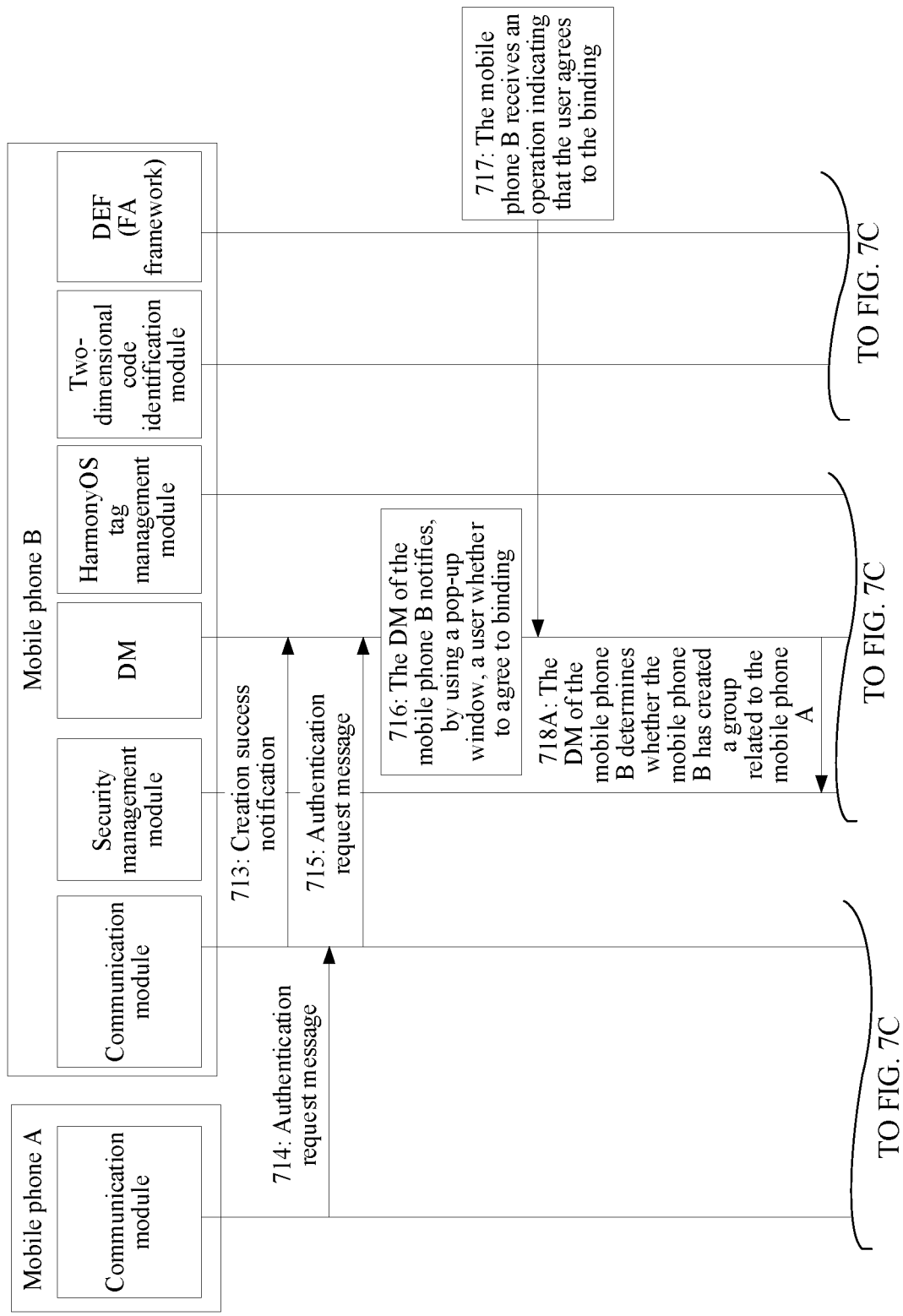
FIG. 7B and FIG. 7C are another schematic diagram of signal exchange according to an embodiment of this disclosure.
Figure 7C:
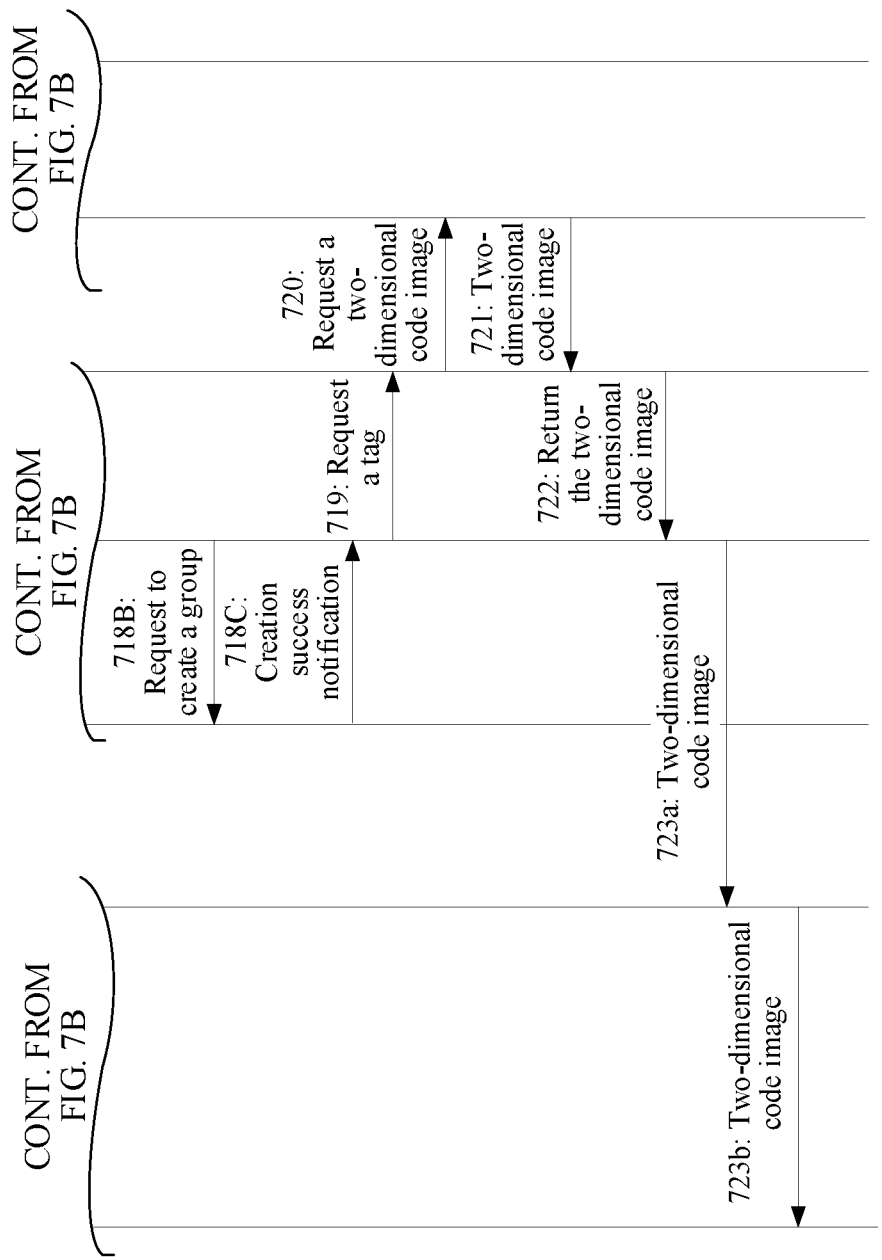

As shown in FIG. 7B and FIG. 7C, the foregoing method further includes the following steps.

713: Optionally, the communication module of the mobile phone B sends a creation success notification to a DM of the mobile phone B.

To be specific, the communication module of the mobile phone B sends an underlying channel creation success notification to the DM of the mobile phone B, where the underlying channel creation success notification indicates that the underlying channel is successfully created between the communication module of the mobile phone B and the communication module of the mobile phone A.

It should be understood that when the mobile phone A and the mobile phone B perform device-level authentication, step 713 is optional. If step 713 is performed, the DM of the mobile phone B may subsequently learn in time that the underlying channel is successfully created, so that the data can be subsequently transmitted through the underlying channel. Alternatively, the creation success of the underlying channel may be learned of in another manner. For example, if an underlying channel creation failure notification is not received within a preset period of time, it may be considered that the underlying channel is successfully created.

It should be noted that there is no necessary execution sequence between step 711 and step 713. This is not limited in this embodiment.

714: The communication module of the mobile phone A sends the authentication request message to the communication module of the mobile phone B.

The communication module of the mobile phone A may send the authentication request message to the communication module of the mobile phone B through the underlying channel.

715: The communication module of the mobile phone B forwards the authentication request message to the DM of the mobile phone B.

It may be understood that step 712, step 714, and step 715 are for describing a process in which the mobile phone A sends the authentication request message to the mobile phone B. The DM of the mobile phone A and the DM of the mobile phone B need to communicate with each other through the communication module of the mobile phone A and the communication module of the mobile phone B respectively. Certainly, the DM of the mobile phone A and the DM of the mobile phone B may alternatively communicate with each other through another module, or may each have a communication capability and can directly communicate with each other. This is not limited in this disclosure.

716: Optionally, the DM of the mobile phone B notifies, by using a pop-up window, a user whether to agree to the binding.

For example, as shown in FIG. 6A, the mobile phone A may pop up the pop-up box 531. The pop-up box 531 may include the prompt information 532 "HUAWEI Mate 30 requests to be bound to the local device. Is the device trusted?", and may further include the "Distrust" button 533 and the "Trust" button 534.

717: Optionally, the mobile phone B receives an operation indicating that the user agrees to the binding.

For example, as shown in FIG. 6A, that the user taps the "Trust" button 534 may indicate that the user agrees to the binding.

If the user agrees (for example, as shown in FIG. 6A, if the user taps the "Trust" button 534), the DM of the mobile phone B may return, to the DM of the mobile phone A through the communication module, information indicating that the user agrees, and the mobile phone A may notify the user to actively scan a two-dimensional code (the two-dimensional code image) displayed by a peer end (the mobile phone B).

In addition, if the user does not agree (for example, if the user taps the "Distrust" button 533), the DM of the mobile phone B may return, to the DM of the mobile phone A through the communication module, information indicating that the user does not agree, the mobile phone A may display the prompt information shown in FIG. 5K, and the binding fails.

It should be understood that when the mobile phone A and the mobile phone B perform device-level authentication, step 716 and step 717 may be optional. For example, if the mobile phone A and the mobile phone B log in to a same account, or set a service, for example, a familiarity number service, the mobile phone B may directly perform step 718A and a subsequent necessary step without requesting the user whether to agree to the binding.

Step 716 and step 717 are an implementation in which the mobile phone B notifies the user whether to agree to the binding. The mobile phone B may alternatively notify the user in another manner, for example, by using a background system notification message. This is not limited in this disclosure.

718A: The DM of the mobile phone B determines whether the mobile phone B has created a group related to the mobile phone A.

The DM of the mobile phone B may query, from HiChain of the mobile phone B, whether the mobile phone B has created a public group related to the mobile phone A. HiChain of the mobile phone B may store information about all groups created by the mobile phone B, where the groups include a public group and a private group. The public group may be a group created at a granularity of a device. For example, if two devices belong to one public group, it indicates that the device-level authentication has been performed between the two devices, and all applications of the two devices can securely communicate with each other. The private group is a group created at a granularity of a device and an application. For example, a first application of a first device may perform application-level authentication with a second application of a second device. After the application-level authentication, the first application and the second application belong to one private group. In this case, the first application and the second application may securely communicate with each other (for example, may securely share data). Identifiers of the first application and the second application may be the same or different. This is not limited in this disclosure. If same applications respectively corresponding to two devices belong to one private group, it indicates that the application-level authentication has been performed between the two devices, and the specific applications respectively corresponding to the two devices can securely communicate with each other. For example, the information about all the groups created by the mobile phone B may be enumerated in Table 2.

TABLE 2

| Public group | Private group |
| --- | --- |
| Group 1 (mobile phone B and mobile phone C) | Group 3 (application 1 of the mobile phone B and application 2 of a mobile phone D) |
| Group 2 (mobile phone B and mobile phone D) | Group 4 (application 1 of the mobile phone B and application 3 of a mobile phone E) |

Optionally, the group 1 and the group 2 in Table 2 may be combined into a group, for example, a group 5 (the mobile phone B, the mobile phone C, and the mobile phone D), including three members. In this way, the mobile phone A may search the group 5 for a device that has performed device-level authentication with the mobile phone A, without traversing the public groups created between every two devices.

Optionally, the group 3 and the group 4 in Table 2 may be combined into a group, for example, a group 6 (the application 1 of the mobile phone B, the application 2 of the mobile phone D, and the application 3 of the mobile phone E), including three members. In this way, the mobile phone A may search the group 6 for an application of a device that has performed application-level authentication with the mobile phone A, without traversing the private groups created between every two applications.

718B: If the mobile phone B has not created the group related to the mobile phone A, the DM of the mobile phone B requests a security management module of the mobile phone B to create a group.

The security management module of the mobile phone B creates a group about the mobile phone A, and a group name is device IDs of the mobile phone A and the mobile phone B. Further, an attribute of the group between the mobile phone A and the mobile phone B may be set to public, in other words, all applications of the mobile phone A and the mobile phone B may communicate with each other.

718C: The security management module of the mobile phone B sends a group creation success notification to the DM of the mobile phone B.

It should be understood that step 718B and step 718C are a schematic manner of creating the group. Another manner of creating the group is not limited in this disclosure. For example, the DM of the mobile phone B may directly create the group.

719: The DM of the mobile phone B requests a tag from a HarmonyOS tag management module of the mobile phone B.

The HarmonyOS tag management module of the mobile phone B may generate the tag, where the tag includes authentication verification information and a session identifier of the mobile phone B, and the authentication verification information may include the token received from the mobile phone A. Alternatively, it may be considered that the authentication verification information includes the token received from the mobile phone A and the session identifier of the mobile phone B. The session identifier of the mobile phone B includes device connection information of the mobile phone B. For example, the session identifier of the mobile phone B includes a WI-FI address (for example, an Internet Protocol (IP) address and a port number) or a BLUETOOTH address of the mobile phone B.

The authentication verification information may further include a PIN corresponding to the group. The PIN may be, for example, a random number having several digits, for example, a random number having six digits or eight digits. In this embodiment of this disclosure, the mobile phone B may send the PIN corresponding to the group to the mobile phone A. When needing to join the group created by the mobile phone B, the mobile phone A may include the PIN corresponding to the group in a request. The mobile phone B determines that the PIN included by the mobile phone A is correct (in other words, is sent by the mobile phone B to the mobile phone A), considers that the mobile phone A is secure and trusted, and allows the mobile phone A to join the group created by the mobile phone B.

720: The HarmonyOS tag management module of the mobile phone B requests a two-dimensional code image (BitMap) of the authentication verification information from a two-dimensional code identification module of the mobile phone B.

The two-dimensional code identification module of the mobile phone B may assemble the two-dimensional code image based on the authentication verification information. It should be noted that an example in which an identifier is the two-dimensional code image is used in the foregoing embodiment for description. The two-dimensional code image may be replaced with another type of identifier, for example, a bar code or a character string. This is not limited in this disclosure.

721: The two-dimensional code identification module of the mobile phone B returns the two-dimensional code image to the HarmonyOS tag management module of the mobile phone B.

722: The HarmonyOS tag management module of the mobile phone B returns the two-dimensional code image to the DM of the mobile phone B.

723*a*: Optionally, the DM of the mobile phone B sends the two-dimensional code image to the communication module of the mobile phone B.

In a possible design, the DM of the mobile phone B may send the two-dimensional code image of the mobile phone B to the mobile phone A through the communication module of the mobile phone B, so that the mobile phone A performs internal scanning on the two-dimensional code image, in other words, step 723*b* to step 725 may be performed after step 723*a*. In another possible design, the mobile phone B may display the two-dimensional code image of the mobile phone B on a display interface (for example, the display interface shown in FIG. 6D) of the mobile phone B, so that the mobile phone A directly scans the two-dimensional code image, and a two-dimensional code identification module in the mobile phone A can directly obtain the two-dimensional code image generated by the mobile phone B, to skip step 723*b* to step 725. Both the foregoing two designs can implement technical effects of this solution. This is not limited in this disclosure.

723*b*: Optionally, the communication module of the mobile phone B sends the two-dimensional code image to the communication module of the mobile phone A.

The DM of the mobile phone A may trigger the two-dimensional code identification module, to scan, through the two-dimensional code identification module, the two-dimensional code image generated by the mobile phone B.

Figure 7D:
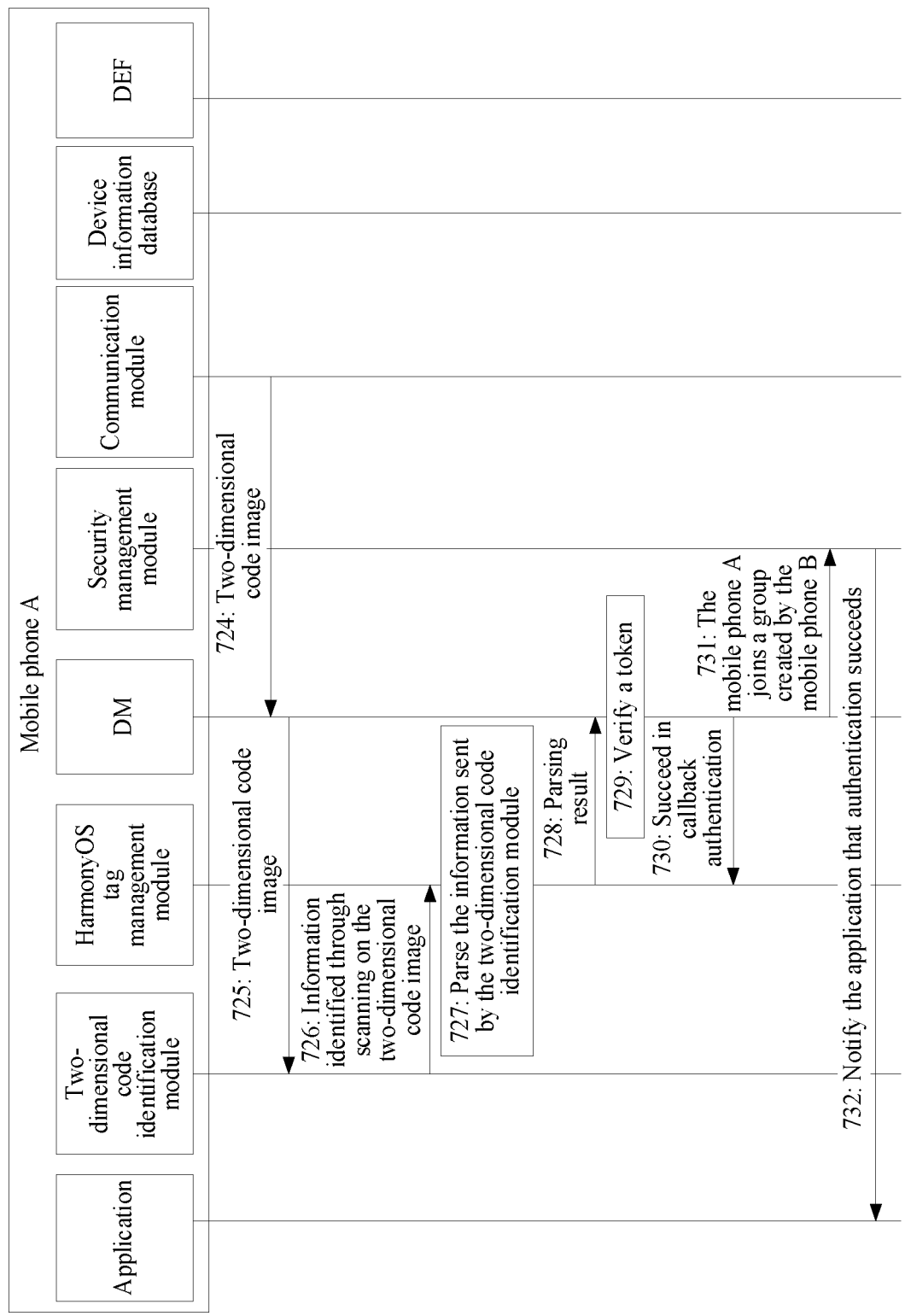
FIG. 7D is another schematic diagram of signal exchange according to an embodiment of this disclosure.

As shown in FIG. 7D, the foregoing method further includes the following steps.

724: Optionally, the communication module of the mobile phone A sends the two-dimensional code image to the DM of the mobile phone A.

725: Optionally, the DM of the mobile phone A sends the two-dimensional code image to the two-dimensional code identification module of the mobile phone A.

726: The two-dimensional code identification module of the mobile phone A scans the two-dimensional code image, and sends identified information to a HarmonyOS tag management module of the mobile phone A.

727: The HarmonyOS tag management module of the mobile phone A parses the information sent by the two-dimensional code identification module, to obtain a parsing result.

The parsing result may include information such as a token, a PIN, and the session identifier of the mobile phone B.

728: The HarmonyOS tag management module of the mobile phone A sends the parsing result to the DM of the mobile phone A.

It may be understood that step 724 to step 728 are a schematic implementation in which the mobile phone A processes the two-dimensional code image. The mobile phone A may alternatively process the two-dimensional code image in another manner. This is not limited in this disclosure. For example, the DM of the mobile phone A may integrate a two-dimensional code image processing function, so that the DM of the mobile phone A can directly scan and parse the two-dimensional code image to obtain the information such as the token, the PIN, and the session identifier of the mobile phone B.

729: The DM of the mobile phone A verifies the token.

If the token received from the mobile phone B is the same as the token carried in the authentication request message, step 730 is performed.

730: The DM of the mobile phone A succeeds in callback authentication.

It should be understood that when the mobile phone A and the mobile phone B perform device-level authentication, step 729 and step 730 are optional. If step 729 and step 730 are performed, in other words, if the DM of the mobile phone A verifies the token, security of communication between the mobile phone A and the mobile phone B can be better ensured. 731: The mobile phone A joins the public group created by the mobile phone B.

The DM of the mobile phone A determines the WI-FI address or the BLUETOOTH address of the mobile phone B based on the session identifier, and applies to a security module of the mobile phone A for joining the group created by the mobile phone B.

The security module of the mobile phone A creates an underlying communication channel by using the WI-FI address or the BLUETOOTH address, and sends a group join request to the mobile phone B, where the group join request may include a group ID. Optionally, the group join request may further include a PIN. The mobile phone B receives the group join request, and may verify the PIN. After authentication succeeds (to be specific, the PIN is the same as the PIN in the two-dimensional code image), the two devices join the same group (where group members in the group may include the mobile phone A and the mobile phone B, and the attribute of the group is being public), to complete the authentication.

In a possible implementation, after the mobile phone B receives the group join request and the authentication succeeds, the mobile phone B sends a response message to the mobile phone A, where the response message indicates that the mobile phone A has joined the public group created by the mobile phone B.

732: The security management module of the mobile phone A notifies the application (the setting application) that the authentication succeeds.

The mobile phone A may locally store information about the group. The information about the group may include the group members (where the group members in the group may include the mobile phone A and the mobile phone B), and may further include the group name and attribute information (where for example, the attribute is being public) of the group.

In this way, the device-level authentication between the mobile phone A and the mobile phone B is completed, and all the applications of the mobile phone A and the mobile phone B can communicate with each other. For example, a live streaming application, a karaoke application, a shopping application, and a mailbox application of the mobile phone A may communicate with a live streaming application, a karaoke application, a shopping application, and a mailbox application of the mobile phone B.

In some embodiments, if one of the mobile phone A and the mobile phone B logs in to an account (for example, a HUAWEI account), and the other one does not log in to the account, the mobile phone A and the mobile phone B may perform all or a part of step 701 to step 732. In this way, verification (namely, the device-level authentication) is performed when the mobile phone A is bound to the mobile phone B, to ensure security of data between the devices.

In some embodiments, if neither of the mobile phone A and the mobile phone B logs in to an account (for example, a HUAWEI account), the mobile phone A and the mobile phone B may perform step 701 to step 732. In this way, verification is performed when the mobile phone A is bound to the mobile phone B, to ensure security of data between the devices.

In some embodiments, if the mobile phone A and the mobile phone B log in to a same account (for example, a HUAWEI account), the mobile phone A and the mobile phone B may perform step 701 to step 732. In this way, verification is performed when the mobile phone A is bound to the mobile phone B, to further ensure security of data between the devices.

It should be noted that a part of step 701 to step 732 may be optional, in other words, are not necessarily technical features of the device-level authentication solution. For example, step 703 and step 704 may be optional steps, in other words, the authenticated device may not be queried, and the nearby device is directly viewed. For another example, step 711 and step 713 may be optional steps, in other words, the creation success notification may not be sent. For another example, step 716 and step 717 may be optional steps, in other words, the binding may be directly performed without confirmation of the user. For another example, step 723b to step 725 may be optional steps. In this case, the mobile phone A may directly obtain the two-dimensional code image generated by the mobile phone B (for example, by scanning the two-dimensional code image displayed by the mobile phone B).

If the device-level authentication is not performed between the devices, the application-level authentication may be performed between applications of the devices, so that the specific applications can communicate with each other. With reference to a specific scenario, the following describes, by using a live streaming application as an example, a UI for the application-level authentication provided in embodiments of this disclosure.

With development of e-commerce, more people pay attention to a new sales channel, namely, live commerce. The live commerce requires not only clear photographing and accurate sound pick-up of a commerce device but also better interaction experience. One disadvantage of the live commerce is that a live streamer and clear commodity details cannot be simultaneously displayed in one camera shot. As a result, reality and recognition presented by an e-commerce show guide are reduced.

For a live streaming service, this disclosure provides a distributed presentation solution that is based on cross-device FA sharing. For example, a live streaming image of a mobile phone A (where the live streaming image of the device A may be considered as an FA, for example, FA1) may be shared to a mobile phone B, and the mobile phone B may simultaneously display the FA of the mobile phone A and a live streaming image of the mobile phone B (where the live streaming image of the device B may be considered as an FA, for example, FA2), to display one or more FAs across devices, omit complex switching of terminals by a user, and greatly reduce user operations. This disclosure does not require that the devices meet a requirement for using a same system or log in to a same device account (for example, a same Huawei account). Therefore, this disclosure is widely applicable.

Figure 8A:
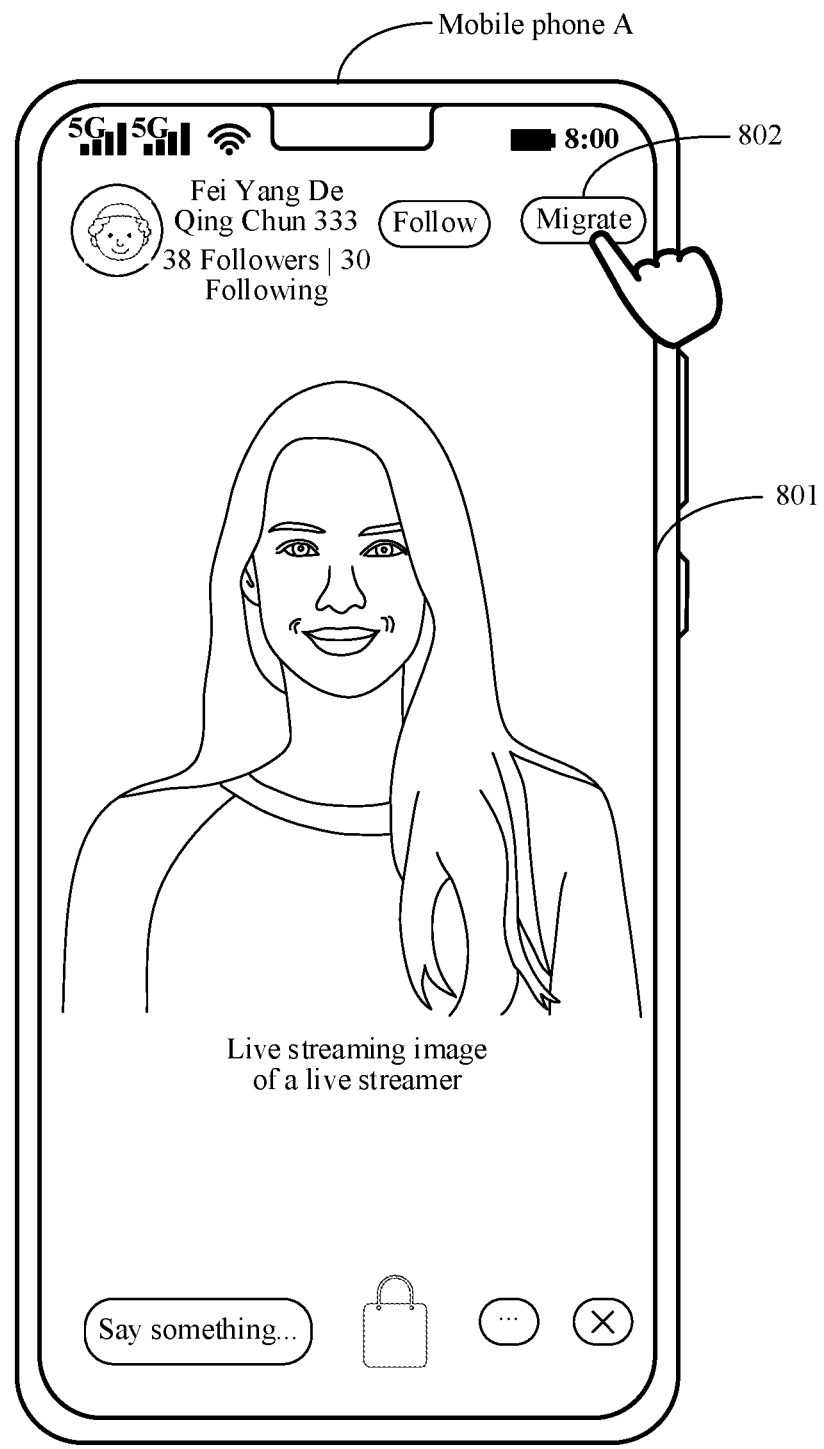
FIG. 8A is another schematic diagram of displaying according to an embodiment of this disclosure.
Figure 8B:
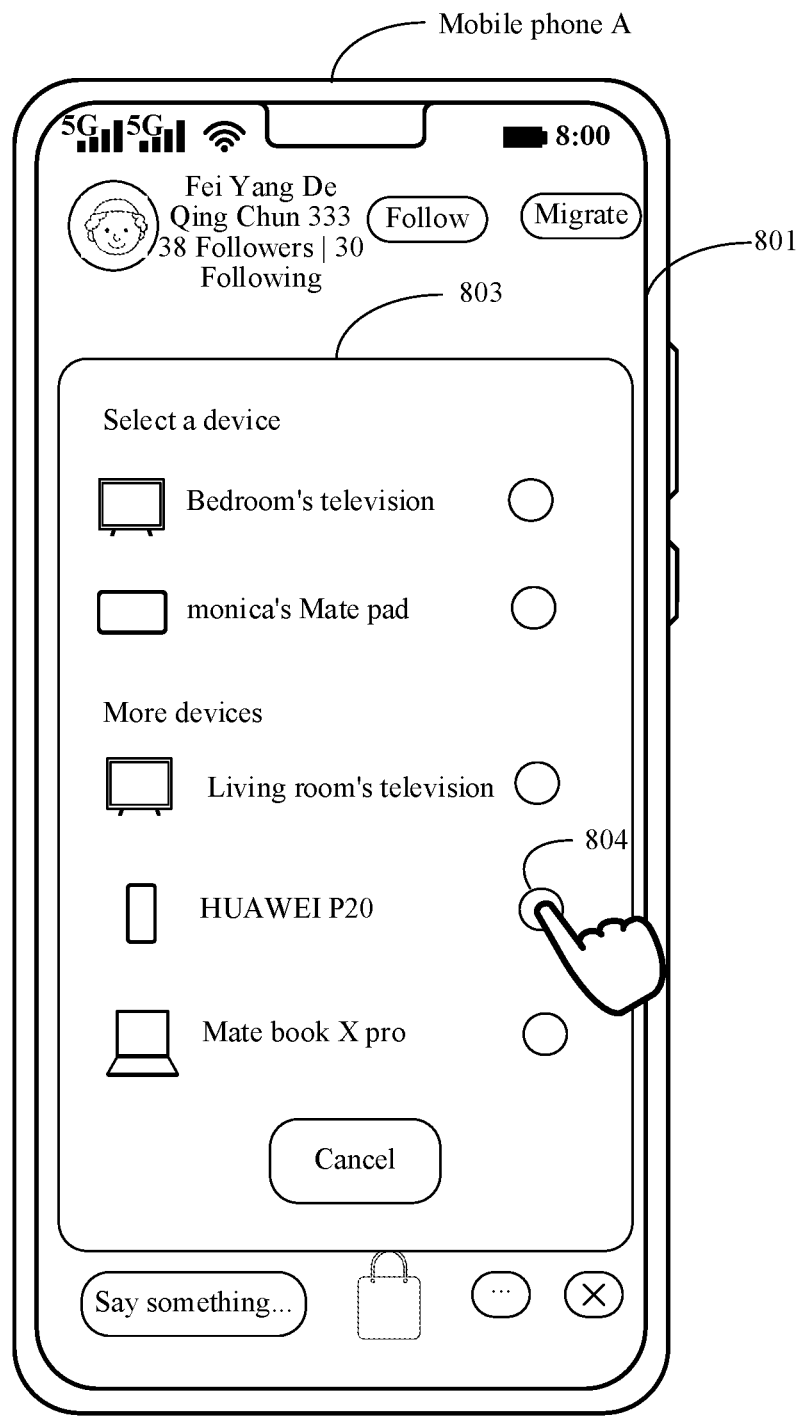
FIG. 8B and FIG. 8C are another schematic diagram of displaying according to an embodiment of this disclosure.
Figure 8C:
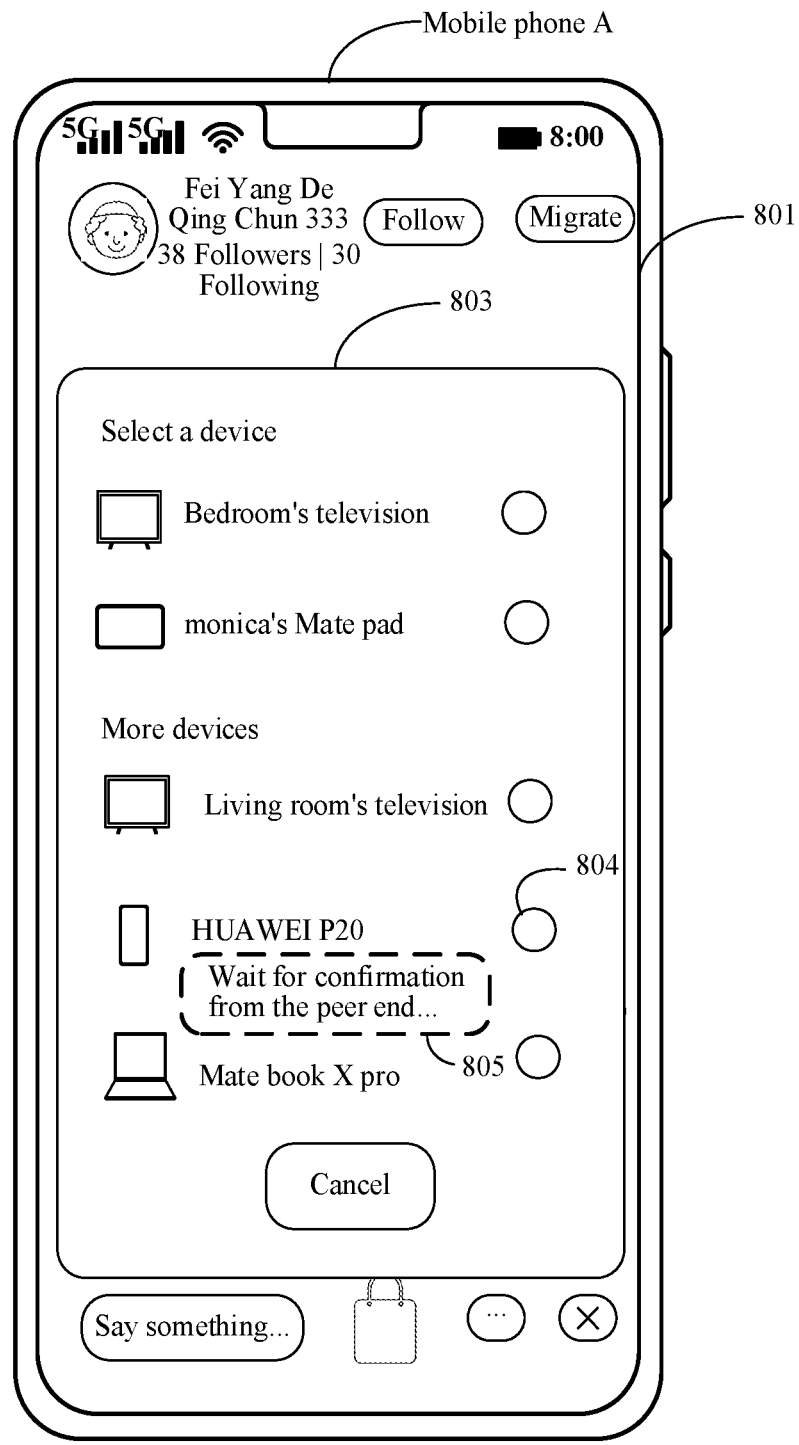
Figure 8D:
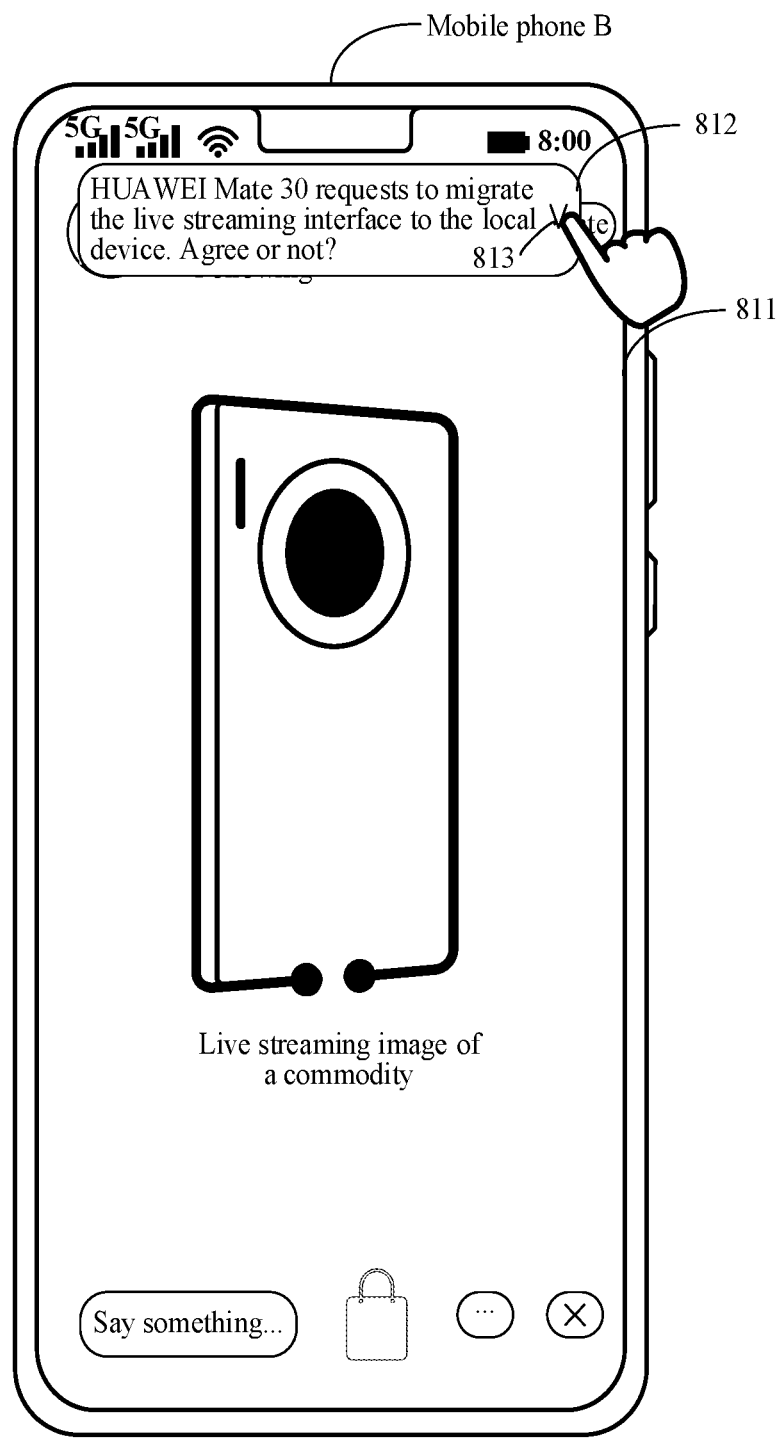
FIG. 8D, FIG. 8E, and FIG. 8F are another schematic diagram of displaying according to an embodiment of this disclosure.
Figure 8E:
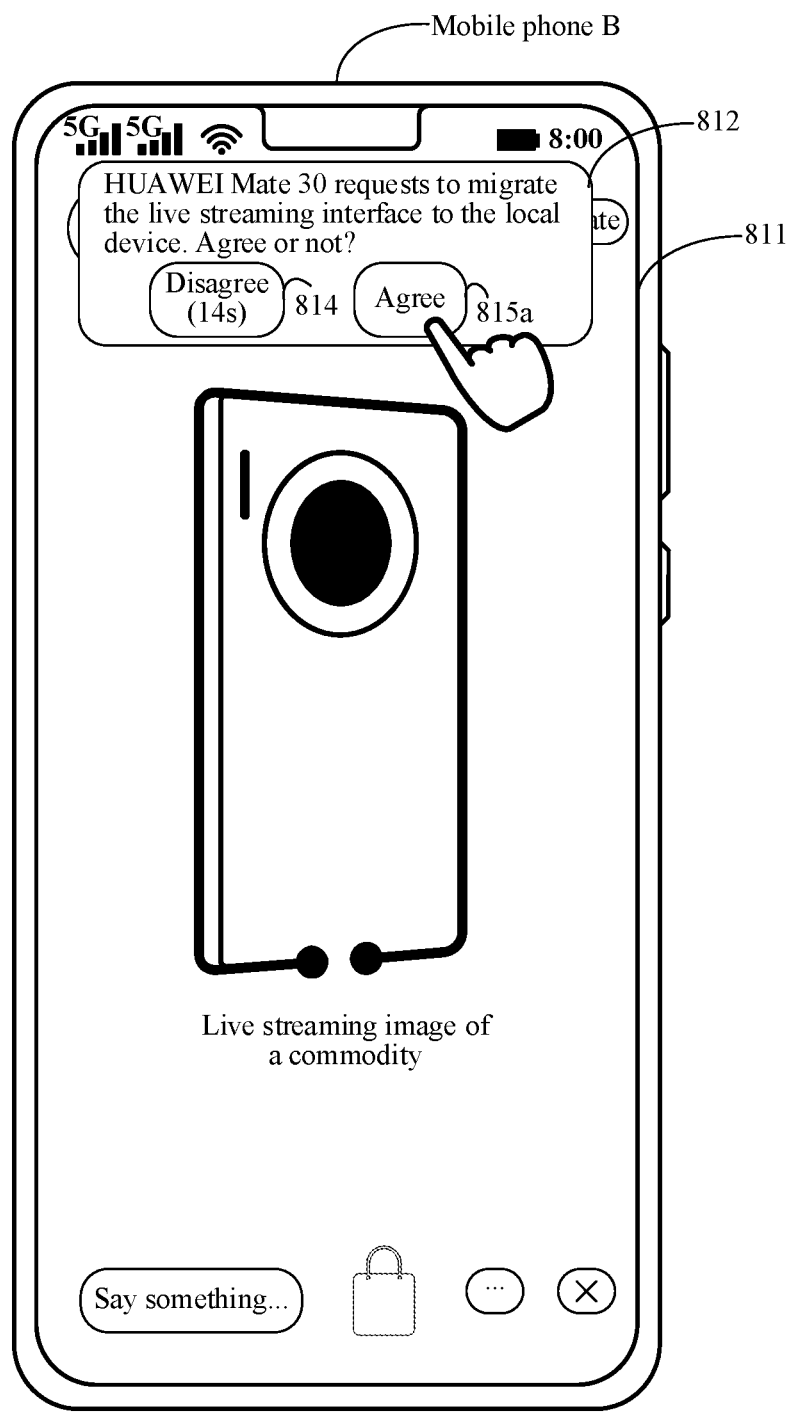
Figure 8F:
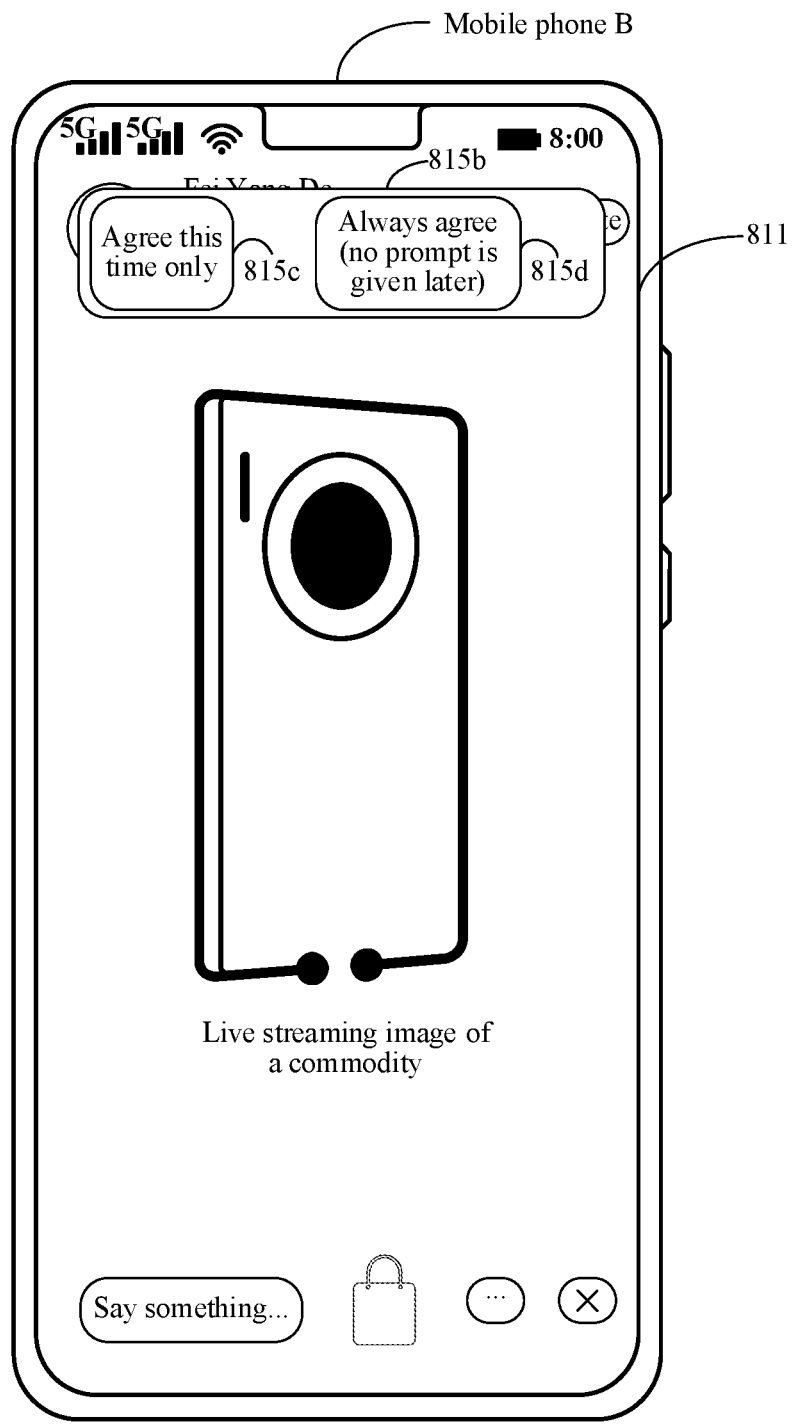

For example, as shown in FIG. 8A, after a user opens a live streaming application on a mobile phone A, the mobile phone A may display a live streaming interface 801. The live streaming interface 801 may include a "Migrate" button 802, and the "Migrate" button 802 is in an upper right corner of the interface 801. It should be understood that the "Migrate" button 802 may alternatively be located at a position, for example, a lower left corner, a lower right corner, or an upper right corner, of the interface 801. This is not limited in this disclosure. Certainly, text displayed on the button 802 may alternatively be other content, for example, "Share" or "Transfer". This is not limited in this disclosure. In response to an operation of tapping the "Migrate" button 802 (where the "Migrate" button 802 is for migrating (sending) the live streaming interface of the mobile phone A to another device (for example, a mobile phone B)) by the user in the live streaming interface 801, as shown in FIG. 8B, the mobile phone A may pop up a pop-up box 803. It should be understood that a manner of jumping between UIs is not limited in embodiments of this disclosure. For example, as shown in FIG. 8A, in response to an operation performed by the user with a specific gesture (for example, three-finger sliding or knuckle tapping), as shown in FIG. 8B, the mobile phone may display the pop-up box 803. The pop-up box 803 may include nearby devices, and the nearby devices include authenticated devices (Bedroom's television, monica's Mate pad, and the like) and unauthenticated devices (Living room's television, HUAWEI P20, Mate book X pro, and the like). In response to an operation of tapping, by the user, a control 804 corresponding to HUAWEI P20 (an unauthenticated device), the mobile phone A may send an authentication request message to the mobile phone B. In addition, as shown in FIG. 8C, prompt information 805 "Wait for confirmation from the peer end" may be displayed below HUAWEI P20. As shown in FIG. 8D, if the mobile phone B (HUAWEI P20) receives, when displaying a live streaming interface 811, the authentication request message sent by the mobile phone A, the mobile phone B may display a pop-up box 812, where the pop-up box 812 includes prompt information "HUAWEI Mate 30 (the mobile phone A) requests to migrate the live streaming interface to the local device. Agree or not?". In response to an operation of tapping a drop-down button 813 by a user, as shown in FIG. 8E, the pop-up box 812 may display more content, for example, a "Disagree" button 814 and an "Agree" button 815a. Optionally, in response to an operation of tapping the "Agree" button 815a by the user, as shown in FIG. 8F, the mobile phone may display a pop-up box 815b.

Figure 8G:
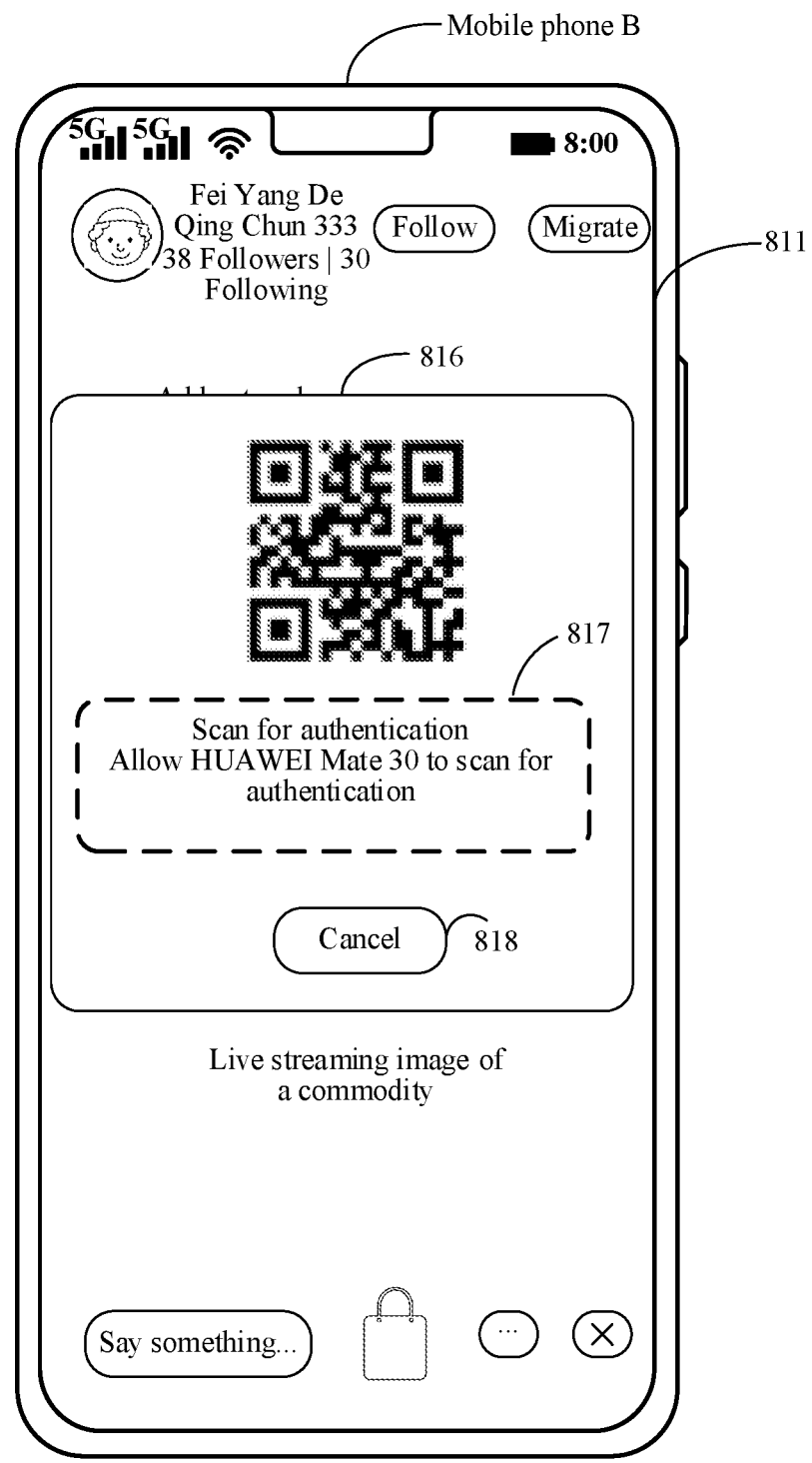
FIG. 8G is another schematic diagram of displaying according to an embodiment of this disclosure.
Figure 8H:
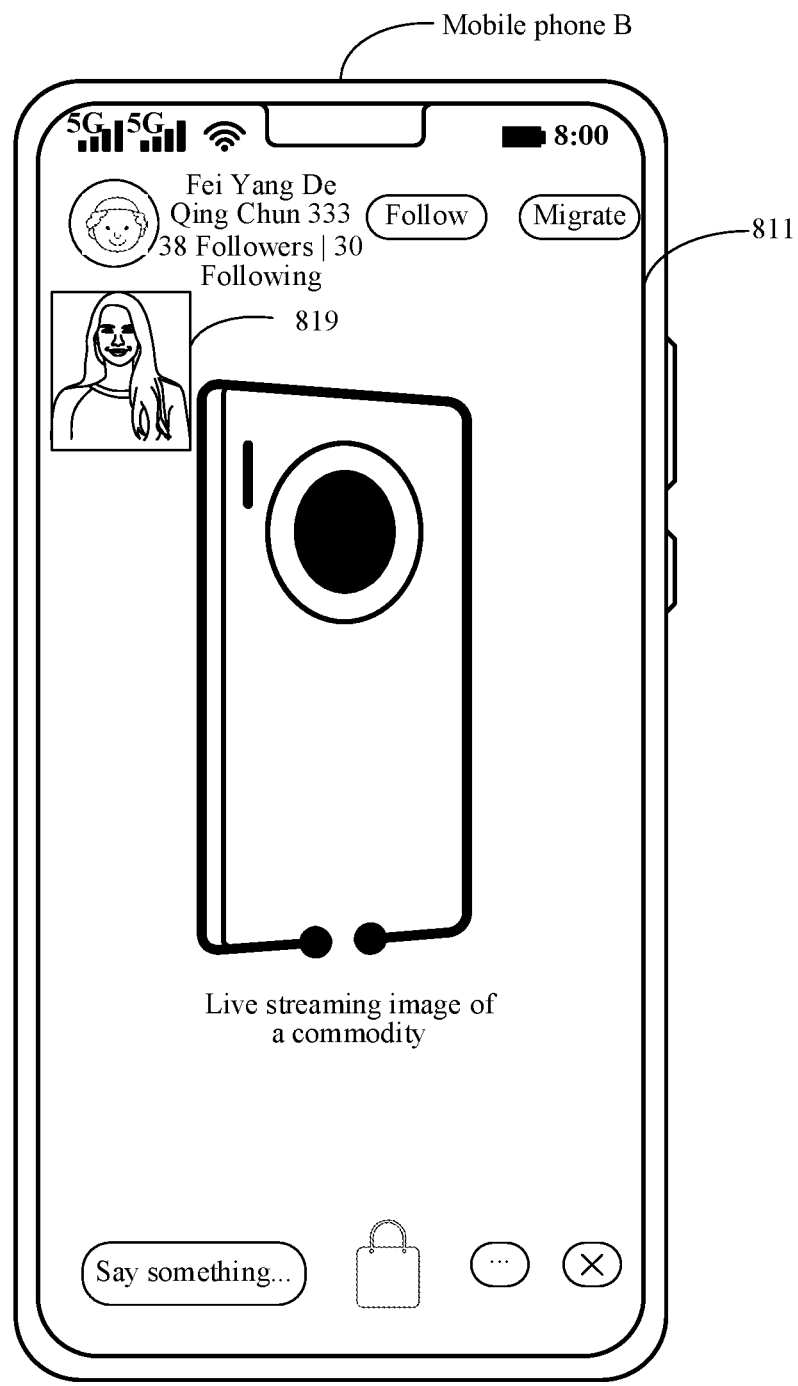
FIG. 8H is another schematic diagram of displaying according to an embodiment of this disclosure.

The pop-up box 815*b* may include an "Agree this time only" button 815*c* and an "Always agree" (no prompt is given later) button 815*d*. In response to an operation of tapping the "Agree" button 815*a*, the "Agree this time only" button 815*c*, or the "Always agree" button 815*d* by the user, as shown in FIG. 8G, the mobile phone B may display a pop-up box 816. The pop-up box 816 may include a two-dimensional code image generated by the mobile phone B, and may further include prompt information 817 "Scan for authentication. Allow HUAWEI Mate 30 to scan for authentication". In this case, the user of the mobile phone A may scan the two-dimensional code image presented by the mobile phone B, and then the mobile phone B may receive the live streaming image (FA1) from the mobile phone A. As shown in FIG. 8H, the mobile phone B may display, in the live streaming interface 811, a live streaming interface 819 sent by the mobile phone A. Alternatively, in response to an operation of tapping the "Agree" button 815 by the user, the mobile phone B may receive the live streaming image (FA1) from the mobile phone A. As shown in FIG. 8H, the mobile phone B may display, in the live streaming interface 811, a live streaming interface 819 sent by the mobile phone A.

Figure 9A:
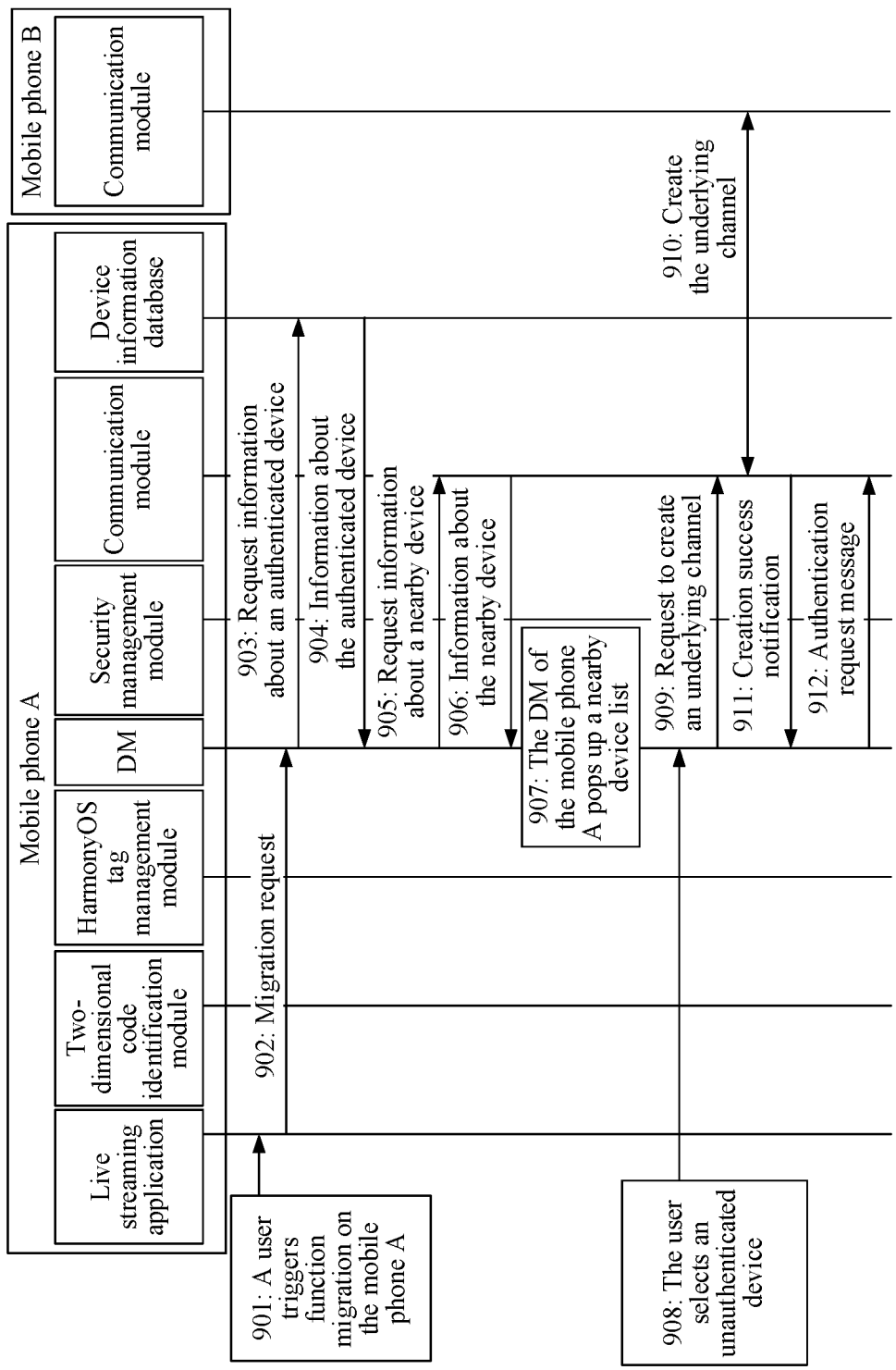
FIG. 9A is another schematic diagram of signal exchange according to an embodiment of this disclosure.

The following uses the live streaming application as an example to describe a specific implementation of the application-level authentication method provided in embodiments of this disclosure. A method provided in an embodiment of this disclosure may be applied to two near-field devices, for example, a mobile phone A and a mobile phone B. The mobile phone A and the mobile phone B are devices with different accounts (for example, do not log in to a same HUAWEI account), and a live streaming application is opened on both the mobile phone A and the mobile phone B. As shown in FIG. 9A, the method includes the following steps.

901: The mobile phone A receives an operation of triggering function migration by a user.

For example, as shown in FIG. 8A, the user may tap the "Migrate" button 802 when the mobile phone A is displaying a live stream of a live streamer. The "Migrate" button may also be referred to as a "Share" button, a "Send" button, or the like. This is not limited in this disclosure.

The user may trigger the function migration in another manner. For example, the user may trigger the function migration in a OneHop manner or a Scan manner. This is not limited in this disclosure.

902: An application (for example, the live streaming application) initiates a migration request to a DM of the mobile phone A.

Information carried in the migration request may include an initiating-end application identifier (a local live streaming application package name), a continuing-end application identifier (a peer live streaming application package name), and a name of the mobile phone A. The continuing-end package name may be provided by the application (for example, the live streaming application), and depends on a design made by an application vendor to the application. Details are not described herein.

In a possible design, the information carried in the migration request may be arranged in a preset sequence. For example, the preset sequence may be successively the name of the mobile phone A, the initiating-end application identifier, and the continuing-end application identifier. Alternatively, the preset sequence may be successively the initiating-end application identifier, the continuing-end application identifier, and the name of the mobile phone A.

903: Optionally, after receiving the migration request, the DM of the mobile phone A requests an authenticated device from a device information database of the mobile phone A.

For a specific process, refer to related descriptions in step 703. Details are not described herein again.

904: Optionally, the device information database of the mobile phone A returns information about the authenticated device to the DM of the mobile phone A.

It should be understood that when the mobile phone A and the mobile phone B perform device-level authentication, step 903 and step 904 are optional. If step 903 and step 904 are performed, in other words, if the information about the authenticated device is obtained, the mobile phone A may present the authenticated device to the user.

Step 903 and step 904 are a schematic implementation of obtaining the information about the authenticated device by the DM of the mobile phone A. The DM of the mobile phone A may alternatively obtain the information about the authenticated device in another manner (for example, by reading the information about the authenticated device from preset storage space). This is not limited in this disclosure.

905: The DM of the mobile phone A requests information about a nearby device from a communication module of the mobile phone A.

For a specific process, refer to related descriptions in step 705. Details are not described herein again.

906: The communication module of the mobile phone A returns the information about the nearby device to the DM of the mobile phone A.

907: The DM of the mobile phone A pops up a nearby device list.

The nearby device list may be, for example, the pop-up box 803 shown in FIG. 8B.

The user may select a device from the nearby device list. If an untrusted device (namely, an unauthenticated device with a different account (for example, a device that does not log in to a same Huawei account)) is selected, step 908 to step 936 may be performed after step 907 to perform application-level authentication. If a trusted device (for example, a device that logs in to a same Huawei account, or a previously authenticated device (where the authentication includes the device-level authentication or the application-level authentication)) is selected, an FA may be directly migrated, in other words, step 933 to step 936 may be directly performed after step 907.

908: The user selects the unauthenticated device.

For example, as shown in FIG. 8B, the user selects HUAWEI P20, and HUAWEI P20 is an untrusted device.

909: The DM of the mobile phone A requests the communication module of the mobile phone A to create an underlying channel.

The underlying channel may be a BLUETOOTH channel, a WI-FI channel, or the like. This is not limited in this disclosure.

910: The communication module of the mobile phone A exchanges information with a communication module of the mobile phone B to create the underlying channel.

911: Optionally, the communication module of the mobile phone A sends an underlying channel creation success notification to the DM of the mobile phone A.

It should be understood that when the mobile phone A and the mobile phone B perform device-level authentication, step 911 is optional. If step 911 is performed, the DM of the mobile phone A may subsequently learn in time that the underlying channel is successfully created, so that data can be subsequently transmitted through the underlying channel.

Alternatively, creation success of the underlying channel may be learned of in another manner. For example, if an underlying channel creation failure notification is not received within a preset period of time, it may be considered that the underlying channel is successfully created.

912: The DM of the mobile phone A sends an authentication request message to the mobile phone B through the communication module of the mobile phone A.

The authentication request message includes an initiating-end device name (for example, HUAWEI MATE30), an initiating-end package name (for example, com.zhibo.video), and a continuing-end package name (for example, com.zhibo.video). The authentication request message further includes a token generated by the mobile phone A.

Figure 9B:
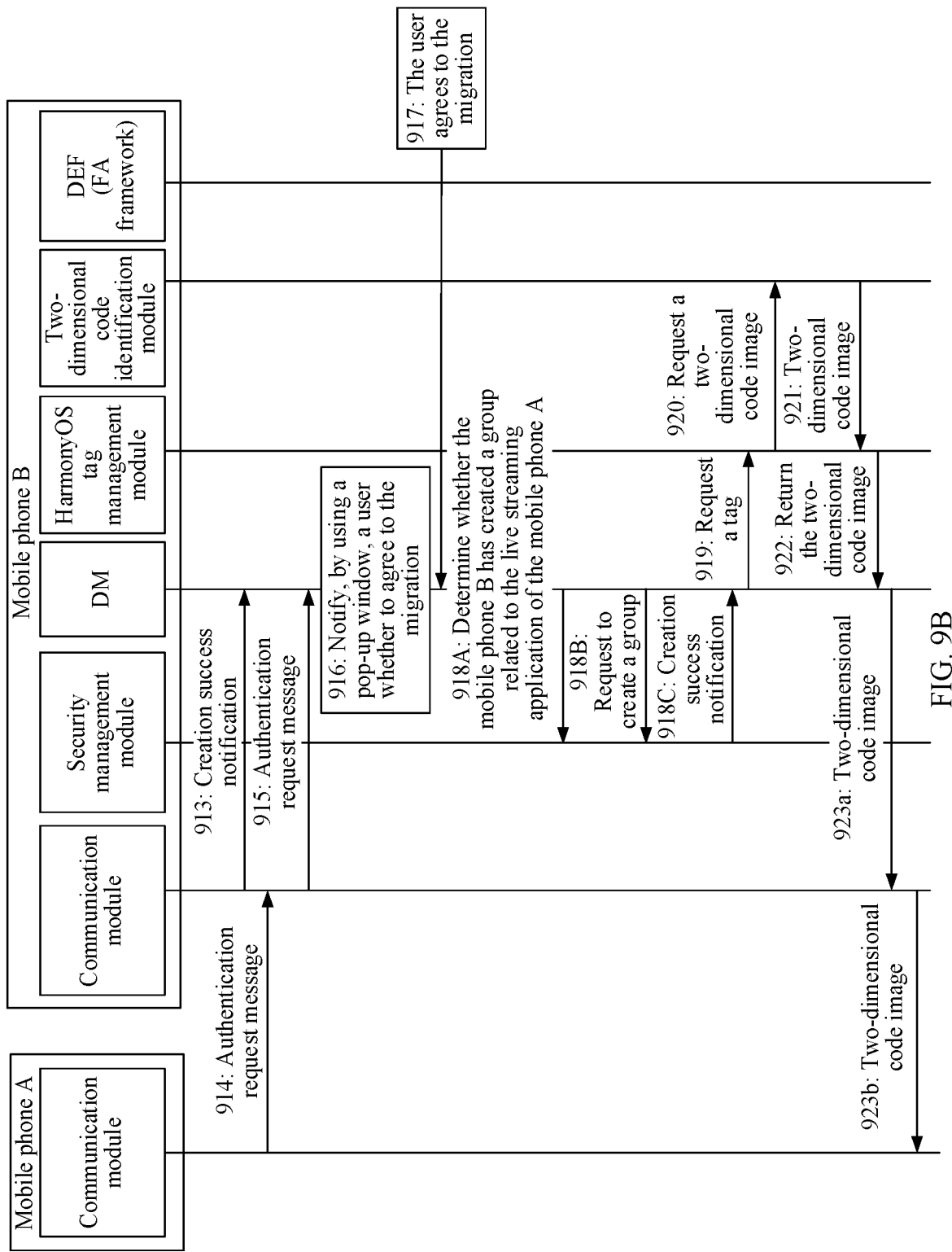
FIG. 9B is another schematic diagram of signal exchange according to an embodiment of this disclosure.

As shown in FIG. 9B, the foregoing method further includes the following steps.

913: Optionally, the communication module of the mobile phone B sends an underlying channel creation success notification to a DM of the mobile phone B.

It should be noted that there is no necessary execution sequence between step 911 and step 913. This is not limited in this embodiment.

It should be understood that when the mobile phone A and the mobile phone B perform device-level authentication, step 913 is optional. If step 913 is performed, the DM of the mobile phone B may subsequently learn in time that the underlying channel is successfully created, so that the data can be subsequently transmitted through the underlying channel. Alternatively, the creation success of the underlying channel may be learned of in another manner. For example, if an underlying channel creation failure notification is not received within a preset period of time, it may be considered that the underlying channel is successfully created.

914: The communication module of the mobile phone A sends the authentication request message to the communication module of the mobile phone B.

Information carried in the authentication request message may include the initiating-end application identifier, the continuing-end application identifier, and the name of the mobile phone A.

In a possible design, the information carried in the authentication request message may be arranged in a preset sequence. For example, the preset sequence may be successively the name of the mobile phone A, the initiating-end application identifier, and the continuing-end application identifier. Alternatively, the preset sequence may be successively the initiating-end application identifier, the continuing-end application identifier, and the name of the mobile phone A.

915: The communication module of the mobile phone B forwards the authentication request message to the DM of the mobile phone B.

It may be understood that step 912, step 914, and step 915 are for describing a process in which the mobile phone A sends the authentication request message to the mobile phone B. The DM of the mobile phone A and the DM of the mobile phone B need to communicate with each other through the communication module of the mobile phone A and the communication module of the mobile phone B respectively. Certainly, the DM of the mobile phone A and the DM of the mobile phone B may alternatively communicate with each other through another module, or may each have a communication capability and can directly communicate with each other. This is not limited in this disclosure.

916: Optionally, the DM of the mobile phone B notifies, by using a pop-up window, a user whether to agree to the migration.

For example, as shown in FIG. 8D, if the mobile phone B receives, when displaying the live streaming interface 811, the authentication request message sent by the mobile phone A, the mobile phone B may display the pop-up box 812, where the pop-up box 812 includes the prompt information "HUAWEI Mate 30 requests to migrate the live streaming interface to the local device. Agree or not?". In response to an operation of tapping the drop-down button 813 by the user, as shown in FIG. 8E, the pop-up box 812 may display more content, for example, the "Disagree" button 814 and the "Agree" button 815a.

Optionally, in response to an operation of tapping the "Agree" button 815a by the user, as shown in FIG. 8F, the mobile phone may display the pop-up box 815b. The pop-up box 815b may include the "Agree this time only" button 815c and the "Always agree" (no prompt is given later) button 815d. It should be understood that, in response to an operation of tapping the "Agree this time only" button 815c by the user, after the following step 917 to step 932 are performed, the mobile phone A may migrate a live streaming interface (namely, FA1) to the mobile phone B once. When the FA is migrated from the live streaming application of the mobile phone A to the live streaming application of the mobile phone B next time, authentication, for example, step 901 to step 932, needs to be performed again. In response to an operation of tapping the "Always agree" button 815d by the user, after the following step 917 to step 932 are performed, the FA may be always migrated from the live streaming application of the mobile phone A to the live streaming application of the mobile phone B, and authentication does not need to be performed again (where for example, step 901 to step 932 do not need to be performed again).

917: Optionally, the mobile phone B receives an operation indicating that the user agrees to the migration.

For example, as shown in FIG. 8E, the mobile phone B may receive an operation of tapping the "Agree" button 815a by the user.

If the user agrees (for example, if the user taps the "Agree" button 815a), the DM of the mobile phone B may return, to the DM of the mobile phone A through the communication module, information indicating that the user agrees, and the mobile phone A may notify the user to actively scan a two-dimensional code (a two-dimensional code image) displayed by a peer end (the mobile phone B).

In addition, if the user does not agree (for example, if the user taps the "Disagree" button 814), the DM of the mobile phone B may return, to the DM of the mobile phone A through the communication module, information indicating that the user does not agree, the mobile phone A may display the prompt information shown in FIG. 5K, and the migration fails.

It should be understood that when the mobile phone A and the mobile phone B perform device-level authentication, step 916 and step 917 may be optional. For example, if the mobile phone A and the mobile phone B log in to a same account, or set a service, for example, a familiarity number service, the mobile phone B may directly perform step 918A and a subsequent necessary step without requesting the user whether to agree to the migration.

Step 916 and step 917 are an implementation in which the mobile phone B notifies the user whether to agree to the migration. The mobile phone B may alternatively notify the user in another manner, for example, by using a background system notification message. This is not limited in this disclosure.

918A: The DM of the mobile phone B determines whether the mobile phone B has created a group related to the live streaming application of the mobile phone A.

The DM of the mobile phone B may query, from HiChain of the mobile phone B, whether the mobile phone B has created a private group related to the mobile phone A. For related descriptions, refer to step 718A. Details are not described herein again.

918B: If the mobile phone B has not created the group related to the live streaming application of the mobile phone A, the DM of the mobile phone B requests a security management module of the mobile phone B to create a group.

The security module of the mobile phone B may create a group about the live streaming application of the mobile phone A (where group members in the group may include the live streaming application of the mobile phone A and the live streaming application of the mobile phone B). Further, an attribute of the group may be set to private, to be specific, the group is applicable only to the specific application (the live streaming application).

Optionally, the mobile phone B may send, to the mobile phone A, a group ID of the group that is about the live streaming application of the mobile phone A and that is created by the mobile phone B. The mobile phone A may join, based on the group ID, the group created by the mobile phone B. Optionally, the mobile phone B may further send a device ID of the mobile phone B to the mobile phone A. The device ID of the mobile phone B may be used when the mobile phone A communicates with the mobile phone B, and may include a network ID (netId) and a device IP address (deviceIP).

918C: The security management module of the mobile phone B sends a group creation success notification to the DM of the mobile phone B.

It should be understood that step 918B and step 918C are a schematic manner of creating the group. Another manner of creating the group is not limited in this disclosure. For example, the DM of the mobile phone B may directly create the group.

919: The DM of the mobile phone B requests a tag from a HarmonyOS tag management module of the mobile phone B.

The HarmonyOS tag management module of the mobile phone B may generate the tag, where the tag includes authentication verification information, and the authentication verification information may include information such as the token received from the mobile phone A and a session identifier of the mobile phone B. The session identifier of the mobile phone B includes device connection information of the mobile phone B. For example, the session identifier of the mobile phone B includes a WI-FI address (for example, the IP address and a port number) or a BLUETOOTH address of the mobile phone B. The authentication verification information may further include a PIN corresponding to the group.

920: The HarmonyOS tag management module of the mobile phone B requests the two-dimensional code image of the authentication verification information from a two-dimensional code identification module of the mobile phone B.

The two-dimensional code identification module of the mobile phone B may assemble the two-dimensional code image based on the authentication verification information.

921: The two-dimensional code identification module of the mobile phone B returns the two-dimensional code image to the HarmonyOS tag management module of the mobile phone B.

922: The HarmonyOS tag management module of the mobile phone B returns the two-dimensional code image to the DM of the mobile phone B.

923a: Optionally, the DM of the mobile phone B sends the two-dimensional code image to the communication module of the mobile phone B.

In a possible design, the DM of the mobile phone B may send the two-dimensional code image of the mobile phone B to the mobile phone A, so that the mobile phone A performs internal scanning on the two-dimensional code image, in other words, step 923b to step 925 may be performed after step 923a. In another possible design, the mobile phone B may display the two-dimensional code image of the mobile phone B on a display interface (for example, the display interface shown in FIG. 8G) of the mobile phone B, so that the mobile phone A directly scans the two-dimensional code image, and a two-dimensional code identification module in the mobile phone A can directly obtain the two-dimensional code image generated by the mobile phone B, to skip step 923b to step 925. Both the foregoing two designs can implement technical effects of this solution. This is not limited in this disclosure.

923b: Optionally, the communication module of the mobile phone B sends the two-dimensional code image to the communication module of the mobile phone A.

The DM of the mobile phone A may trigger the two-dimensional code identification module, to scan, through the two-dimensional code identification module, the two-dimensional code image generated by the mobile phone B.

Figure 9C:
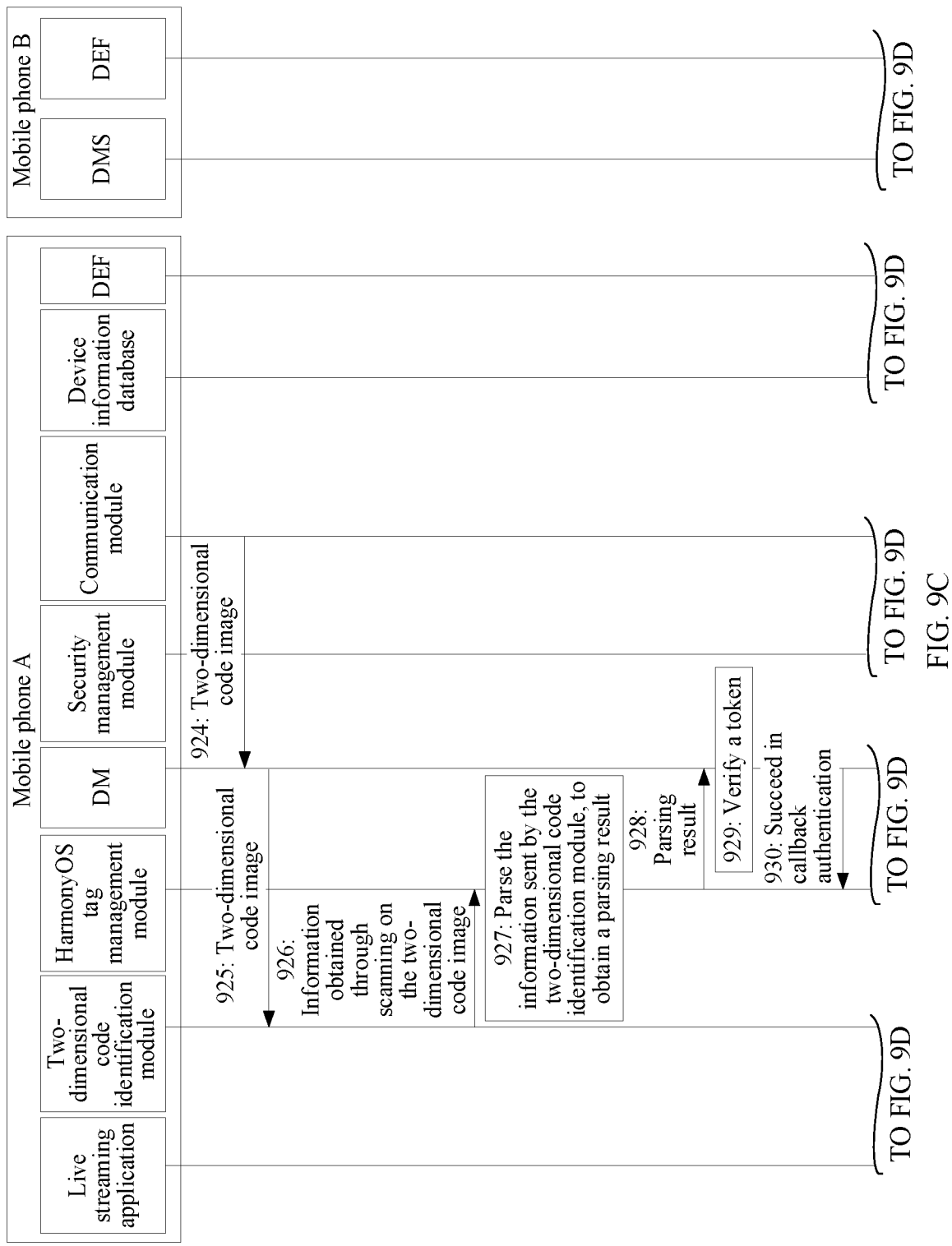
FIG. 9C and FIG. 9D are another schematic diagram of signal exchange according to an embodiment of this disclosure.
Figure 9D:
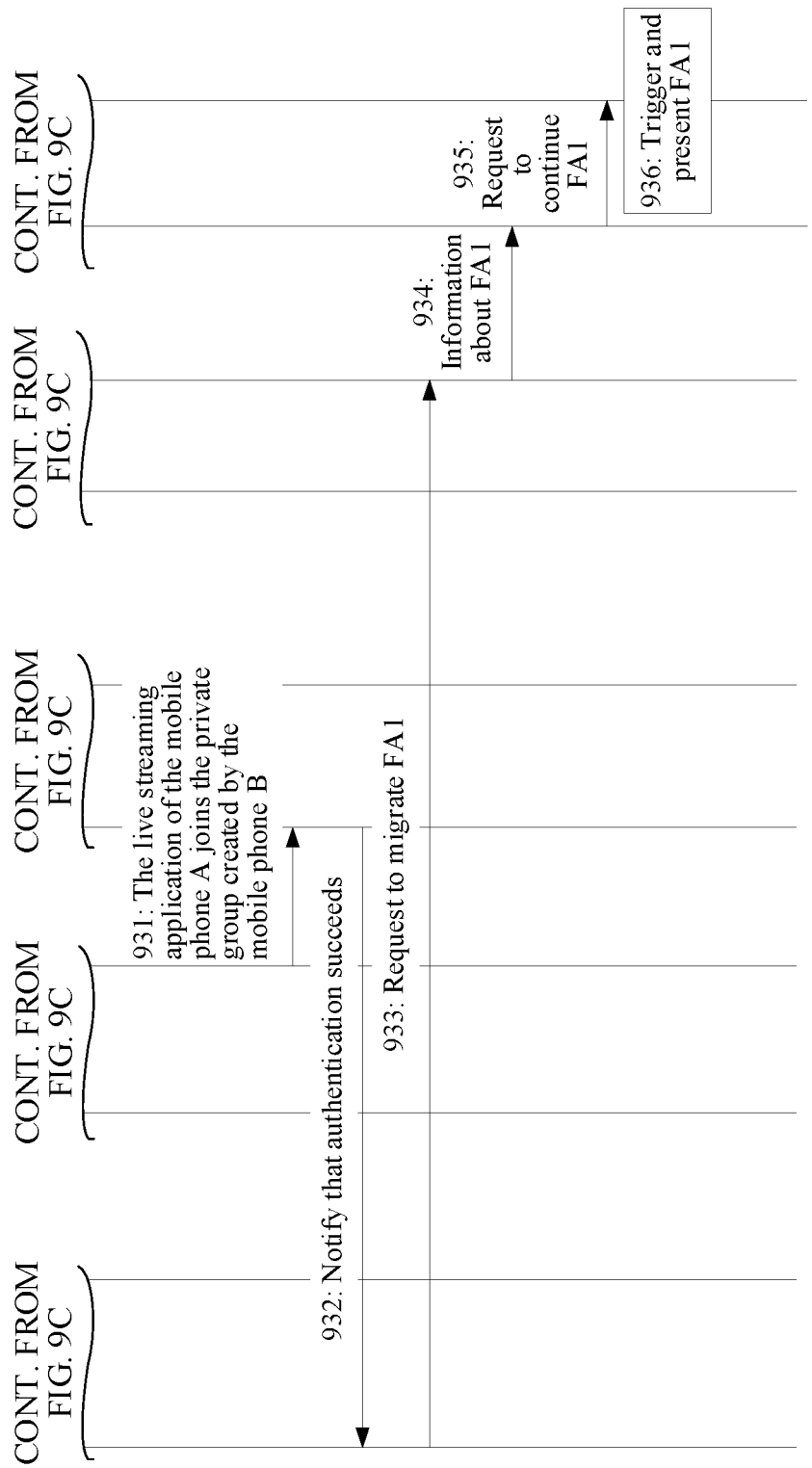

As shown in FIG. 9C and FIG. 9D, the foregoing method further includes the following steps.

924: Optionally, the communication module of the mobile phone A sends the two-dimensional code image to the DM of the mobile phone A.

925: Optionally, the DM of the mobile phone A sends the two-dimensional code image to the two-dimensional code identification module of the mobile phone A.

926: The two-dimensional code identification module of the mobile phone A scans the two-dimensional code, and sends identified information to the HarmonyOS tag management module of the mobile phone A.

927: The HarmonyOS tag management module of the mobile phone A parses the information sent by the two-dimensional code identification module, to obtain a parsing result.

The parsing result may include information such as a token of the mobile phone B, a PIN, and the session identifier of the mobile phone B.

928: The HarmonyOS tag management module of the mobile phone A sends the parsing result to the DM of the mobile phone A.

It may be understood that step 924 to step 928 are a schematic implementation in which the mobile phone A processes the two-dimensional code image. The mobile phone A may alternatively process the two-dimensional code image in another manner. This is not limited in this disclosure. For example, the DM of the mobile phone A may integrate a two-dimensional code image processing function, so that the DM of the mobile phone A can directly scan and parse the two-dimensional code image to obtain the information such as the token, the PIN, and the session identifier of the mobile phone B.

929: The DM of the mobile phone A verifies the token.

If the token received from the mobile phone B is the same as the token carried in the authentication request message, step 930 is performed.

930: The DM of the mobile phone A succeeds in callback authentication.

It should be understood that when the mobile phone A and the mobile phone B perform device-level authentication, step 929 and step 930 are optional. If step 929 and step 930 are performed, in other words, if the DM of the mobile phone A verifies the token, security of communication between the mobile phone A and the mobile phone B can be better ensured.

931: The live streaming application of the mobile phone A joins the private group created by the mobile phone B.

The DM of the mobile phone A indexes, based on the session identifier, the WI-FI address or the BLUETOOTH address that is of the peer device (namely, the mobile phone B) and that is locally stored, and applies to a security module of the mobile phone A for joining the private group created by the mobile phone B.

The security module of the mobile phone A creates an underlying communication channel by using the WI-FI address or the BLUETOOTH address, and sends a group join request to the mobile phone B, where the group join request includes the PIN that is obtained through parsing and the group ID. The mobile phone B receives the group join request, and verifies the PIN. After authentication succeeds (to be specific, the PIN is the same as the PIN in the two-dimensional code image), the live streaming applications of the two devices join the same group (where the group members in the group may include the live streaming application of the mobile phone A and the live streaming application of the mobile phone B, and the attribute of the group is being private), to complete the authentication.

In a possible implementation, after the mobile phone B receives the group join request and the authentication succeeds, the mobile phone B sends a response message to the mobile phone A, where the response message indicates that the live streaming application of the mobile phone A has joined the private group created by the mobile phone B.

932: The security management module of the mobile phone A notifies the live streaming application that the authentication succeeds.

In this way, the application-level authentication between the live streaming application of the mobile phone A and the live streaming application of the mobile phone B is completed, and the live streaming applications of the mobile phone A and the mobile phone B can communicate with each other.

933: The live streaming application of the mobile phone A requests a DEF of the mobile phone A to migrate FA1.

FA1 may implement all or a part of functions in the live streaming application, and includes one or more UIs.

934: The DEF of the mobile phone A sends service information of FA1 to a DMS of the mobile phone B.

The service information of FA1 may include a video stream, an audio stream, bullet screen information, or the like of a live stream.

935: The DMS of the mobile phone B requests a DEF of the mobile phone B to continue FA1.

That the DEF of the mobile phone B continues FA1 means that the mobile phone B processes FA1 based on the received service information and displays FA1. Display content of FA1 on the mobile phone B may be synchronized with display content of FA1 on the mobile phone A, or may be different from the display content of FA1 on the mobile phone A in terms of a format or a part of the content. This is not limited in this disclosure.

936: The DEF of the mobile phone B triggers and presents FA1.

That the DEF of the mobile phone B triggers FA1 means that the mobile phone B runs and displays FA1.

If the mobile phone B is currently displaying a live streaming image (in other words, running FA2), the DEF of the mobile phone B may detect FA2 of the mobile phone B. If FA2 has an ability of displaying FA1 (in other words, FA2 supports displaying a plurality of FAs), the DEF may trigger and display live streaming FA1 on FA2, in other words, display an interface of FA1 in an interface of FA2. For example, as shown in FIG. 8H, the mobile phone B may display, in the live streaming interface 811, the live streaming interface 819 sent by the mobile phone A. In this way, the user may simultaneously watch the live streaming image of the mobile phone B and the live streaming image of the mobile phone A on the mobile phone B, to present one or more FAs across devices, omit complex switching of terminals by the user, and simplify user operations, so that user experience can be improved.

If the mobile phone B is currently displaying a live streaming image (in other words, running FA2), but FA2 does not have an ability of displaying FA1, FA1 fails to be migrated, but the mobile phone A may continue to share another FA (for example, a live shopping cart FA3) of the live streaming application without establishing a connection again.

If the mobile phone B is currently displaying a desktop interface, FA1 of the mobile phone A may be previewed and controlled on the desktop.

It should be understood that, if there is a mobile phone C whose FA (for example, FA4) is to be migrated to the mobile phone B, and the mobile phone B is currently in a display interface of FA2, and if FA2 has an ability of displaying a plurality of FAs, the mobile phone B may simultaneously display three FAs (FA1, FA2, and FA3). The rest can be deduced by analogy.

This embodiment of this disclosure is mainly applied to a scenario in which an FA is shared between live streaming applications across devices, namely, a scenario in which a device can simultaneously display a plurality of FAs through multi-device FA sharing. In this way, dual-view dual-image live streaming can be freely performed. This may be applied to scenarios such as live streaming for review (an unboxing close-up+a live streamer), sports guide (an athlete's view+sportscaster), live streaming for education (a book close-up+a teacher), and live streaming for e-commerce (commodity details+a show guide), to improve user experience and product competitiveness.

In some embodiments, if one of the mobile phone A and the mobile phone B logs in to an account (for example, a HUAWEI account), and the other one does not log in to the account, the mobile phone A and the mobile phone B may perform step 901 to step 936. In this way, verification (namely, the device-level authentication) is performed when the FA migration is performed between the mobile phone A and the mobile phone B, to ensure security of data (for example, FA1) between the devices.

In some embodiments, if neither of the mobile phone A and the mobile phone B logs in to an account (for example, a HUAWEI account), the mobile phone A and the mobile phone B may perform step 901 to step 936. In this way, verification is performed when the FA migration is performed between the mobile phone A and the mobile phone B, to ensure security of data between the devices.

In some embodiments, if the mobile phone A and the mobile phone B log in to a same account (for example, a HUAWEI account), the mobile phone A and the mobile phone B may perform step 901 to step 936. In this way, verification is performed when the FA migration is performed between the mobile phone A and the mobile phone B, to further ensure security of data between the devices.

It should be noted that a part of step 901 to step 936 may be optional, in other words, are not necessarily technical features of the application-level authentication solution. For example, step 903 and step 904 may be optional steps, in other words, the authenticated device may not be queried, and the nearby device is directly viewed. For another example, step 911 and step 913 may be optional steps, in other words, the creation success notification may not be sent. For another example, step 916 and step 917 may be optional steps, in other words, the migration may be directly performed without confirmation of the user. For another example, step 923b to step 925 may be optional steps. In this case, the mobile phone A may directly obtain the two-dimensional code image generated by the mobile phone B (for example, by scanning the two-dimensional code image displayed by the mobile phone B).

With reference to a specific scenario, the following describes, by using a photographing application as an example, a UI for the application-level authentication provided in embodiments of this disclosure.

During traveling, if a group of people need to take a team photo, a passerby or a peripheral, for example, a watch, is usually needed to control a photographing button for photographing. However, it is usually difficult to take a satisfactory photo by relying on the passerby or the peripheral, for example, the watch, because a situation during photographing is not clear. This disclosure provides a method to establish a connection between two devices based on a cross-device FA sharing technology, to use one device (for example, a mobile phone A) as a photographing mobile phone, and migrate a photographing FA of the remote device to another device (for example, a mobile phone B). In this way, a user may hold the mobile phone B to observe a photographing image of the mobile phone A and control the photographing. This helps the user take a more satisfactory photo, and can improve user experience.

Figure 10A:
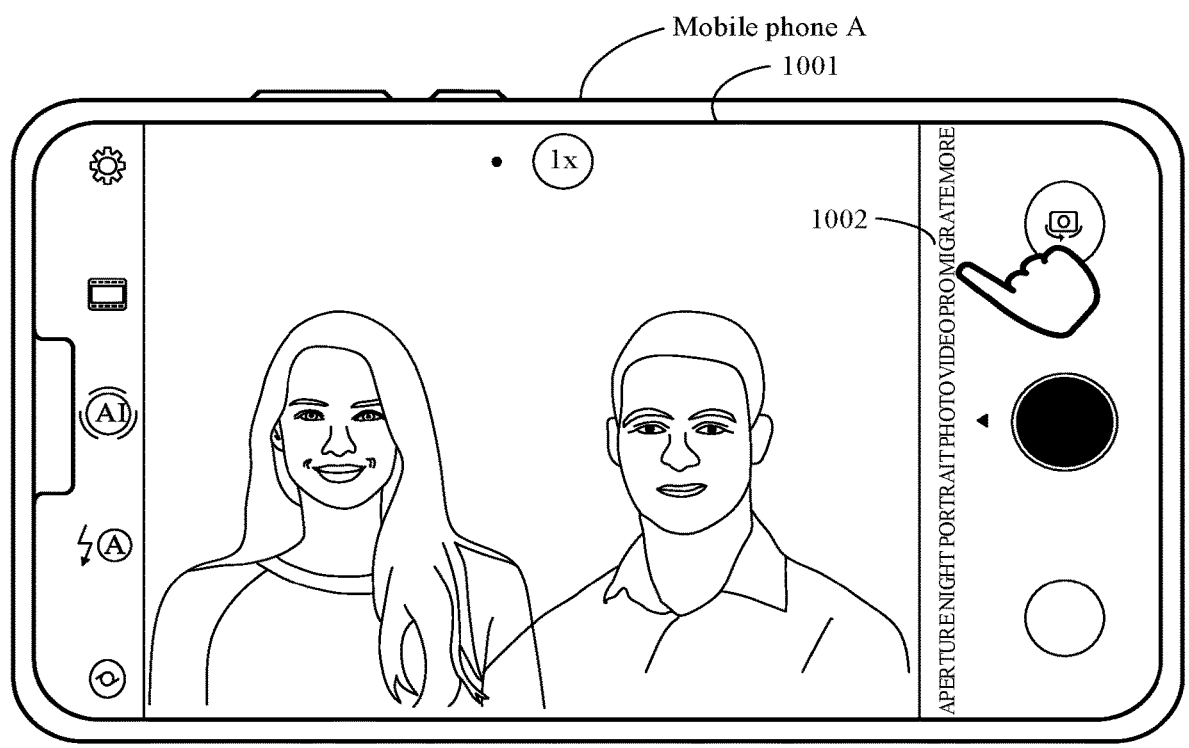
FIG. 10A is another schematic diagram of displaying according to an embodiment of this disclosure.
Figure 10B:
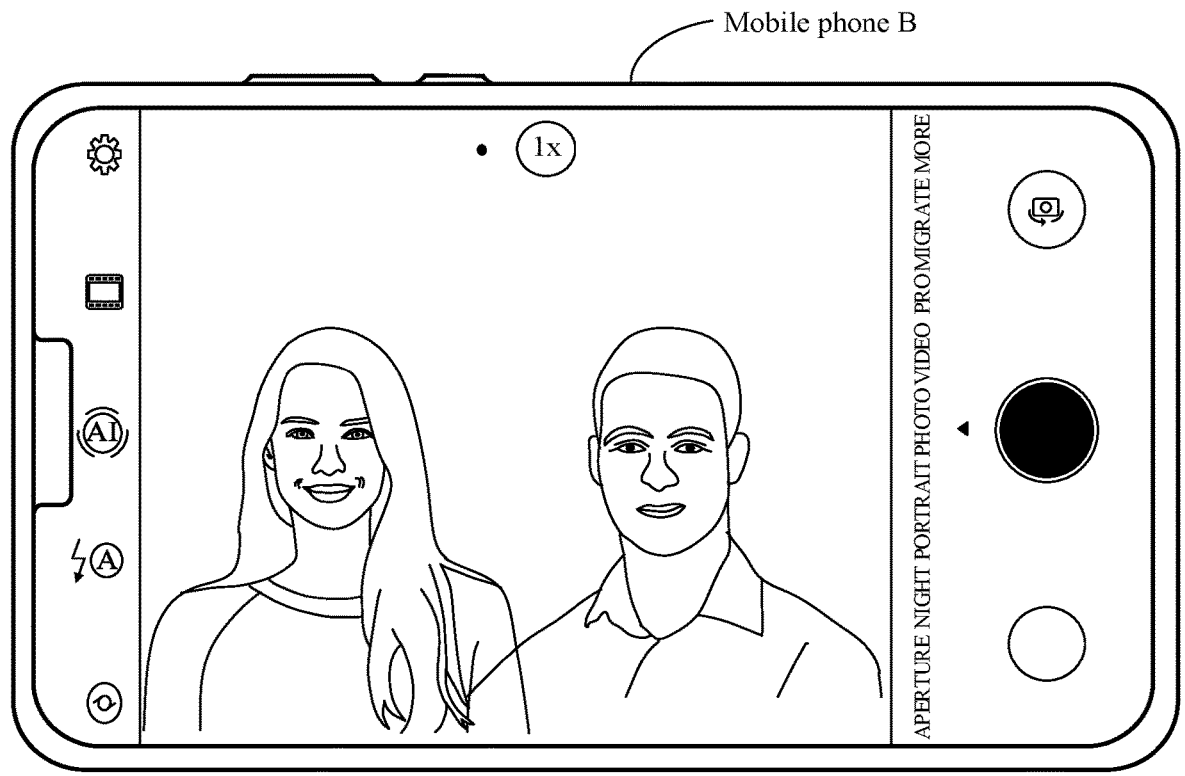
FIG. 10B is another schematic diagram of displaying according to an embodiment of this disclosure.

As shown in FIG. 10A, when a user uses a mobile phone A to take a photo, the mobile phone A displays a photographing interface 1001, and the photographing interface includes a preview box and a menu area. In response to an operation of tapping a "Migrate" button 1002 in the menu area by the user A, the mobile phone A may send the photographing interface (where the photographing interface of the mobile phone A may be considered as an FA, for example, FA5) of the mobile phone A to a mobile phone B. As shown in FIG. 10B, the mobile phone B may display and control the photographing interface of the mobile phone A.

Figure 11:
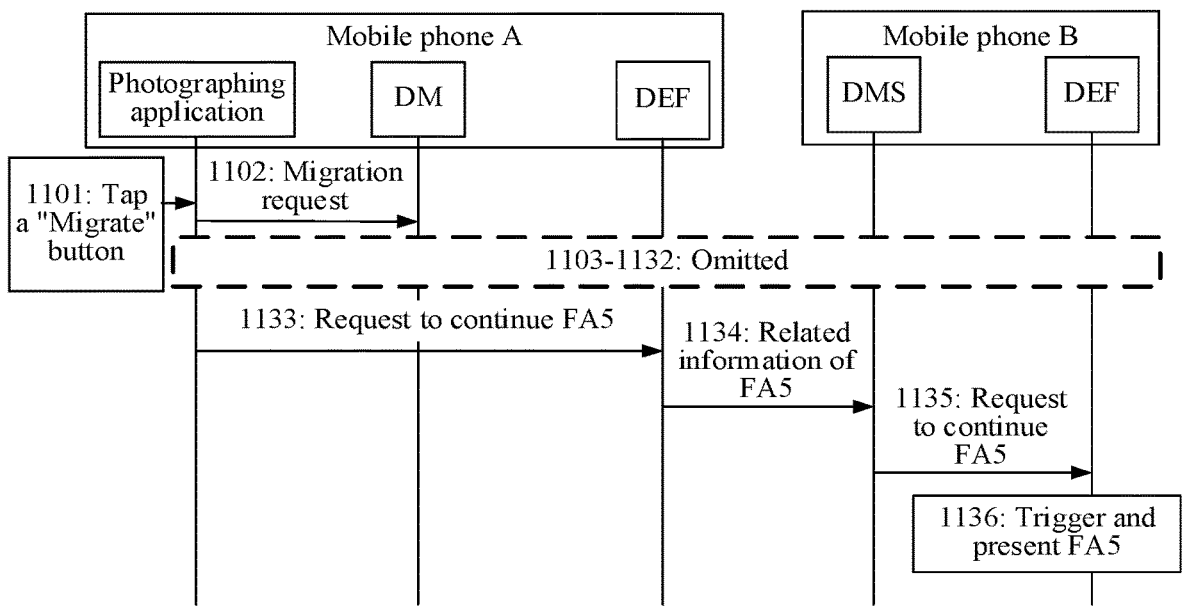
FIG. 11 is another schematic diagram of signal exchange according to an embodiment of this disclosure.

The following uses the photographing application as an example to describe a specific implementation of the method provided in embodiments of this disclosure. A method provided in an embodiment of this disclosure may be applied to two near-field devices, for example, a mobile phone A and a mobile phone B. The mobile phone A and the mobile phone B are devices with different accounts. As shown in FIG. 11, the method includes the following steps:

1101: A user taps a "Migrate" button in a photographing application of the mobile phone A.

For example, as shown in FIG. 10A, the user A may tap the "Migrate" button 1002 in the photographing interface 1001.

1102: The photographing application of the mobile phone A initiates a migration request to a DM of the mobile phone A.

Information carried in the migration request includes an initiating-end package name (a local photographing application package name), a continuing-end package name (a peer photographing application package name), and a name of the mobile phone A.

For step 1103 to step 1132, refer to related descriptions of step 903 to step 932. Details are not described herein again. A part of step 903 to step 932 may be optional.

1133: The photographing application of the mobile phone A requests a DEF of the mobile phone A to migrate FA5.

1134: The DEF of the mobile phone A sends related information of FA5 to a DMS of the mobile phone B.

The related information of FA5 may include a photographing preview image and menu bar information of a photographing interface.

1135: The DMS of the mobile phone B requests a DEF of the mobile phone B to continue FA5.

That the DEF of the mobile phone B continues FA5 means that the mobile phone B processes FA5 based on received service information and displays FA5.

1136: The DEF of the mobile phone B triggers and presents FA5.

As shown in FIG. 10B, the mobile phone B may display and control the photographing interface (FA5) of the mobile phone A. In this embodiment of this disclosure, a connection is established between the two devices by using a cross-device FA sharing technology, to share FA5 of the mobile phone A with the mobile phone B, so that the photographing interface can be previewed on the mobile phone B, and a photographing function of the mobile phone A can be controlled, thereby helping the user take a more satisfactory photo, and improving user experience.

With reference to a specific scenario, the following describes, by using a karaoke application as an example, a UI for the application-level authentication provided in embodiments of this disclosure.

With rapid development of the Internet, mobile karaoke is more popular among users. For example, after a user opens the karaoke application to authorize a login, the user may create a corresponding music room, and may invite another user by sharing a music room link or an invitation code to enter the music room. The other user may directly tap the link or enter the invitation code to enter the same music room, and perform operations such as song pick-up or singing. However, the foregoing sharing process has many problems: (1) To share the music room created at a local end to a friend face to face, a link needs to be forwarded via WeChat®, QQ®, or the like. This needs many sharing steps. (2) When the peer user receives the link of the music room and taps the link to enter the music room, if the karaoke application has not been installed on a peer device, the peer device needs to jump to an application market to install the karaoke application. Then, the peer user taps the link again to enter the music room. This results in poor user experience. (3) The sharing of and entrance to the music room are strongly dependent on applications such as WeChat®, QQ®, and the karaoke application on the device. Consequently, a device (for example, a television) with better near-field experience cannot be used immediately.

For the karaoke scenario, this disclosure provides a multi-device collaborative control solution that is based on FA sharing, to support cross-device application-level mutual assistance and sharing in a same network (for example, a same WI-FI network). For example, a karaoke service of a local device (for example, a mobile phone A) may be seamlessly transferred to another terminal device (for example, a television or a sound box). In addition, a user account does not need to authorize a login, and a plurality of terminal devices are not required to use a same system. In this way, advantages of audio and video playing experience of devices such as the television and the sound box and advantages of convenient interaction and sound pick-up of devices such as the mobile phone can be brought into full play, and operation steps are simple and quick, thereby greatly improving user experience.

Figure 12A:
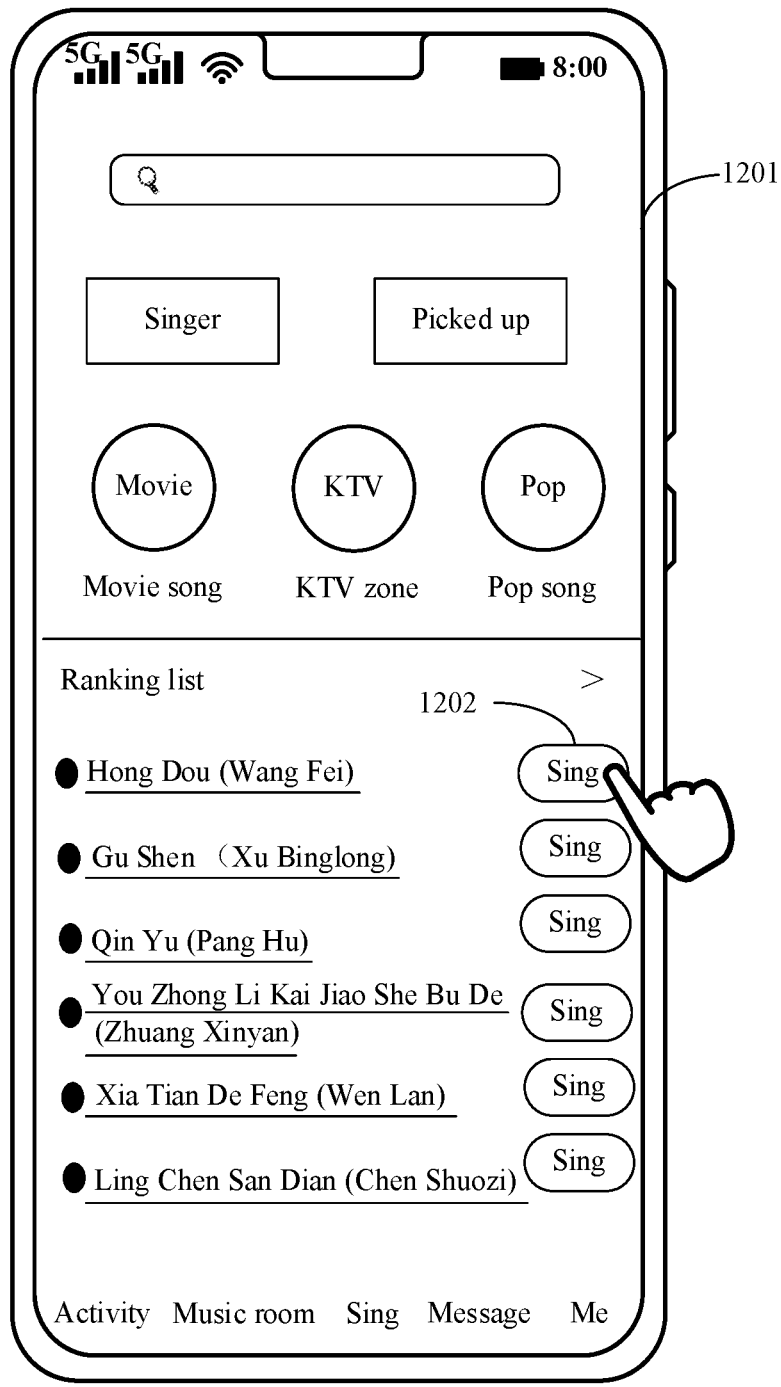
FIG. 12A and FIG. 12B are another schematic diagram of displaying according to an embodiment of this disclosure.
Figure 12B:
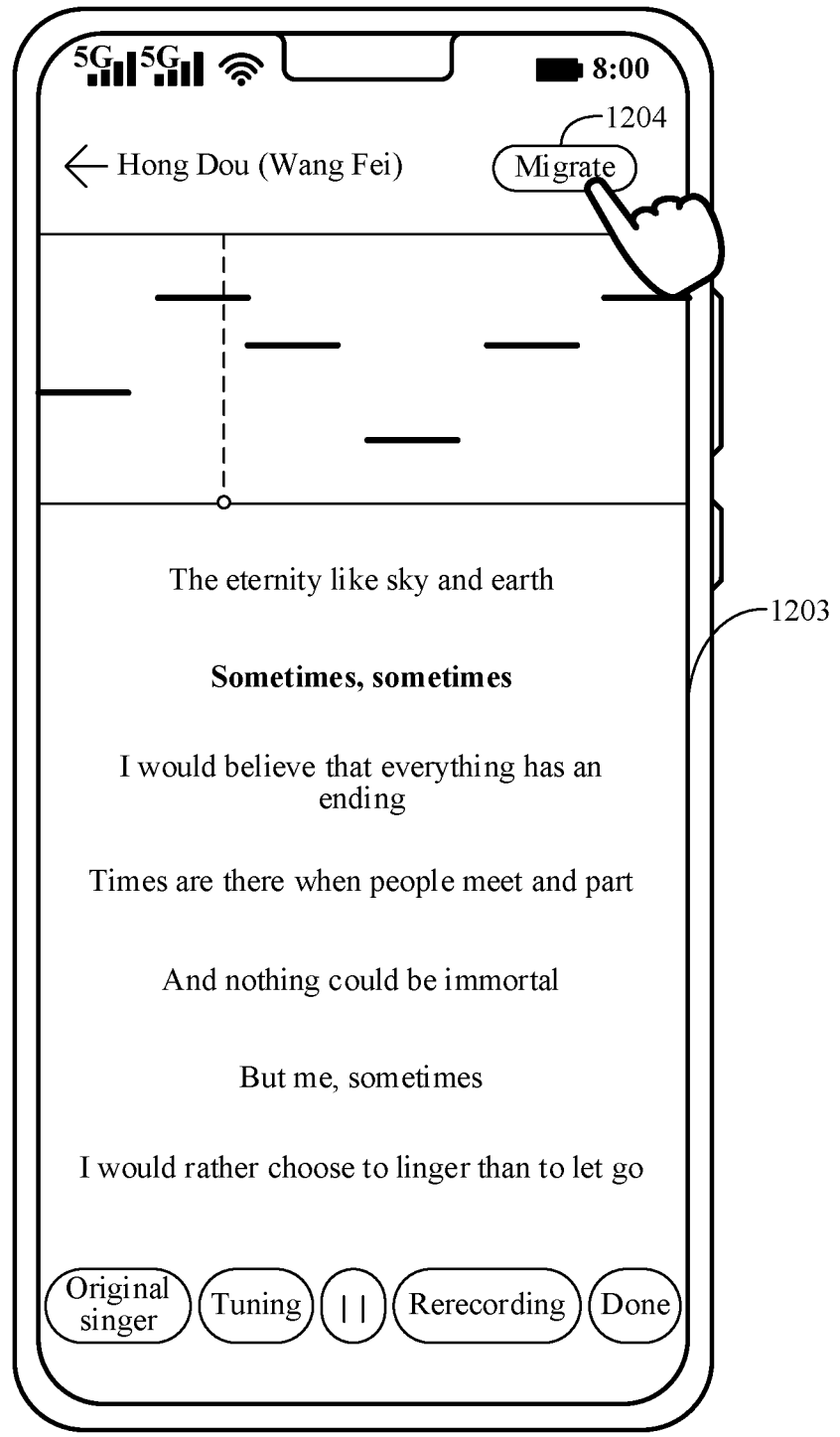
Figure 12C:
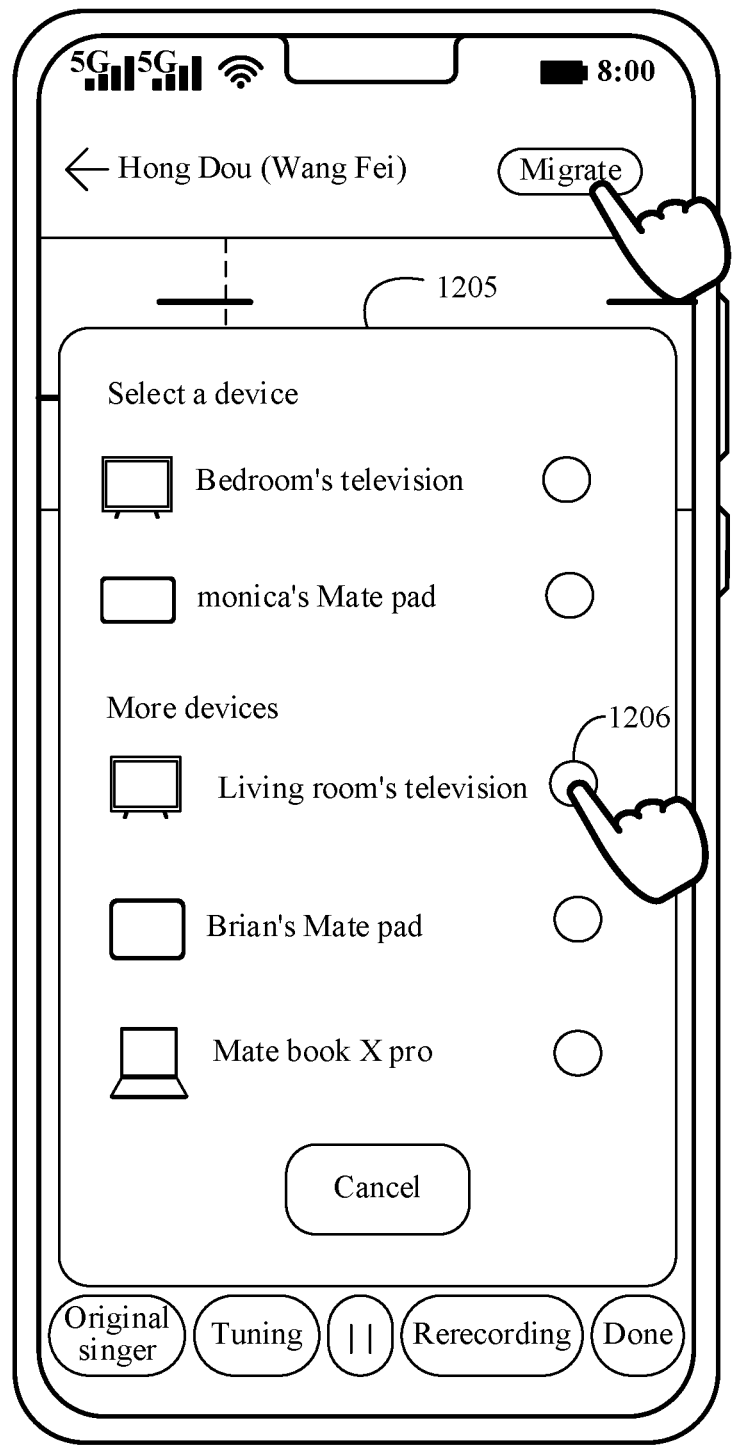
FIG. 12C and FIG. 12D are another schematic diagram of displaying according to an embodiment of this disclosure.
Figure 12D:
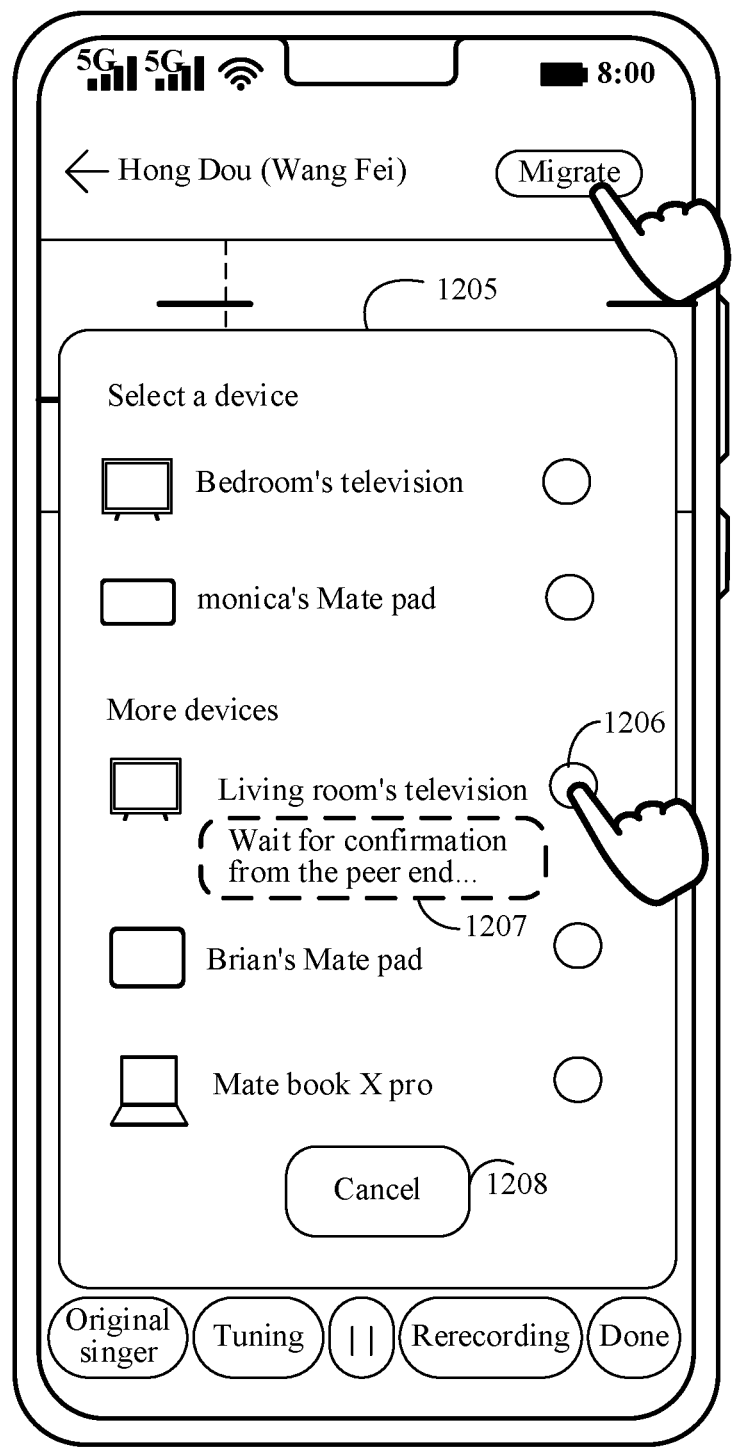
Figure 12E:
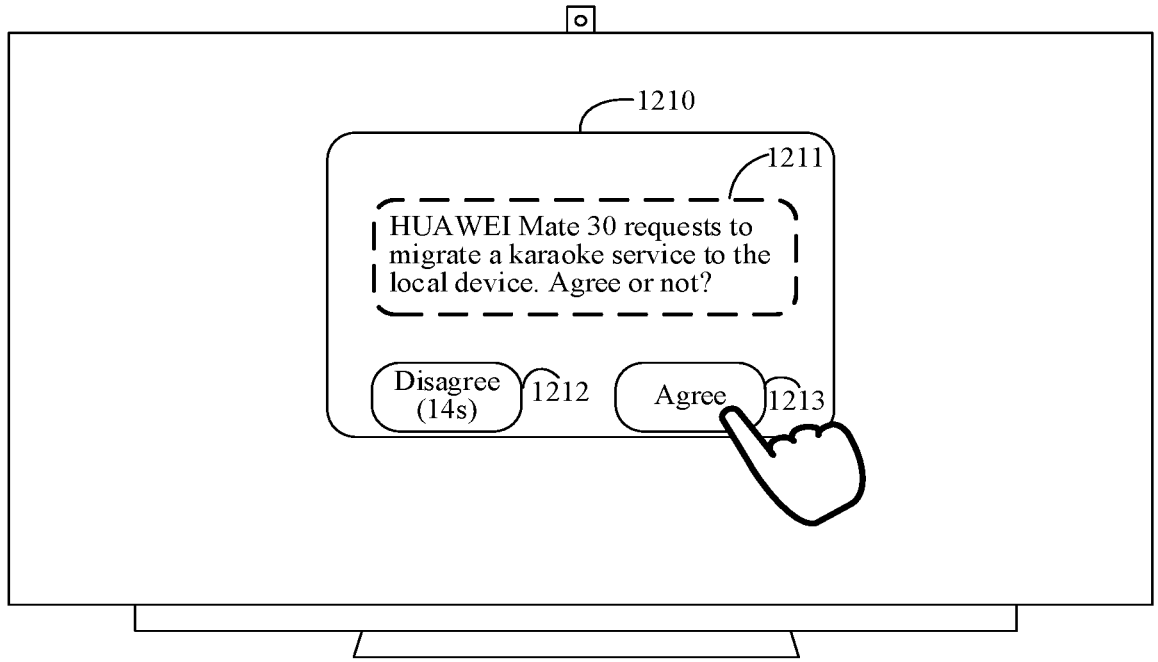
FIG. 12E is another schematic diagram of displaying according to an embodiment of this disclosure.
Figure 12F:
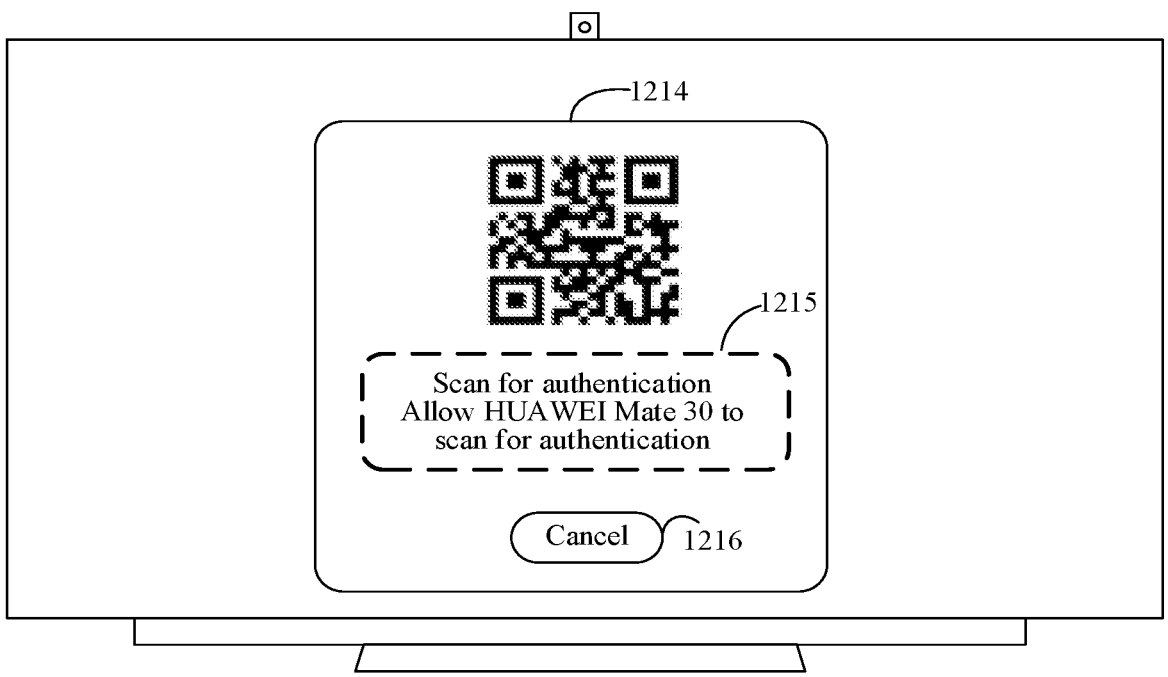
FIG. 12F is another schematic diagram of displaying according to an embodiment of this disclosure.
Figure 12G:
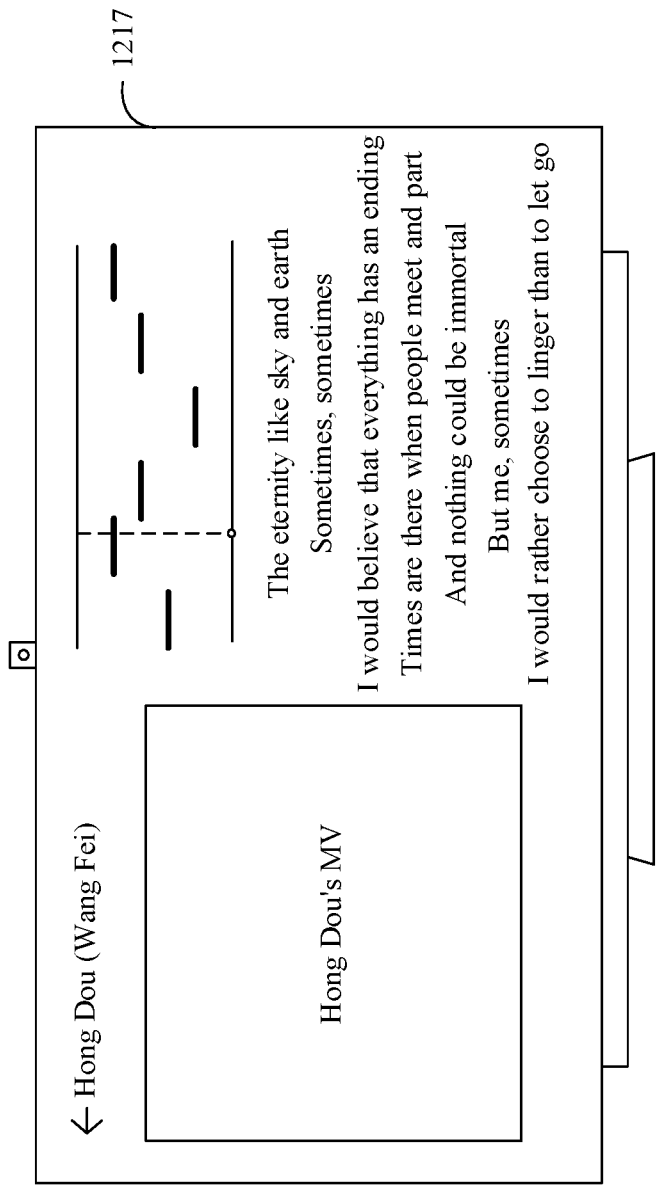
FIG. 12G is another schematic diagram of displaying according to an embodiment of this disclosure.
Figure 12H:
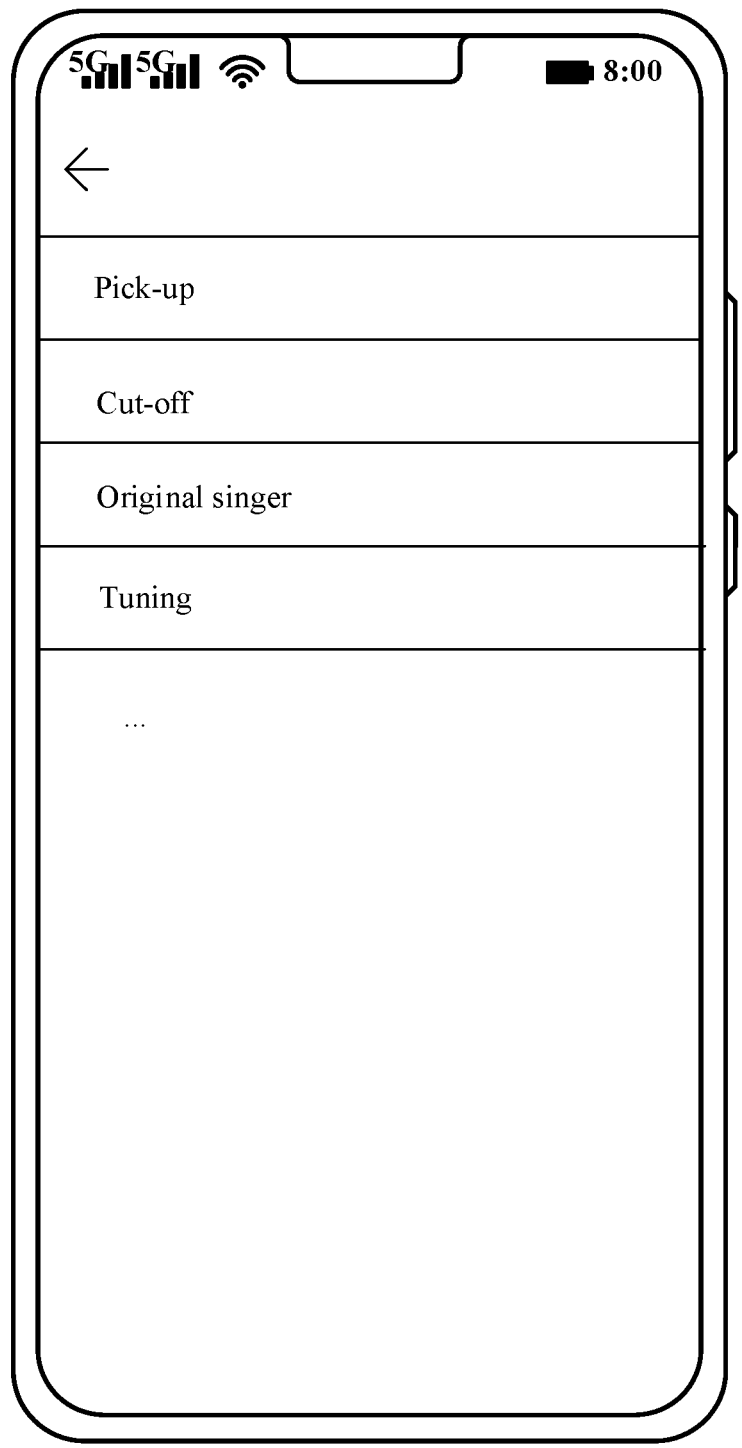
FIG. 12H is another schematic diagram of displaying according to an embodiment of this disclosure.

As shown in FIG. 12A, after a user opens a karaoke application on a mobile phone A, the mobile phone A may display a karaoke interface 1201. In response to an operation of tapping, by the user, a "Sing" button 1202 corresponding to a song "Hong Dou", as shown in FIG. 12B, the mobile phone A may display a karaoke interface 1203 of Hong Dou. In response to an operation of tapping a "Migrate" button 1204 (where the "Migrate" button 1204 is for migrating (sending) the karaoke interface of the mobile phone A to another device (for example, a mobile phone B)) by the user, as shown in FIG. 12C, the mobile phone may pop up a pop-up box 1205. The pop-up box 1205 may include nearby devices, and the nearby devices include authenticated devices (Bedroom's television, monica's Mate pad, and the like) and unauthenticated devices (Living room's television, Brian's Mate pad, Mate book X pro, and the like). In response to an operation of tapping, by the user, a control 1206 corresponding to Room's television (an unauthenticated device), the mobile phone A may send an authentication request message to the mobile phone B. In addition, as shown in FIG. 12D, prompt information 1207 "Wait for confirmation from the peer end" may be displayed below Room's television. As shown in FIG. 12E, the television may display a pop-up box 1210. The pop-up box 1210 includes prompt information "HUAWEI Mate 30 (the mobile phone A) requests to migrate a karaoke service to the local device. Agree or not?", and may further include a "Disagree" button 1212 and an "Agree" button 1213. In response to an operation of tapping the "Agree" button 1213 by a user, as shown in FIG. 12F, the television may display a pop-up box 1214. The pop-up box 1214 may include a two-dimensional code image generated by the television, and may further include prompt information 1215 "Scan for authentication. Allow HUAWEI Mate 30 to scan for authentication". In this case, the user of the mobile phone A may scan the two-dimensional code image presented by the television, and then the television may receive the karaoke interface (where the karaoke interface may be considered as an FA, for example, FA6) from the mobile phone A. As shown in FIG. 12G, the television may display a karaoke interface 1217. Alternatively, in response to an operation of tapping the "Agree" button 815 by a user, the television may receive the karaoke interface (FA6) from the mobile phone A. As shown in FIG. 12G, the television may present a karaoke interface 1217. Further, as shown in FIG. 12H, the mobile phone A may re-orchestrate a UI as a song pick-up control station. Operations such as song pick-up and song cut-off performed by the user on the mobile phone A and song list information are synchronously sent to the television through a communication data channel, to control music playing on a television side.

Figure 13:
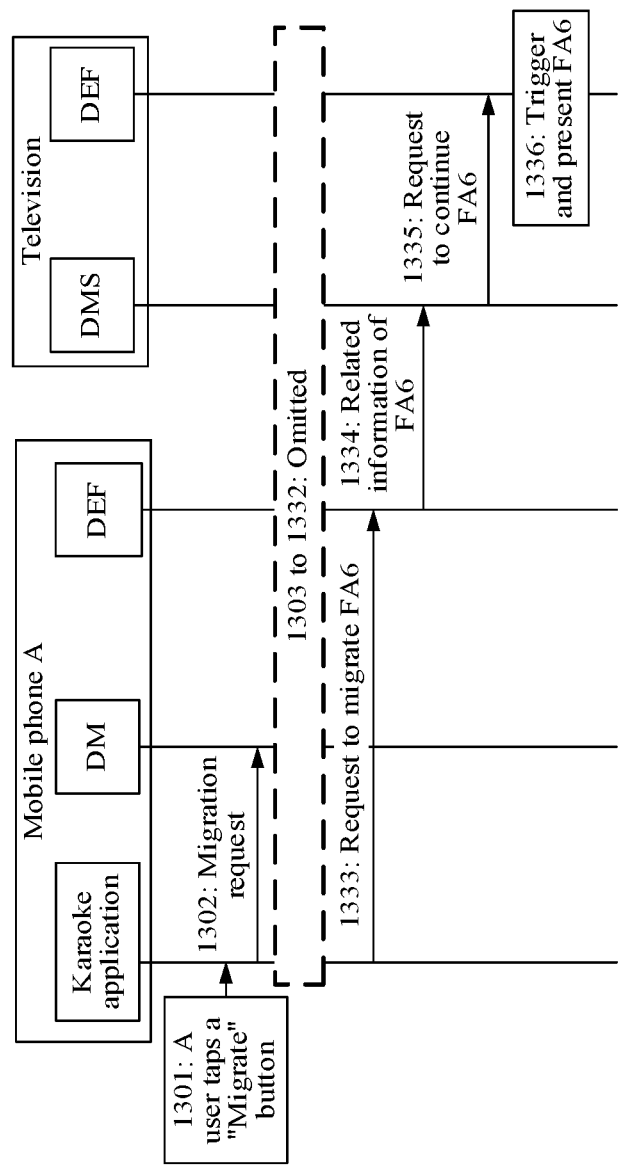
FIG. 13 is another schematic diagram of signal exchange according to an embodiment of this disclosure.

The following uses the karaoke application as an example to describe a specific implementation of the method provided in embodiments of this disclosure. A method provided in an embodiment of this disclosure may be applied to two near-field devices, for example, a mobile phone A and a television, in a same network. The mobile phone A may use an ANDROID system or a dual-framework system, the television may use HarmonyOS, and the mobile phone A and the television are devices with different accounts. As shown in FIG. 13, the method includes the following steps.

1301: A user taps a "Migrate" button in a karaoke application of the mobile phone A.

1302: The karaoke application of the mobile phone A initiates a migration request to a DM of the mobile phone A.

Information carried in the migration request includes an initiating-end package name (a local karaoke application package name), a continuing-end package name (a peer karaoke application package name), and a name of the mobile phone A.

For step 1303 to step 1332, refer to related descriptions of step 903 to step 932. Details are not described herein again. A part of step 903 to step 932 may be optional.

1333: The karaoke application of the mobile phone A requests a DEF of the mobile phone A to migrate FA6.

1334: The DEF of the mobile phone A sends related information of FA6 to a DMS of the television.

The related information of FA6 may include song information of karaoke, and the song information includes at least one of a song title (for example, Hong Dou), lyrics, audio information, and video information.

1335: The DMS of the television requests a DEF of the television to continue FA6.

1336: The DEF of the television triggers and presents FA6.

If the karaoke application is installed on the television, the DEF of the television may detect whether the karaoke application and an account of the television have been logged in to, and notify the user to log in to the karaoke application, so that the karaoke application presents FA6 sent by the mobile phone A.

If the karaoke application is not installed on the television, the DEF of the television may trigger FA6, in other words, provide an ability of displaying FA6. A karaoke service can be used immediately without pre-installation of the karaoke application.

For the karaoke entertainment scenario, this embodiment of this disclosure provides a near-field application-layer data sharing service, to implement one-tap FA migration across devices and operating systems without relying on any third-party platform or requiring the pre-installation of the karaoke application. The karaoke service can be used immediately, and a mobile karaoke room can be quickly built, thereby improving user experience, simplifying operations, and improving entertainment experience.

With reference to a specific scenario, the following describes, by using a shopping application as an example, a UI for the application-level authentication provided in embodiments of this disclosure.

With rapid development of the Internet, especially popularization of the mobile Internet, online shopping has become an indispensable element of most people's daily life. A mobile phone and a tablet computer are most commonly used terminal devices in online shopping. If the mobile phone and the tablet computer can provide a user with better shopping experience, there is no doubt that market competitiveness of the terminal device can be greatly enhanced. Shopping on the mobile phone is used as an example. In various shopping festivals, merchants launch many discount activities. To pursue more affordable prices, users often ask friends and family members to purchase some commodities through group buying, to reach discount limits of the merchants. This process has the following several disadvantages: (1) A commodity needs to be shared with a friend face to face through forwarding by WECHAT. This needs many sharing steps. (2) To participate in a discount activity, a user frequently switches between a commodity selection and purchase page and a shopping cart. This results in complex operations. (3) When a plurality of people purchase a commodity of a merchant through group buying, operations such as sharing the commodity, adding the commodity to the shopping cart, and switching pages are more frequent. After payment, a transfer operation is required. This is extremely inconvenient. To resolve such problems, some vendors propose a solution to face-to-face group buying. A commodity that a user wants to purchase through group buying may be shared with another user through code scanning via WeChat®, to implement a quick face-to-face group buying operation. However, this solution has some disadvantages. First, a merchant platform and an application scenario are greatly restricted. Second, a user A pays for a commodity and shares a two-dimensional code with a user B, and the user B opens WECHAT to scan the two-dimensional code, and browses and purchases the commodity. This sharing process still relies on the WECHAT platform, and includes many steps.

For the online shopping scenario, this disclosure provides an application-layer data sharing service that is based on near-field FA sharing, to support one-tap synchronization of shopping cart information between a plurality of terminal devices in a same network (for example, a same WI-FI network). A shopping cart (where the shopping cart may be considered as an FA, for example, FA7) of a terminal device may be migrated to another terminal device, accounts of commodities in shopping carts of the two devices may be settled together to enjoy a price-break discount, and then payment is made separately to avoid mutual transfer. In this way, operation steps are simple and quick, and user experience of group buying can be greatly improved. In addition, because a near-field FA sharing capability is a basic capability provided by a system service, neither a same operating system nor login to a same device account (for example, a HUAWEI account) is needed, and even a shopping application does not need to be installed on the device. Therefore, the near-field FA sharing capability is highly universal and can be applied to various e-commerce platforms, and adaptation costs are low, so that more users can enjoy more convenient online shopping experience.

Figure 14A:
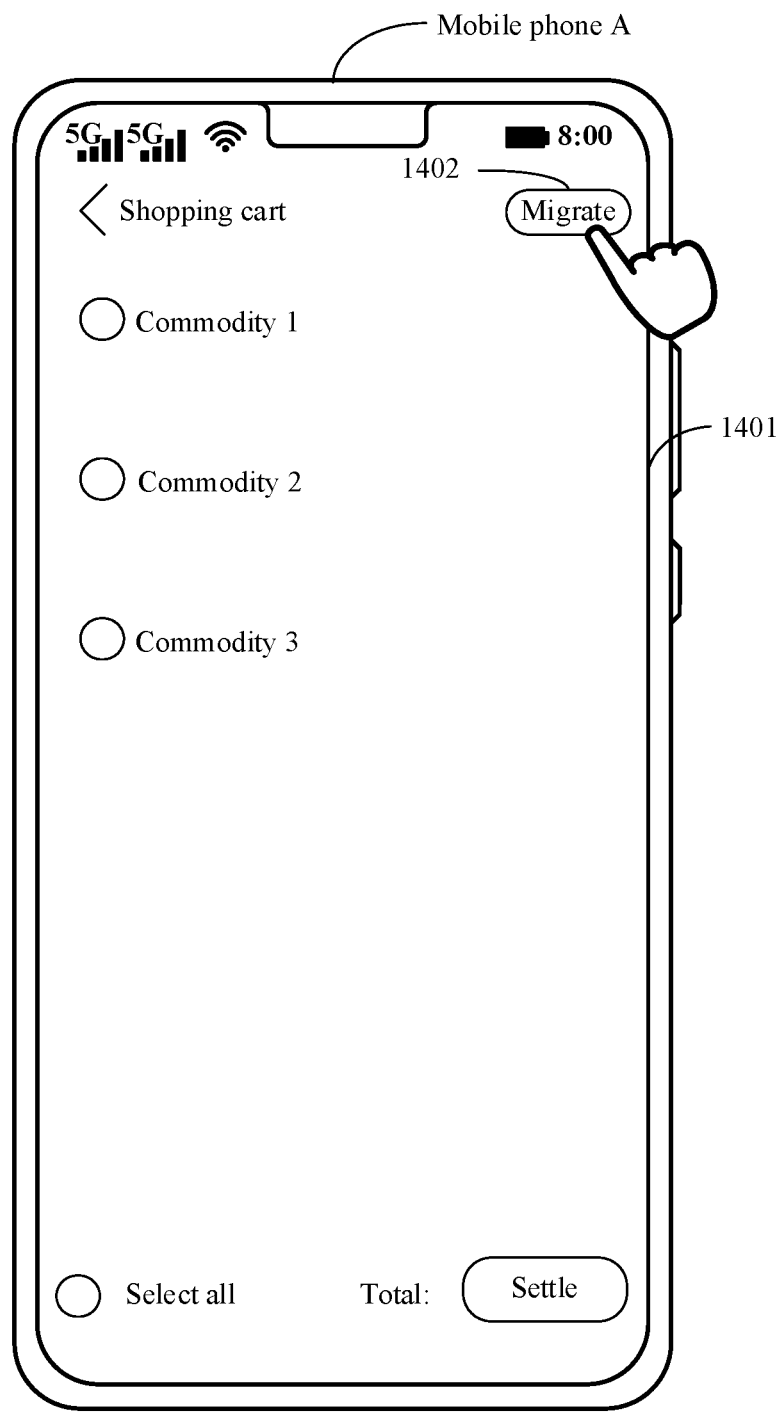
FIG. 14A is another schematic diagram of displaying according to an embodiment of this disclosure.
Figure 14B:
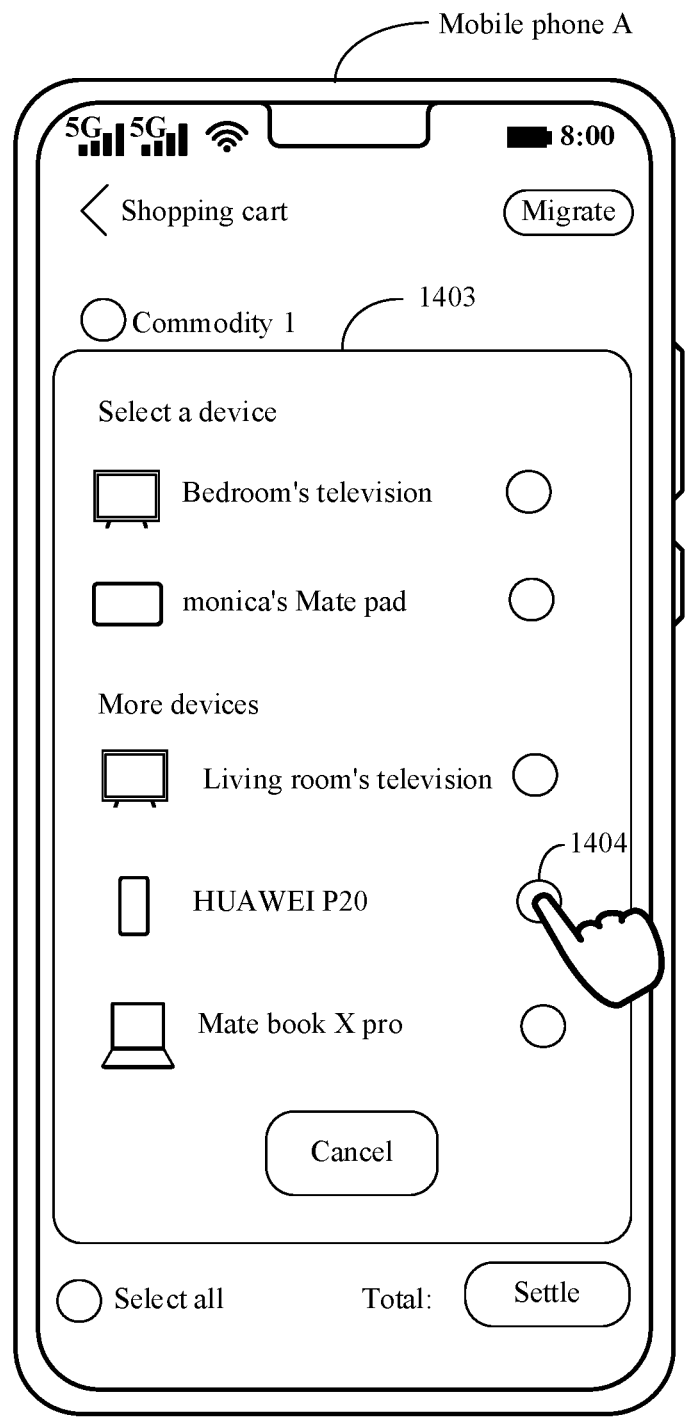
FIG. 14B and FIG. 14C are another schematic diagram of displaying according to an embodiment of this disclosure.
Figure 14C:
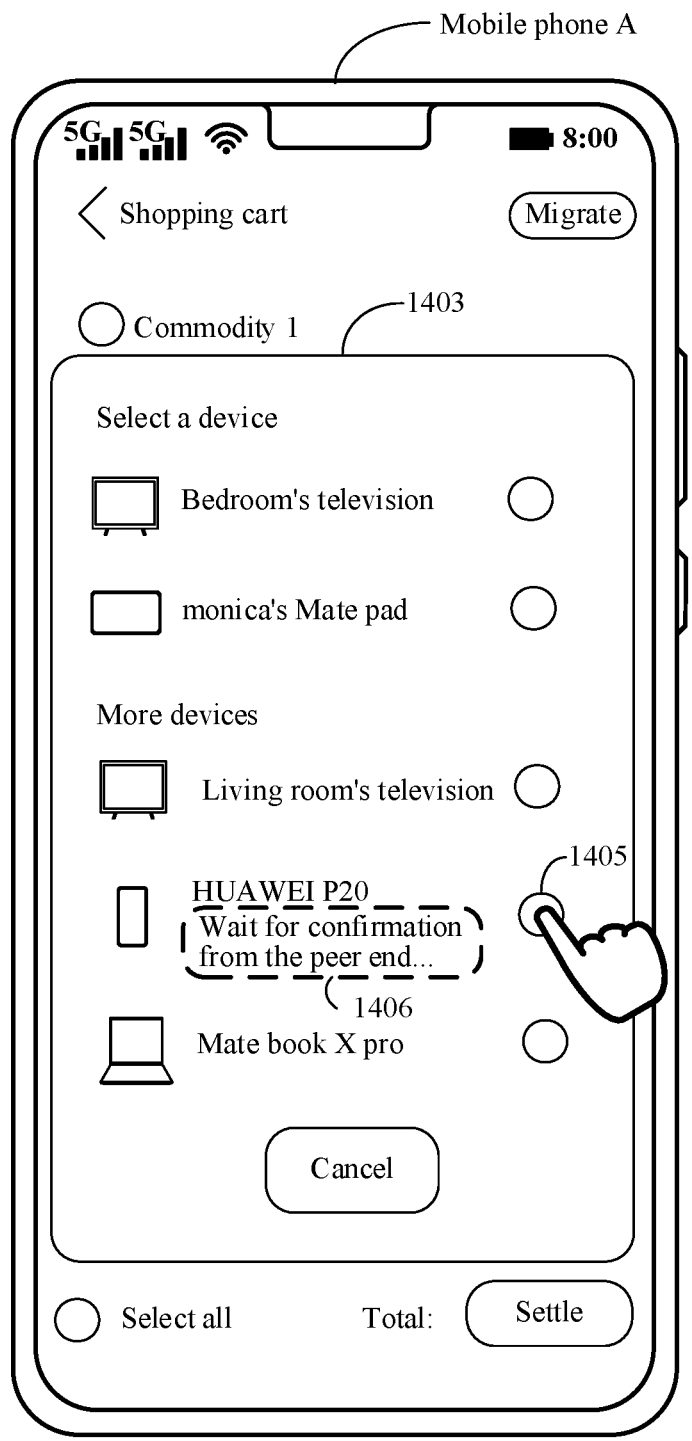
Figure 14D:
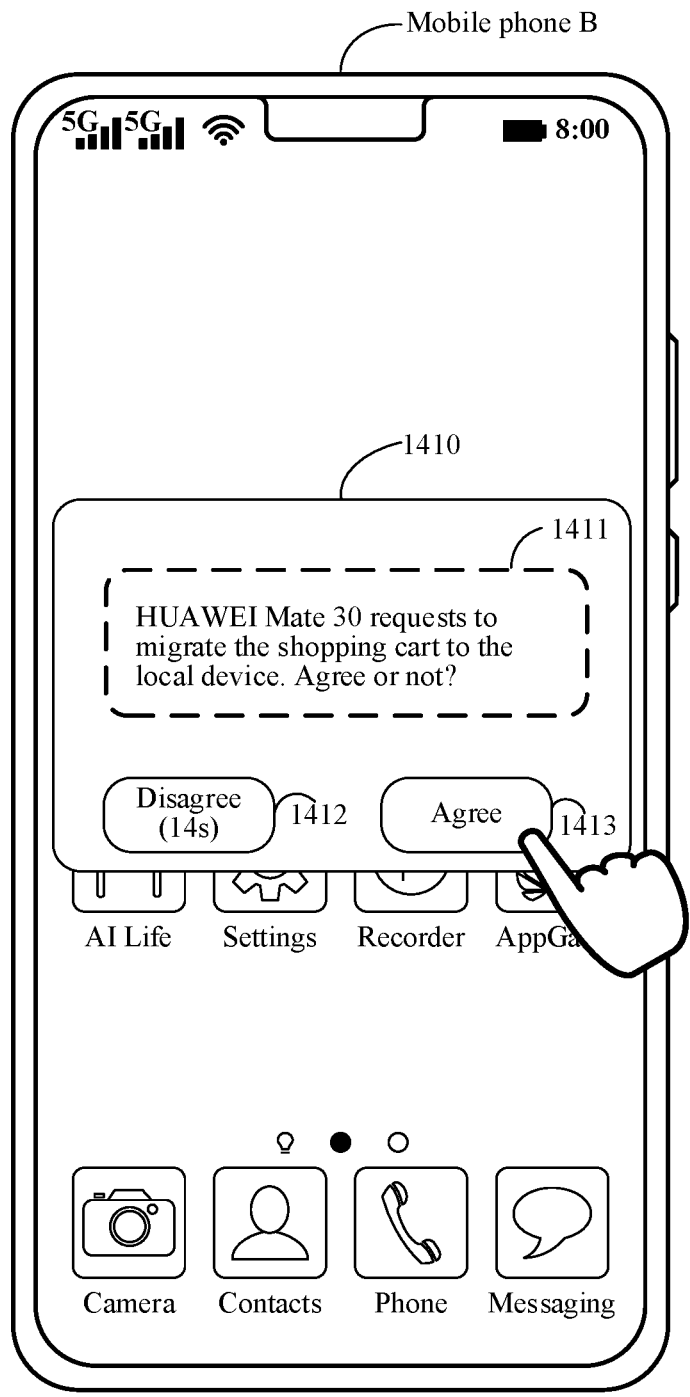
FIG. 14D is another schematic diagram of displaying according to an embodiment of this disclosure.
Figure 14E:
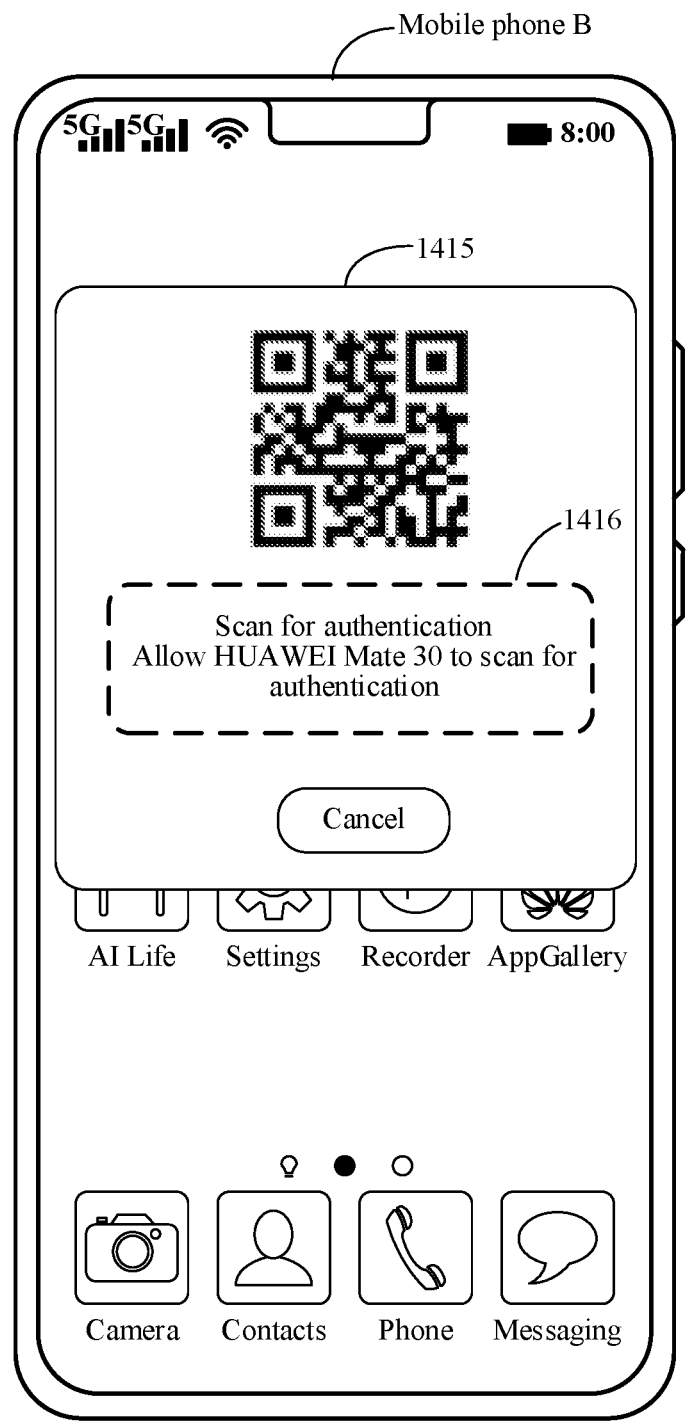
FIG. 14E is another schematic diagram of displaying according to an embodiment of this disclosure.
Figure 14F:
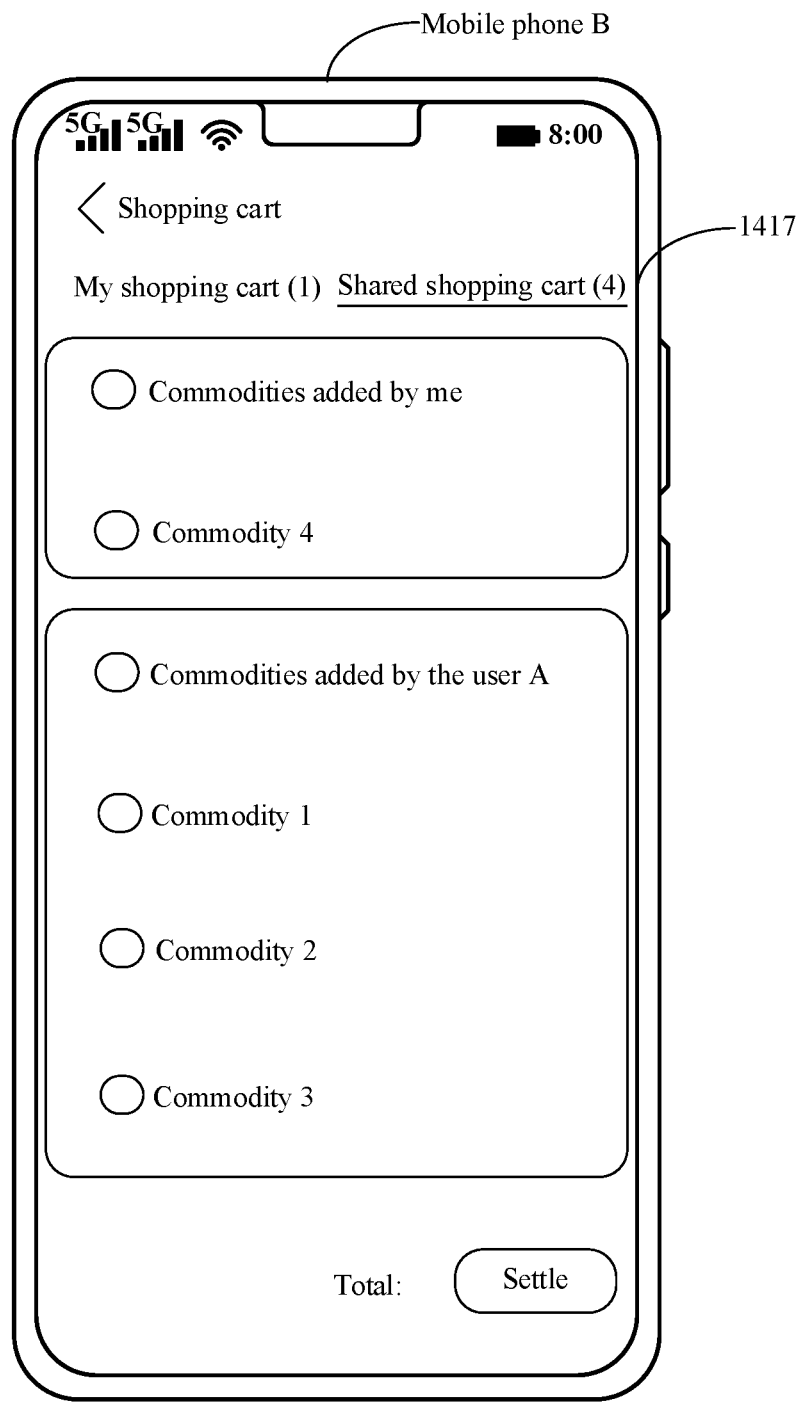
FIG. 14F is another schematic diagram of displaying according to an embodiment of this disclosure.
Figure 14G:
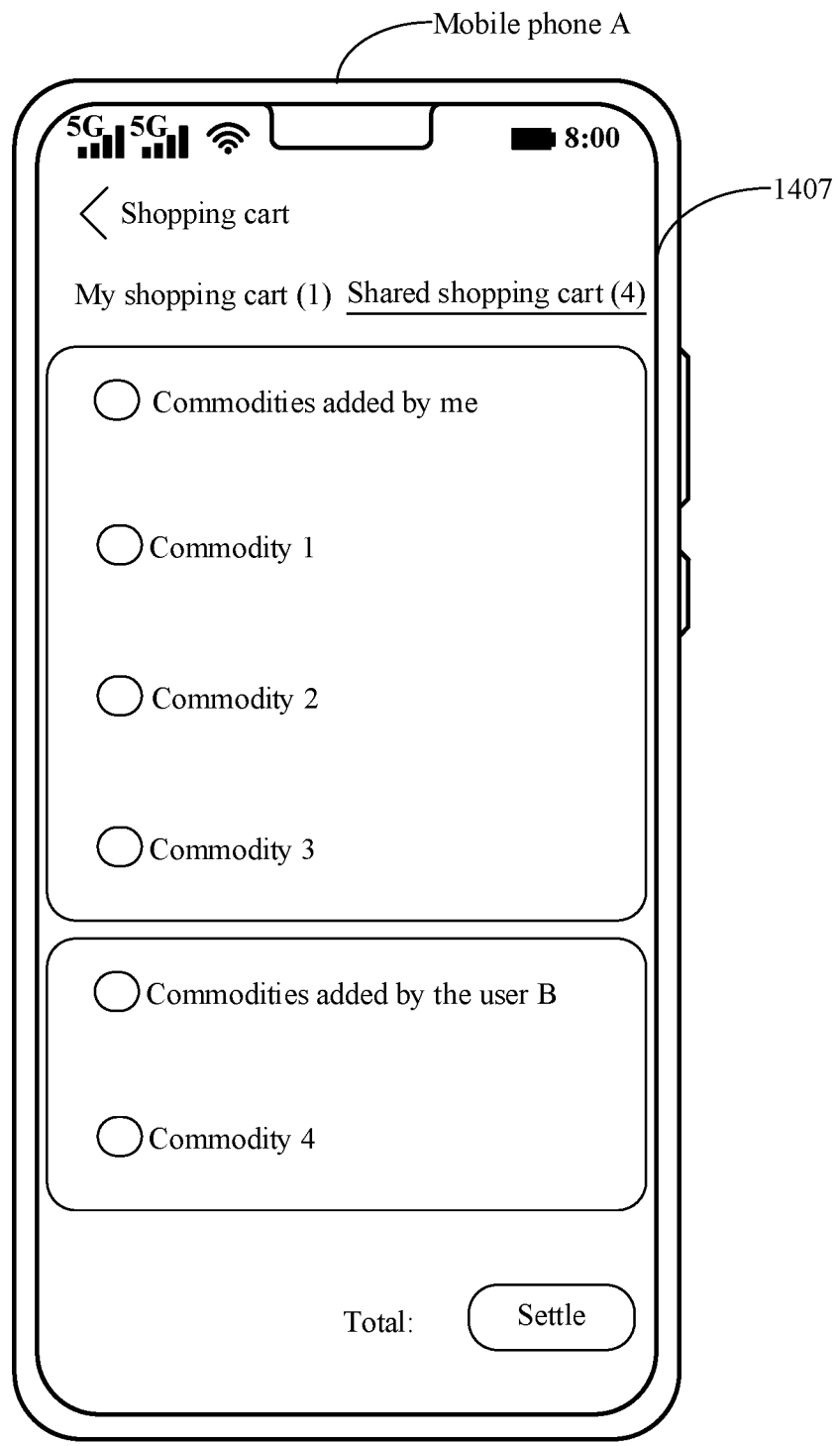
FIG. 14G is another schematic diagram of displaying according to an embodiment of this disclosure.

For example, as shown in FIG. 14A, after opening a shopping application on a mobile phone A, a user may enter a shopping cart interface 1401. In response to an operation of tapping a "Migrate" button 1402 (where the "Migrate" button 1402 is for migrating (sending) a shopping cart of the mobile phone A to another device (for example, a mobile phone B)) in the shopping cart interface 1401 by the user, as shown in FIG. 14B, the mobile phone may pop up a pop-up box 1403. The pop-up box 1403 may include nearby devices, and the nearby devices include authenticated devices (Bedroom's television, monica's Mate pad, and the like) and unauthenticated devices (Living room's television, HUAWEI P20, Mate book X pro, and the like). In response to an operation of tapping, by the user, a control 1404 corresponding to HUAWEI P20 (an unauthenticated device), the mobile phone A may send an authentication request message to the mobile phone B. In addition, as shown in FIG. 14C, prompt information 1405 "Wait for confirmation from the peer end" may be displayed below HUAWEI P20. As shown in FIG. 14D, if the mobile phone B (HUAWEI P20) receives, when displaying a desktop, the authentication request message sent by the mobile phone A, the mobile phone B may display a pop-up box 1410, where the pop-up box 1410 includes prompt information "HUAWEI Mate 30 (the mobile phone A) requests to migrate the shopping cart to the local device. Agree or not?", and may include a "Disagree" button 1412 and an "Agree" button 1413. In response to an operation of tapping the "Agree" button 1413 by a user, as shown in FIG. 14E, the mobile phone B may display a pop-up box 1415. The pop-up box 1415 may include a two-dimensional code image generated by the mobile phone B, and may further include prompt information 1416 "Scan for binding. Allow HUAWEI Mate 30 to scan for authentication". In this case, the user of the mobile phone A may scan the two-dimensional code image displayed by the mobile phone B, and then the mobile phone B may receive the shopping cart (FA6) from the mobile phone A. Alternatively, in response to an operation of tapping the "Agree" button 1413 by a user, the mobile phone B may receive the shopping cart (FA6) from the mobile phone A. As shown in FIG. 14F, the mobile phone B may display a shared shopping cart in a shopping cart interface 1417, and the shared shopping cart includes not only a commodity added by "me" but also a commodity added by the user A (the user of the mobile phone A). In addition, the mobile phone B may also migrate a shopping cart (for example, FA7) of the mobile phone B to the mobile phone A. In this way, as shown in FIG. 14G, the mobile phone A may display a shared shopping cart in a shopping cart interface 1407, and the shared shopping cart includes not only a commodity added by "me" but also a commodity added by the user B (the user of the mobile phone B). In this way, the user can implement one-tap group buying without relying on sharing through any third-party platform. This eliminates complex steps of sharing commodities with each other and transferring money to each other, thereby greatly improving shopping experience.

Figure 15:
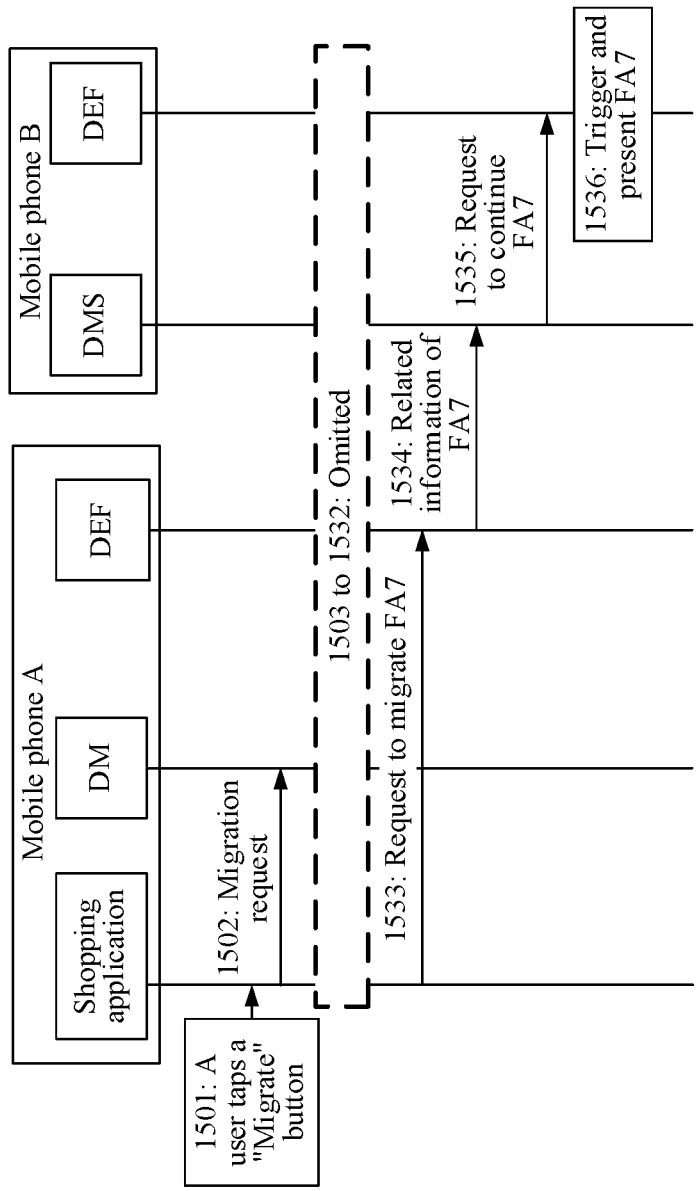
FIG. 15 is another schematic diagram of signal exchange according to an embodiment of this disclosure.

The following uses the shopping application as an example to describe a specific implementation of the method provided in embodiments of this disclosure. A method provided in an embodiment of this disclosure may be applied to two near-field devices, for example, a mobile phone A and a mobile phone B. The mobile phone A and the mobile phone B are devices with different accounts. As shown in FIG. 15, the method includes the following steps.

1501: A user taps a "Migrate" button in a shopping application of the mobile phone A.

As shown in FIG. 14A, after opening the shopping application on the mobile phone A, the user selects a commodity, adds the commodity to a shopping cart, and then enters a shopping cart interface 1401. The user may tap the "Migrate" button 1402 in the shopping cart interface 1401. The "Migrate" button 1402 is for migrating (sending) the shopping cart of the mobile phone A to another device (for example, the mobile phone B).

1502: The shopping application initiates a migration request (a sharing request) to a DM of the mobile phone A.

Information carried in the migration request includes an initiating-end package name (a local shopping application package name), a continuing-end package name (a peer shopping application package name), and a name of the mobile phone A. For example, the initiating-end package name is com.huawei.vmall, and the continuing-end package name is com.huawei.vmall.

For step 1503 to step 1532, refer to related descriptions of step 903 to step 932. Details are not described herein again. A part of step 903 to step 932 may be optional.

1533: The shopping application of the mobile phone A requests a DEF of the mobile phone A to migrate FA7.
1534: The DEF of the mobile phone A sends related information of FA7 to a DMS of the mobile phone B.

The related information of FA7 includes commodity information in the shopping cart, and the commodity information includes at least one of information such as a commodity name, a commodity link, and a commodity price.

1535: The DMS of the mobile phone B requests a DEF of the mobile phone B to continue FA7.
1536: The DEF of the mobile phone B triggers and presents FA7.

The DEF of the mobile phone B triggers FA7. As shown in FIG. 14F, the mobile phone B may display the shared shopping cart in the shopping cart interface 1417, where the shared shopping cart includes not only one commodity in the shopping cart of the mobile phone B but also three commodities selected by the user A. In this case, the user B can directly view all commodities purchased through group buying. After selecting a part or all of the commodities in the shopping cart, the user may check whether an amount meets a requirement of a price-break discount activity, to implement a quick group buying function.

In addition, commodity information in the shared shopping cart may be updated in real time. For example, if a new commodity is added to a shopping cart of a device (for example, the mobile phone A) that initiates migration, a shared shopping cart of a destination device (for example, the mobile phone B) may also be refreshed immediately.

Further, when the user B taps a "Settle" button, the mobile phone B may initiate a payment request to the user A and include payment-related information. The payment-related information may include a collection platform, a payment amount, and the like. The payment amount may be: Total amount of commodities purchased by each user—(Total amount of commodities purchased by each user/Total amount of the shared shopping cart)×Discount value. After payment, the shared shopping cart is cleared, and one group buying process ends.

According to the method provided in this embodiment of this disclosure, a shopping cart (where the shopping cart may be considered as an FA, for example, FA7) of a terminal device may be migrated to another terminal device, accounts of commodities in shopping carts of the two devices may be settled together to enjoy a price-break discount, and then payment is made separately to avoid mutual transfer. In this way, operation steps are simple and quick, and user experience of the group shopping can be greatly improved.

In some other embodiments, in a home environment, one user has one mobile phone and one television, and is participating in an activity of 100 off on orders over 400. In a conventional shopping scenario, when selecting a commodity on the mobile phone, the user frequently switches between a commodity details page and a shopping cart page to view or modify content of a shopping cart. According to the method provided in this embodiment of this disclosure, the user may migrate the shopping cart to the television, browse and select the commodity on the mobile phone, and watch the content of the shopping cart on the television at any time. This avoids a complex operation of repeatedly switching pages on the mobile phone, and can improve user experience.

In some other embodiments, a user selects some commodities on two mobile phones (a mobile phone A and a mobile phone C) respectively and adds the commodities to shopping carts, and may migrate the shopping carts of both the mobile phone A and the mobile phone C to a television B. After the mobile phone A and the mobile phone C both complete authentication with the television B, group members on the mobile phone A may include (shopping application of A, shopping application of B), group members on the mobile phone C may include (shopping application of C, shopping application of B), and group members on the television B include (shopping application of A, shopping application of B, shopping application of C), where the group of the television includes three members. In other words, application-level authentication is performed between the shopping application of the television and each of the shopping application of the mobile phone A and the shopping application of the mobile phone C. Subsequently, the shopping application of the television may communicate with the shopping application of the mobile phone A and the shopping application of the mobile phone C separately.

It should be understood that a scenario in which a shopping cart FA is migrated based on the near-field FA sharing capability is mainly applicable to a networking environment, for example, a home environment and a working environment. For a scenario not supporting near-field networking (short-distance networking), this solution can also be used as a reference. For example, sharing and real-time synchronization of shopping cart content can be implemented through the Internet. Alternatively, an e-commerce platform may integrate a shopping cart in an Internet environment into a shopping application of the e-commerce platform and share the shopping cart through a cloud service and an account of the e-commerce platform.

With reference to a specific scenario, the following describes, by using a mailbox application as an example, a UI for the application-level authentication provided in embodiments of this disclosure.

A use scenario of office software such as a mailbox is changing. In addition to conventional office and home scenarios, a business trip/a transportation vehicle/waiting/an outdoor walk has become a use scenario of office personnel. Some vendors have provided a mailbox client on each mobile platform, so that a user can access the mailbox on various devices. However, the user cannot seamlessly switch between a mobile office state and a non-mobile office state, and operations cannot be performed continuously, resulting in poor user experience. For example, when the user receives an e-mail notification on a smartwatch, and wants to reply on a mobile phone or a pad, the user further needs to open the mobile phone/pad, log in to the mailbox, find an e-mail, and then reply. Consequently, operations are complex, and user experience is poor. A handoff technology proposed by APPLE enables a user to switch from an APPLE device (for example, a MAC, an IPHONE, an IPAD, or an APPLE WATCH) to another nearby APPLE device to continue working, without losing a task process. However, this requires that the devices participating in mailbox handoff log in to a same APPLE ID, be installed with a same mailbox client in advance, and log in to a mailbox account. In addition, the technology cannot select a push device. For example, if an e-mail needs to be pushed to a television for presentation in a conference room, handoff cannot be implemented because the two devices do not log in to the same APPLE ID.

For a scenario in which a business person switches between the mobile office state and the non-mobile office state, this disclosure provides an application continuing service that is based on near-field cross-device FA migration, to support one-tap e-mail migration between a plurality of terminal devices. For example, a watch may trigger an e-mail view interface on a mobile phone side with one tap, to directly display e-mail text on the mobile phone side. For another example, for an e-mail draft that is being edited on a mobile phone side, this disclosure also supports one-tap seamless transfer of the e-mail draft to another device (for example, another mobile phone, a PAD, or a television) for continuing, to provide ultimate multi-device e-mail collaboration experience. Neither a same system nor login of the devices to a same account is needed in this disclosure, and even the mailbox application does not need to be installed on the devices at both ends. Therefore, an application scope is wide.

Figure 16A:
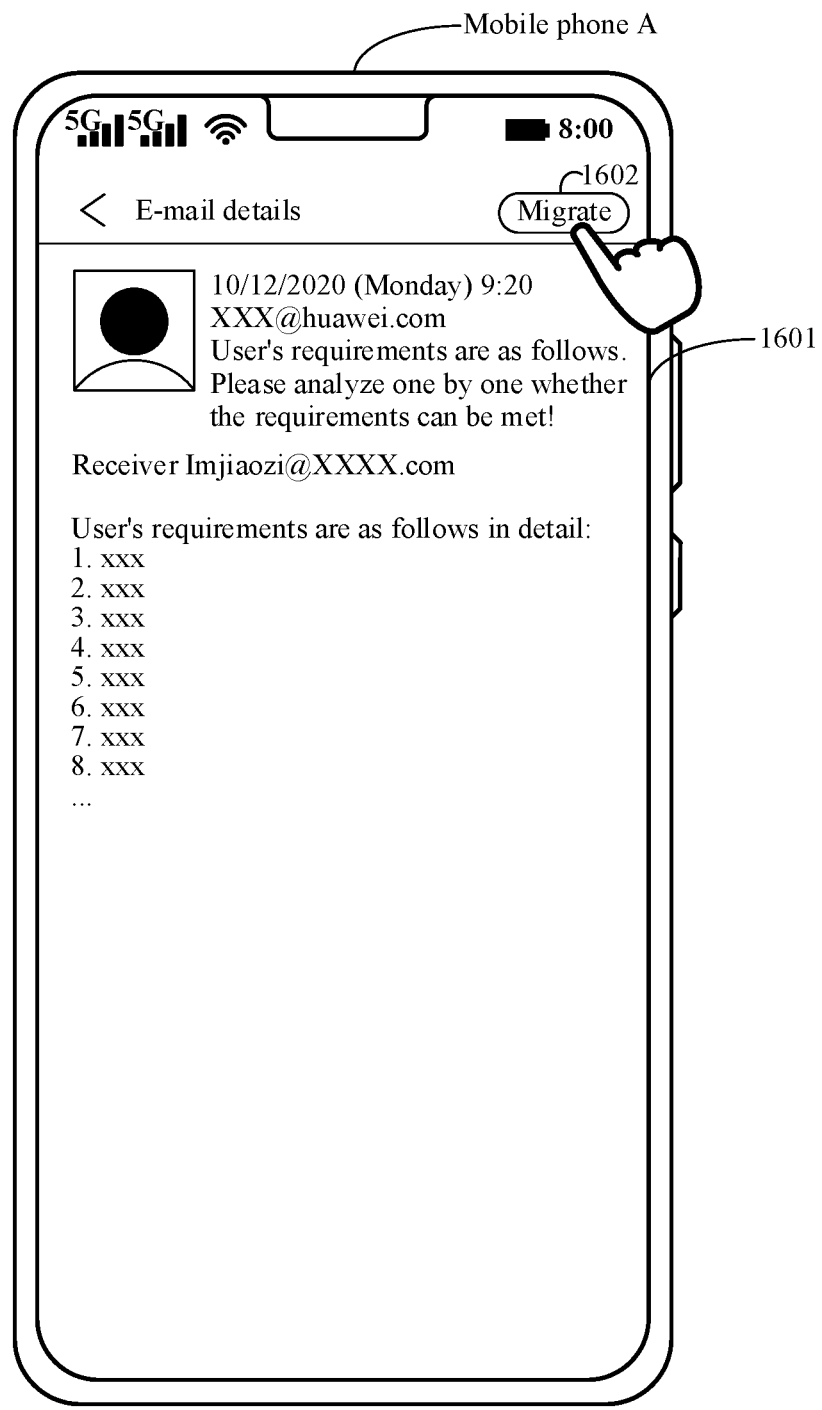
FIG. 16A is another schematic diagram of displaying according to an embodiment of this disclosure.
Figure 16B:
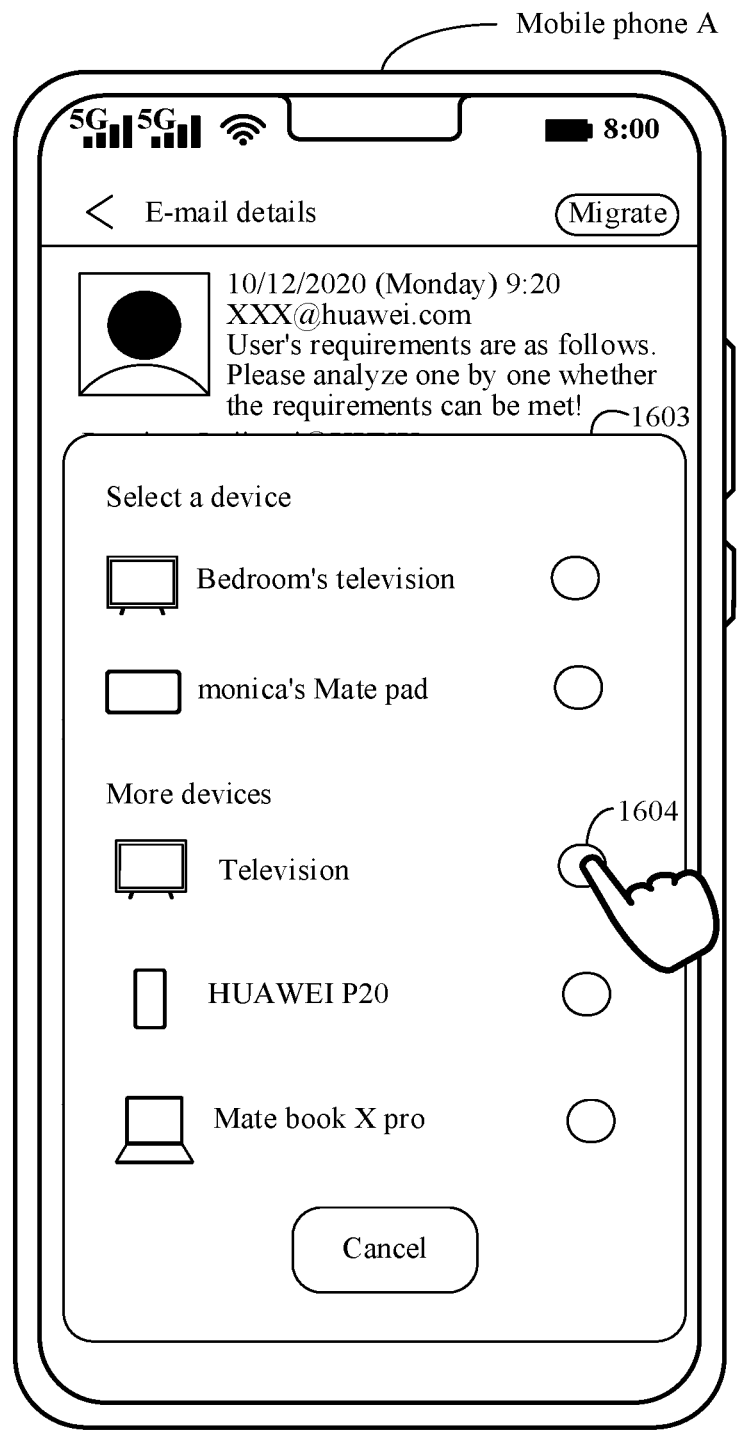
FIG. 16B and FIG. 16C are another schematic diagram of displaying according to an embodiment of this disclosure.
Figure 16C:
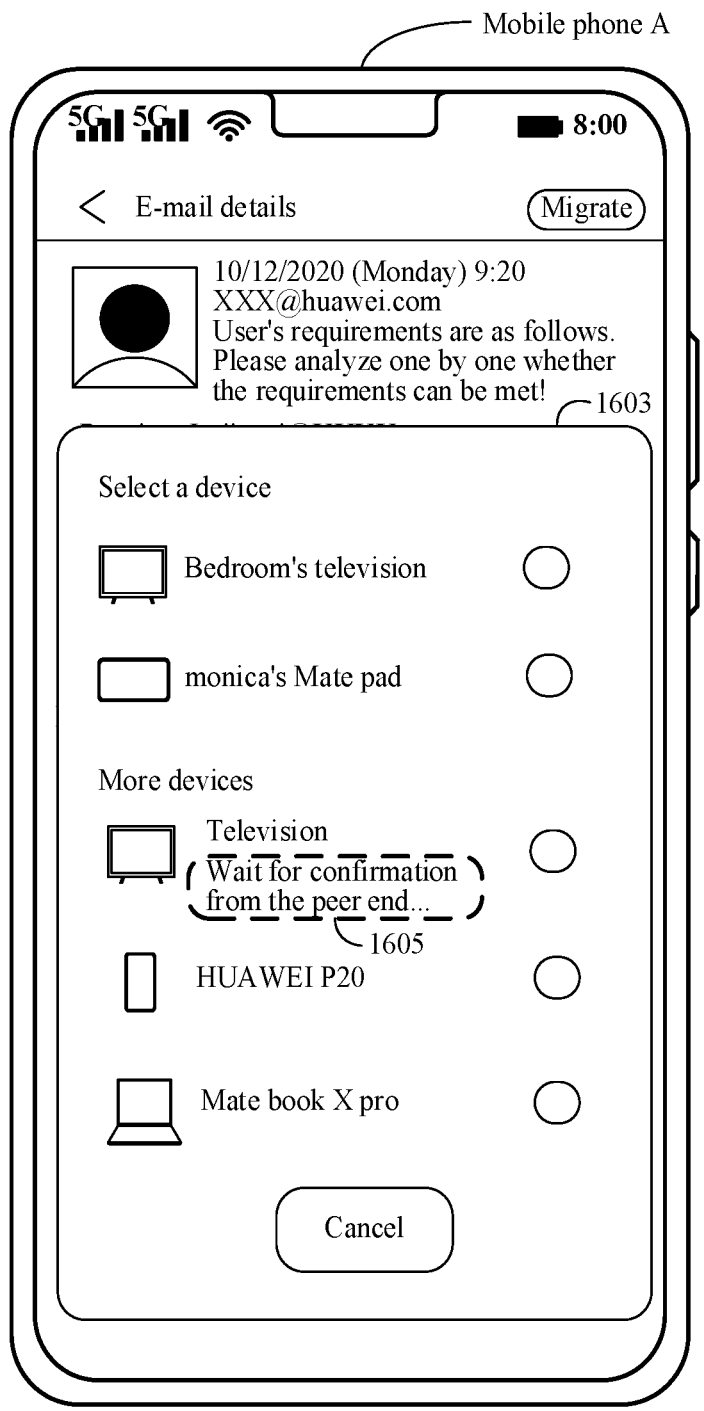
Figure 16D:
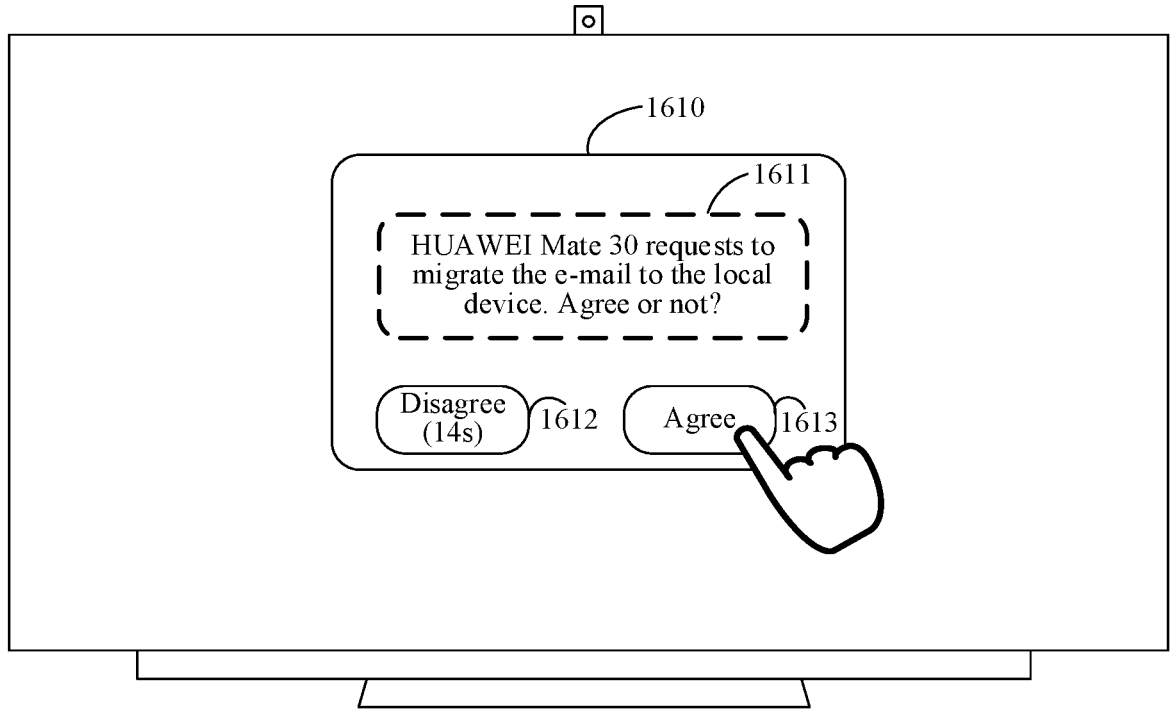
FIG. 16D is another schematic diagram of displaying according to an embodiment of this disclosure.
Figure 16E:
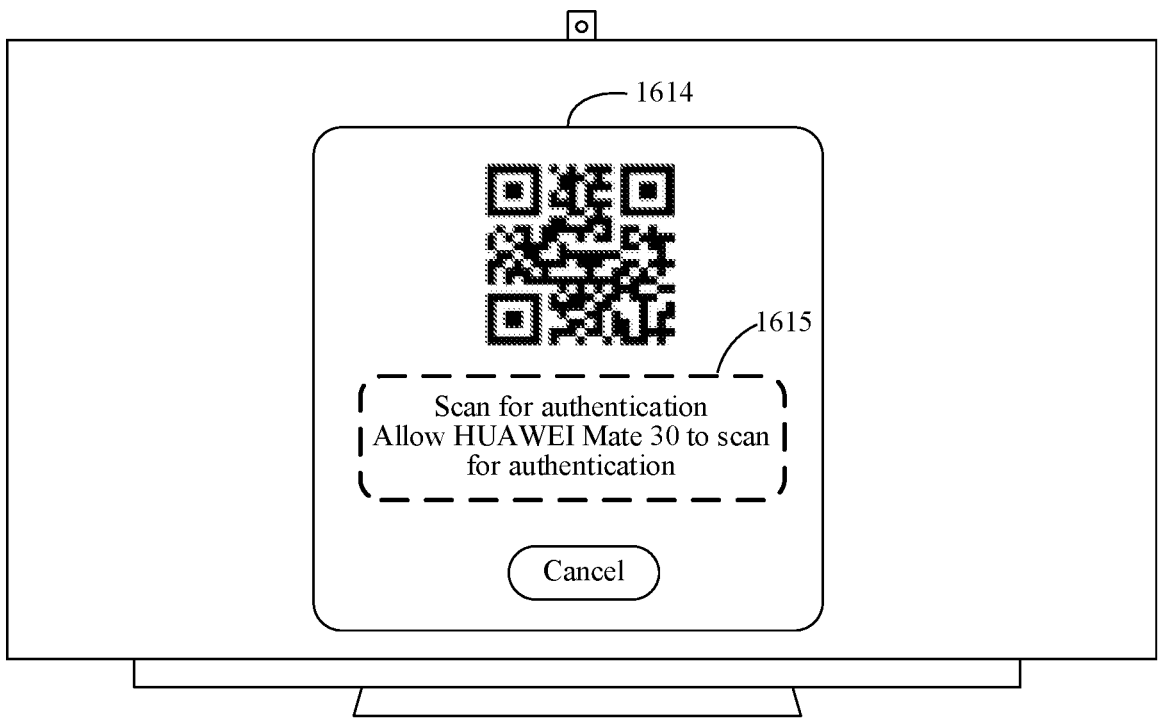
FIG. 16E is another schematic diagram of displaying according to an embodiment of this disclosure.
Figure 16F:
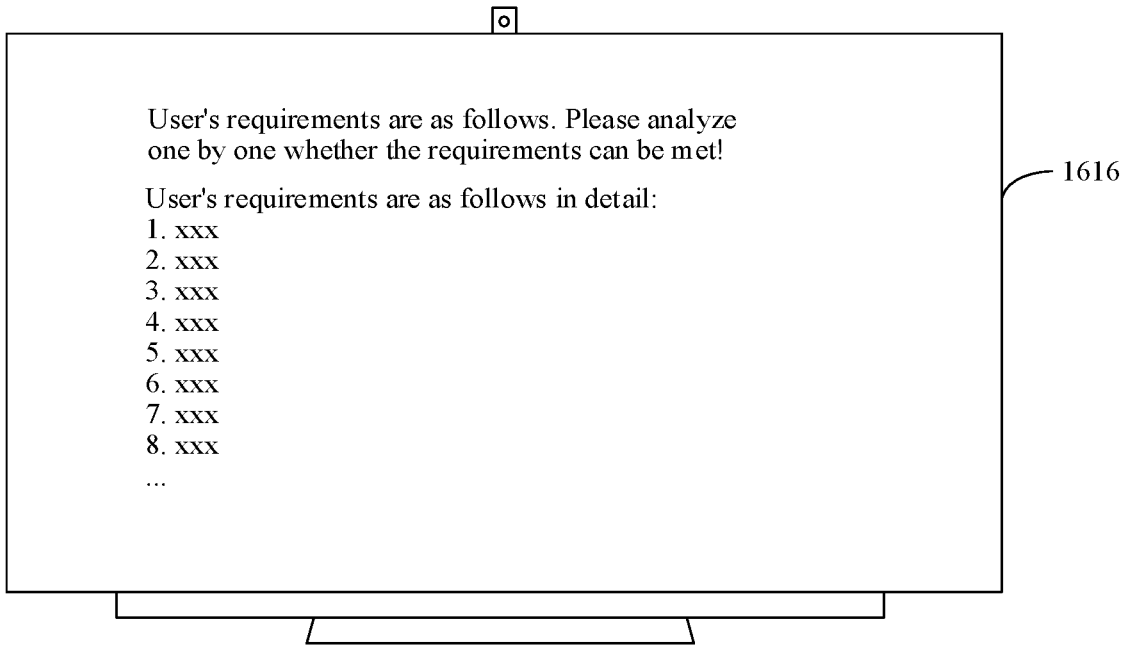
FIG. 16F is another schematic diagram of displaying according to an embodiment of this disclosure.

For example, after a user receives and opens an e-mail on a mobile phone A, as shown in FIG. 16A, the mobile phone A may display an e-mail interface 1601 (where the e-mail interface 1601 may be considered as an FA, for example, FA8). In response to an operation of tapping a "Migrate" button 1602 (where the "Migrate" button is for migrating (sending) the e-mail interface of the mobile phone A to another device (for example, a television)) in the e-mail interface 1601 by the user, as shown in FIG. 16B, the mobile phone A may pop up a pop-up box 1603. The pop-up box 1603 may include nearby devices, and the nearby devices include authenticated devices (monica's Mate pad and the like) and unauthenticated devices (Television, HUAWEI P20, Mate book X pro, and the like). In response to an operation of tapping, by the user, a control 1604 corresponding to Television (an unauthenticated device), the mobile phone A may send an authentication request message to the television. In addition, as shown in FIG. 16C, prompt information 1605 "Wait for confirmation from the peer end" may be displayed below Television. As shown in FIG. 16D, the television may display a pop-up box 1610. The pop-up box 1610 includes prompt information "HUAWEI Mate 30 (the mobile phone A) requests to migrate the e-mail to the local device. Agree or not?", and may further include a "Disagree" button 1614 and an "Agree" button 1615. In response to an operation of tapping the "Agree" button 1613 by a user, as shown in FIG. 16E, the television may display a pop-up box 1614. The pop-up box 1614 may include a two-dimensional code image generated by the television, and may further include prompt information 1615 "Scan for authentication. Allow HUAWEI Mate 30 to scan for authentication". In this case, the user of the mobile phone A may scan the two-dimensional code image presented by the television, and then the television may receive the e-mail interface (FA8) from the mobile phone A. As shown in FIG. 16F, the television may display an e-mail interface 1616. Alternatively, in response to an operation of tapping the "Agree" button 1613 by the user, the television may receive the e-mail interface (FA8) from the mobile phone A. As shown in FIG. 16F, the television may display an e-mail interface 1616.

Figure 17A:
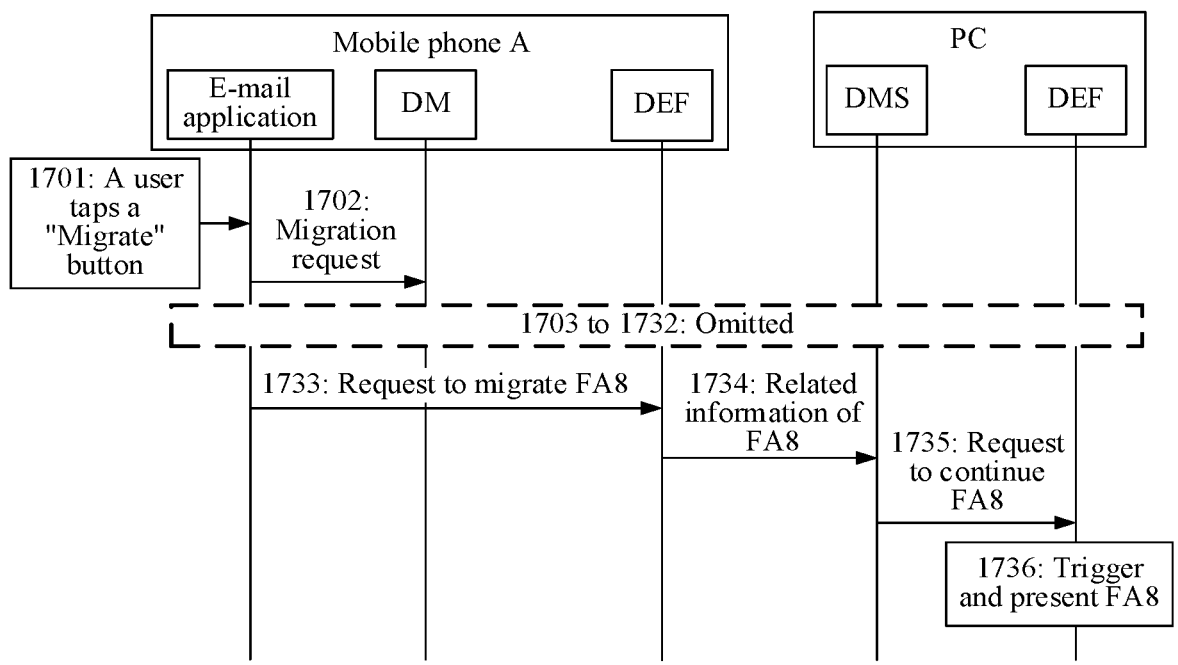
FIG. 17A is another schematic diagram of signal exchange according to an embodiment of this disclosure.

The following uses the mailbox application as an example to describe a specific implementation of the method provided in embodiments of this disclosure. A method provided in an embodiment of this disclosure may be applied to two near-field devices, for example, a mobile phone A and a PC. The mobile phone A may use an ANDROID system, the PC may use HarmonyOS, and the mobile phone A and the PC are devices with different accounts. As shown in FIG. 17A, the method includes the following steps.

1701: A user taps a "Migrate" button in a mailbox application of the mobile phone A.

The user opens and edits an e-mail on the mobile phone, and taps the "Migrate" button in an editing interface.

1702: The mailbox application of the mobile phone A initiates a migration request to a DM of the mobile phone A.

Information carried in the migration request includes an initiating-end package name (a local mailbox application package name), a continuing-end package name (a peer mailbox application package name), and a name of the mobile phone A.

For step 1703 to step 1732, refer to related descriptions of step 903 to step 932. Details are not described herein again. A part of step 903 to step 932 may be optional.

1733: The mailbox application of the mobile phone A requests a DEF of the mobile phone A to migrate FA8.

The mailbox application may include parameters of the local device and a target device (for example, identifiers of the local device and the target device) to request the DEF of the mobile phone A to continue FA8.

1734: The DEF of the mobile phone A sends related information of FA8 to a DMS of the PC.

The related information of FA8 may include e-mail content information, where the e-mail content information may include information such as a subject, text, and an attachment.

1735: The DMS of the television requests a DEF of the television to continue a service.

1736: The DEF of the television triggers and presents FA8.

If a mailbox client is installed on the television, the DEF of the television may detect whether the mailbox client and an account have been logged in to, and notify the user to log in to the mailbox account, so that the mailbox application can trigger and present FA8, to be specific, display an e-mail interface migrated from the mobile phone A.

If a mailbox client is not installed on the television, the DEF of the television may trigger and present FA8, to be specific, encode and rearrange FA8 for displaying. In this way, a device that does not log in to/is not installed with the mailbox client can also present the e-mail content, and disclosure of privacy information such as the e-mail account can be avoided. In addition, if the DEF of the television does not support presenting FA8, an FA that can present FA8 may be downloaded from an application market and installed (where the FA may be developed by a third-party application vendor).

Further, the user may perform operations such as editing and replying on the e-mail on the PC. The edited and replied e-mail content may be sent back to the mobile phone A through a data communication channel, and the e-mail is sent based on account information of the mobile phone A. In this way, one-tap migration can be implemented even if the mailbox client is not installed on the television or the television does not log in to the mailbox account, improving user experience and office efficiency. A migration device may be used only for presentation and editing, and the e-mail is finally sent and received by a migration initiating end. The migration device can view only an e-mail actively pushed by the initiating end. After a process ends, content is proactively destroyed, ensuring that the e-mail is seamlessly migrated with the user.

In this disclosure, the e-mail can be transferred between a plurality of devices, login to a same device account is not required, and it is not required that all devices be installed with the mailbox client and log in to the mailbox account, so that a range of available devices is greatly expanded.

Figure 17B:
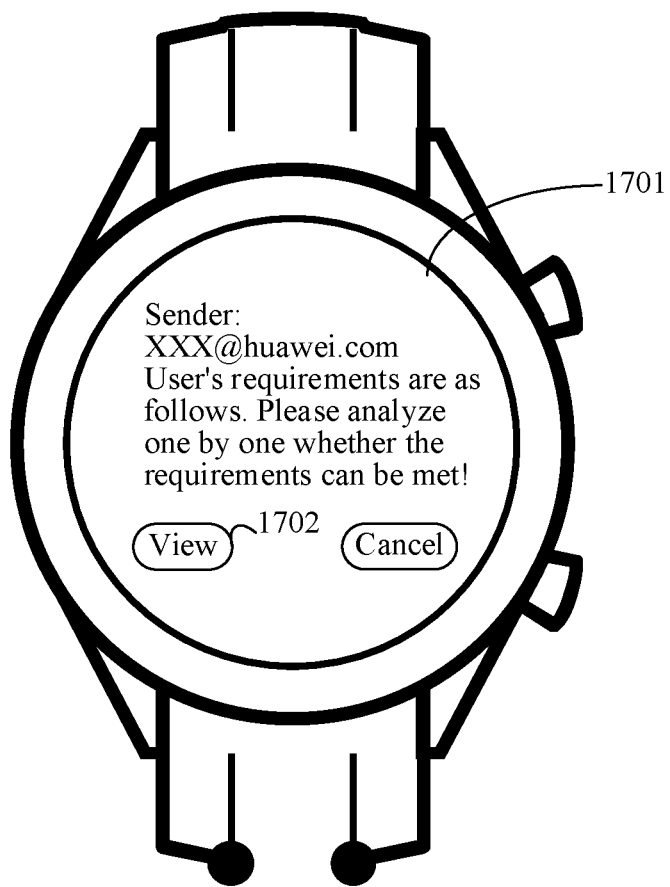
FIG. 17B is another schematic diagram of displaying according to an embodiment of this disclosure.
Figure 17C:
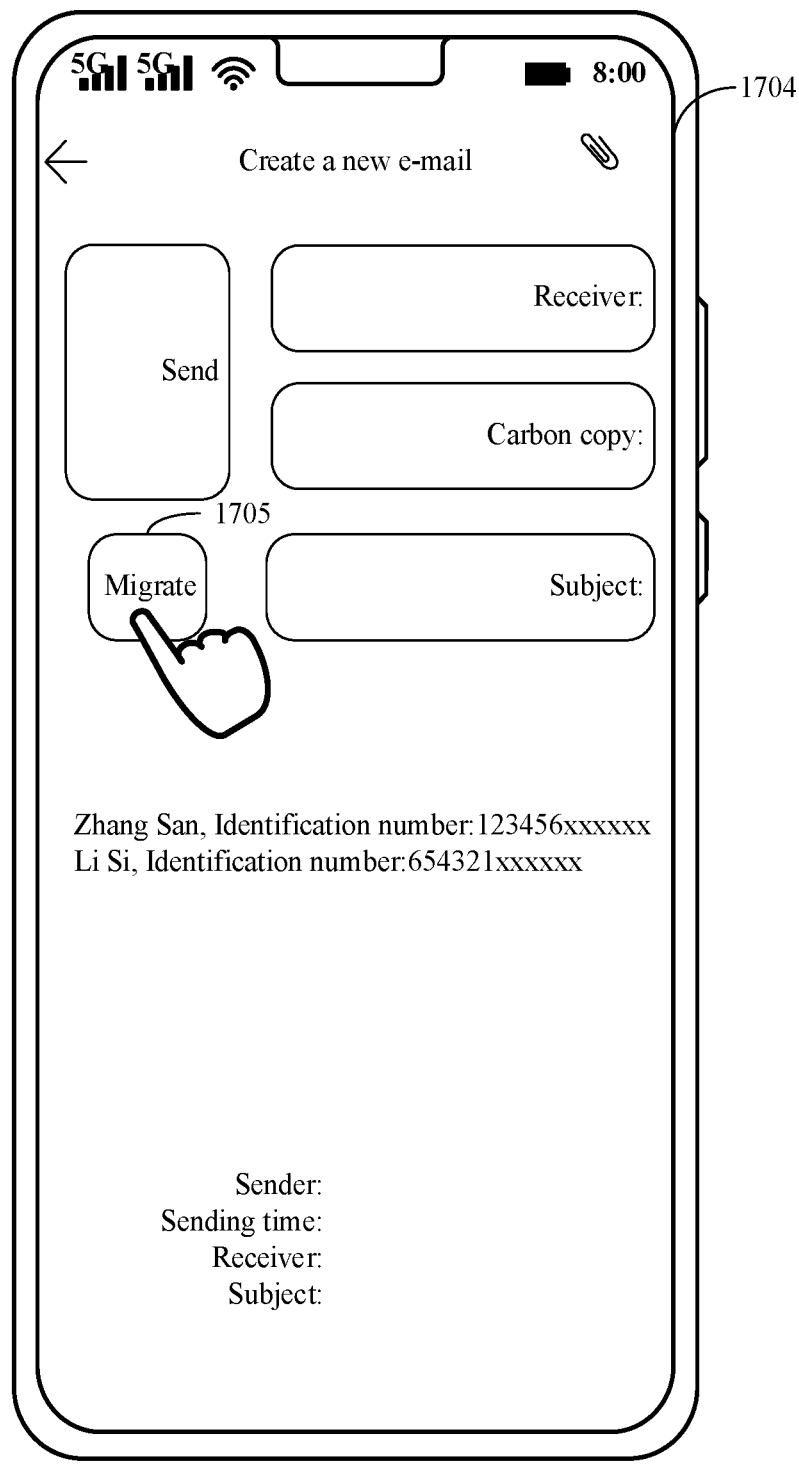
FIG. 17C is another schematic diagram of displaying according to an embodiment of this disclosure.
Figure 17D:
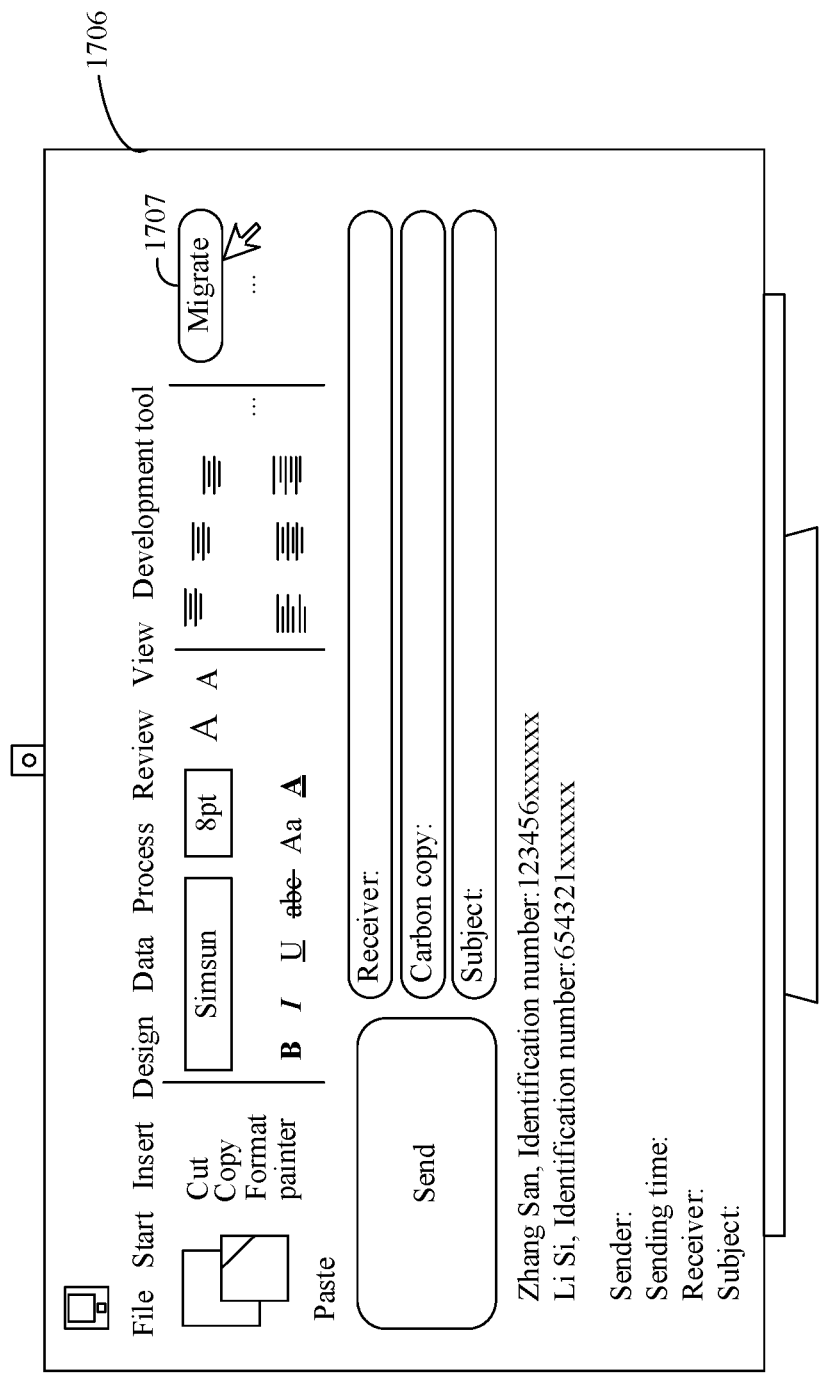
FIG. 17D is another schematic diagram of displaying according to an embodiment of this disclosure.

In addition, if networking and authentication between two devices have been completed, a "Migrate" button can be directly tapped to complete migration. This is more convenient and quicker. For example, it is assumed that networking and authentication between a watch, a mobile phone, and a PC have been completed. As shown in FIG. 17B, after receiving an e-mail notification, the watch of a user may display an e-mail notification interface 1701, to notify the user that there is an e-mail. In response to an operation of tapping a "View" button 1702 by the user, as shown in FIG. 17C, the watch may directly trigger an e-mail view interface 1704 on a mobile phone side (where the watch may send an e-mail view request to the mobile phone, and the mobile phone may directly display the e-mail view interface 1704), to directly display e-mail text. In a process in which the user edits a reply e-mail on the mobile phone, if a document needs to be inserted, but the document is stored in the PC, the user may tap a "Migrate" button 1705 on the mobile phone to migrate the e-mail to the PC. As shown in FIG. 17D, the PC may display an e-mail editing interface 1706. After inserting an attachment in the e-mail editing interface 1706, the user may tap a "Migrate" button 1707 to migrate the e-mail carrying the attachment to the mobile phone again. In this way, the watch, the mobile phone, and the PC can collaborate to work conveniently and quickly, and user experience is high.

This disclosure implements one-tap migration and seamless transfer of the e-mail between mobile office and non-mobile office based on a near-field cross-device FA migration technology, to greatly improve multi-device collaborative office experience. Multi-device e-mail migration is not restricted by the user account/mailbox client/mailbox account, so that a plurality of types of devices in a same network can be covered, thereby greatly expanding a use scenario of the e-mail migration.

In the foregoing embodiment, a receiver (a passive migration device, for example, the mobile phone B or the television) generates two-dimensional code information, and an initiator (an active migration device, for example, the mobile phone A) parses the two-dimensional code information of the mobile phone B to join the group created by the mobile phone B, to perform authentication.

In some other embodiments, the initiator (the active migration device, for example, the mobile phone A) may alternatively generate two-dimensional code information, and the receiver (the passive migration device, for example, the mobile phone B or the television) performs authentication based on the two-dimensional code information of the mobile phone A.

Figure 18A:
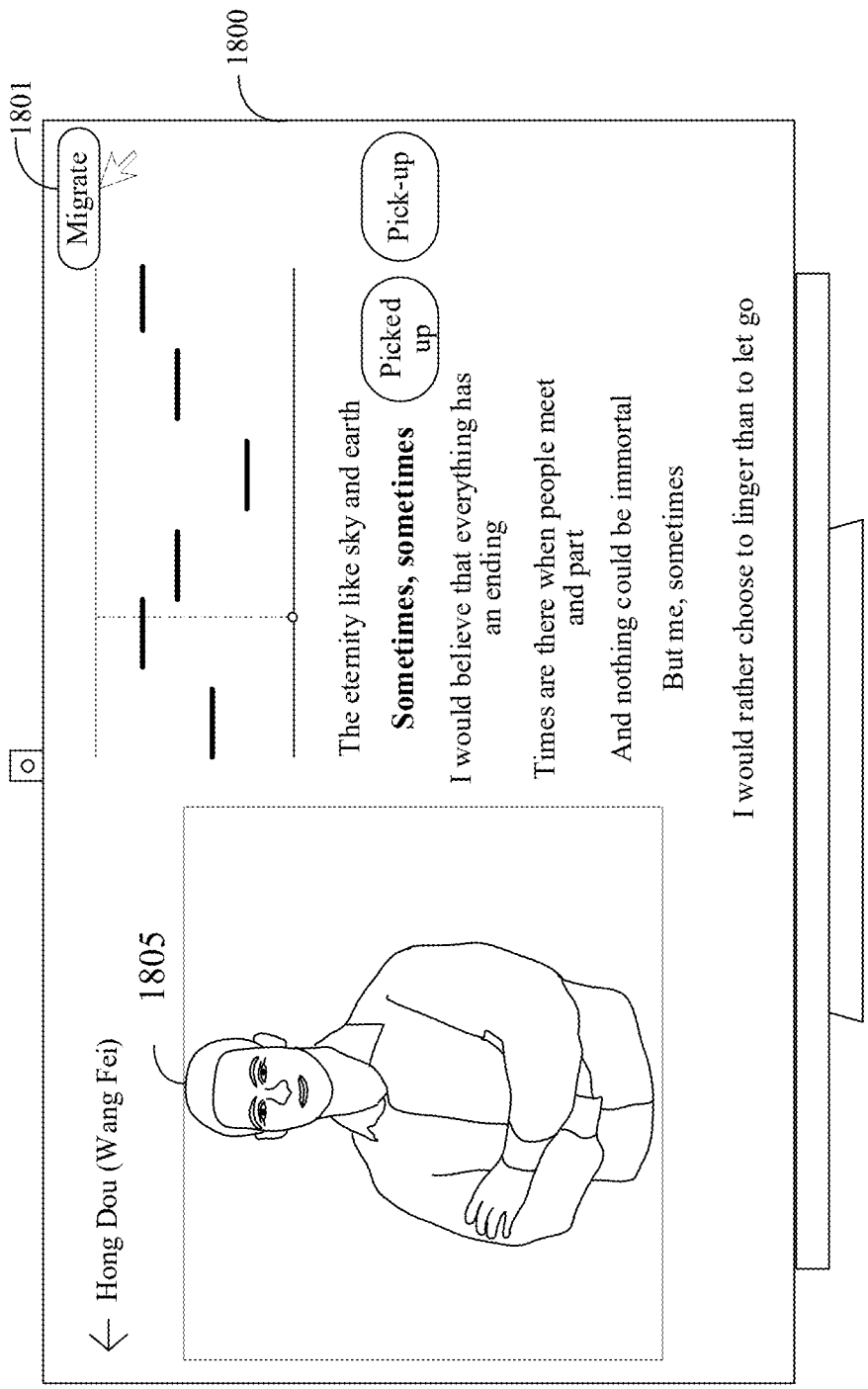
FIG. 18A is another schematic diagram of displaying according to an embodiment of this disclosure.
Figure 18B:
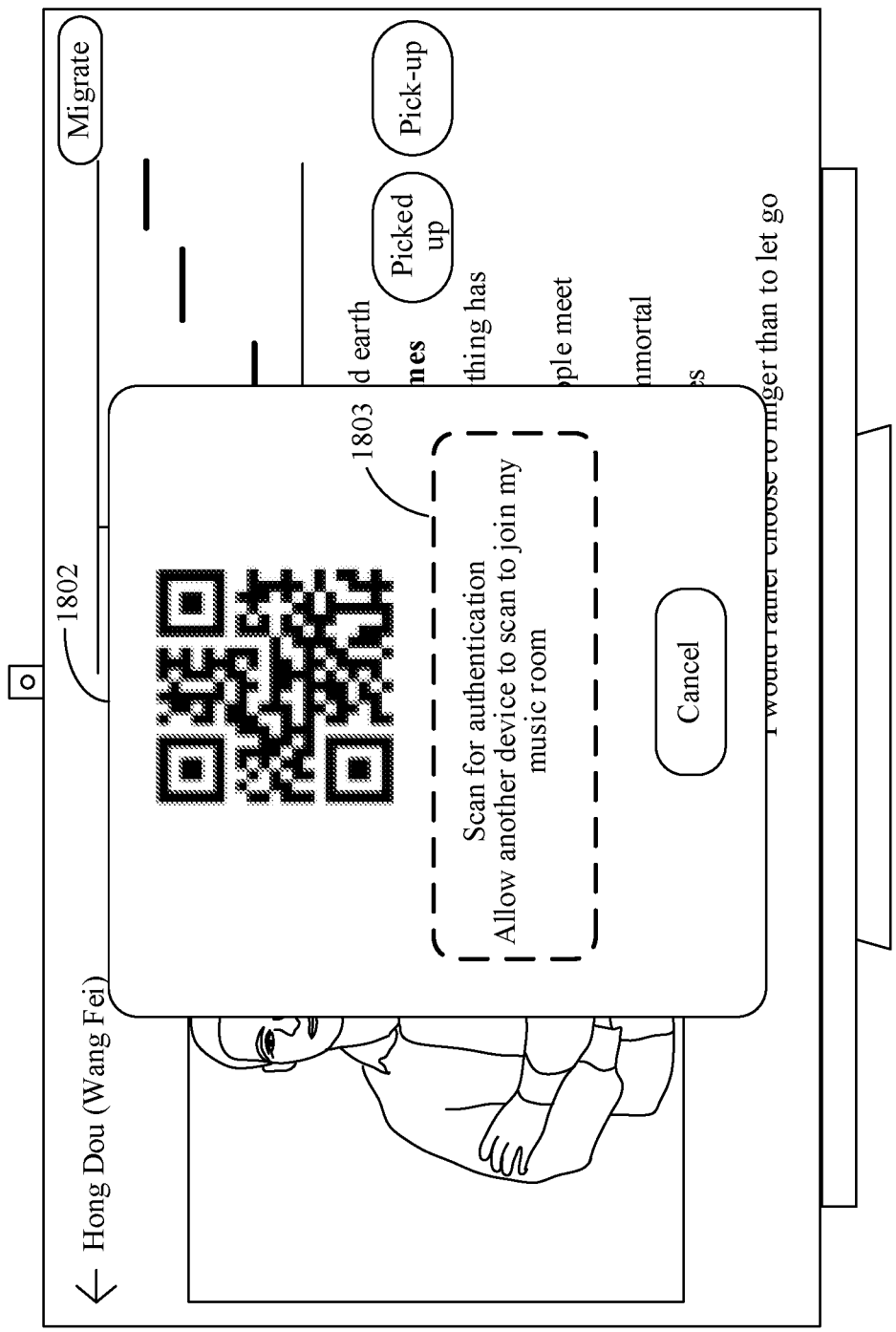
FIG. 18B is another schematic diagram of displaying according to an embodiment of this disclosure.
Figure 18C:
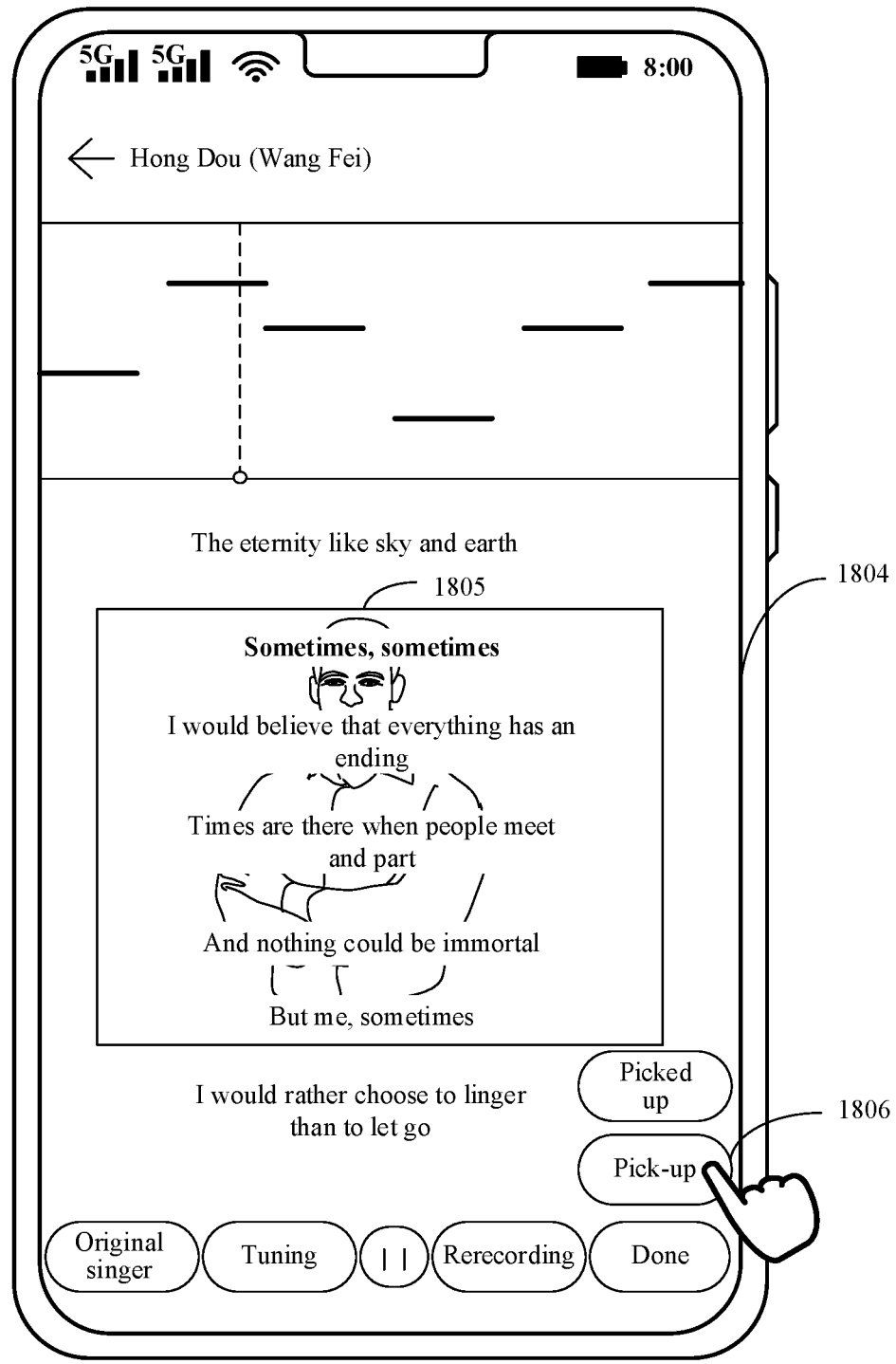
FIG. 18C and FIG. 18D are another schematic diagram of displaying according to an embodiment of this disclosure.
Figure 18D:
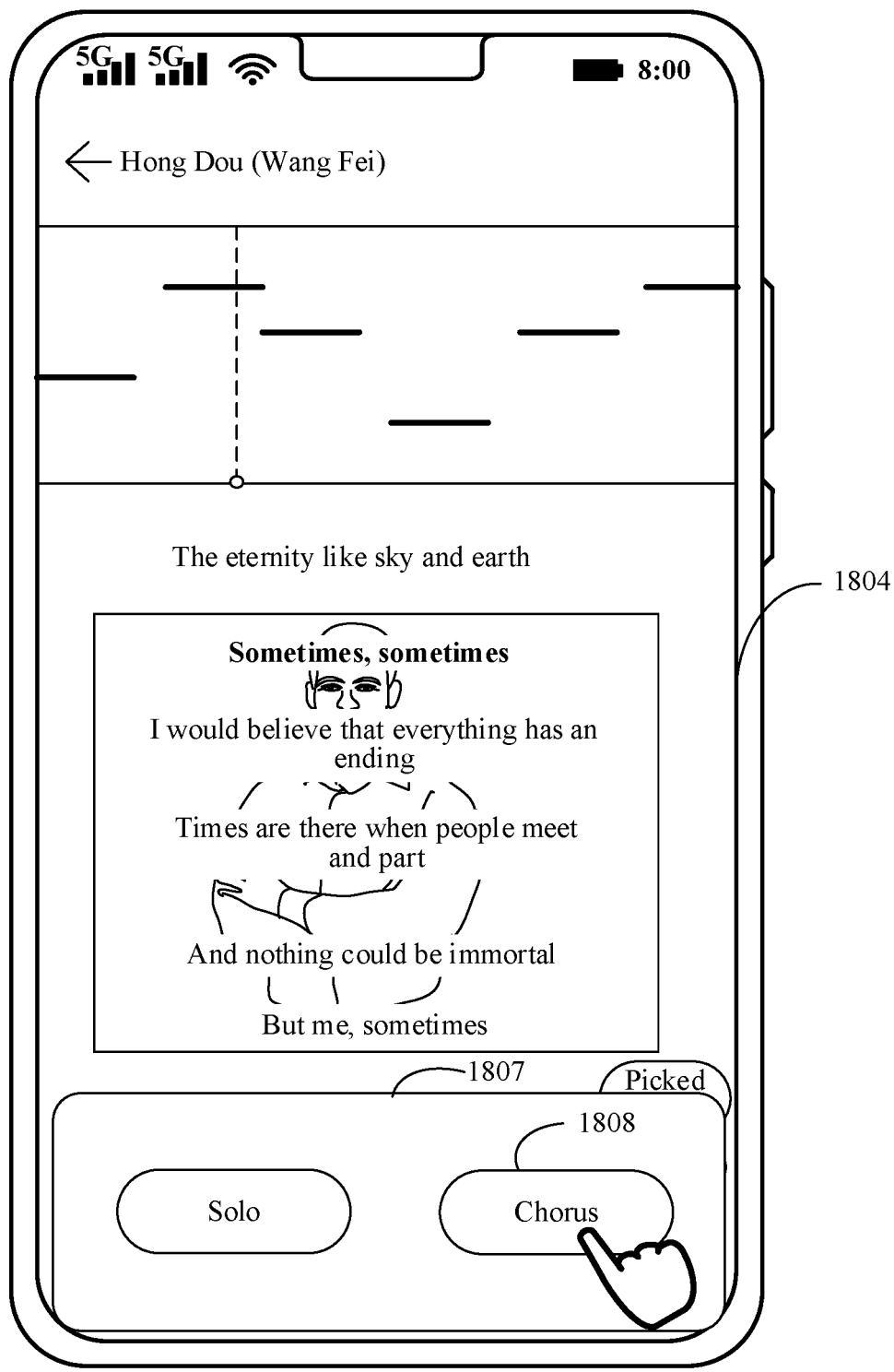
Figure 18E:
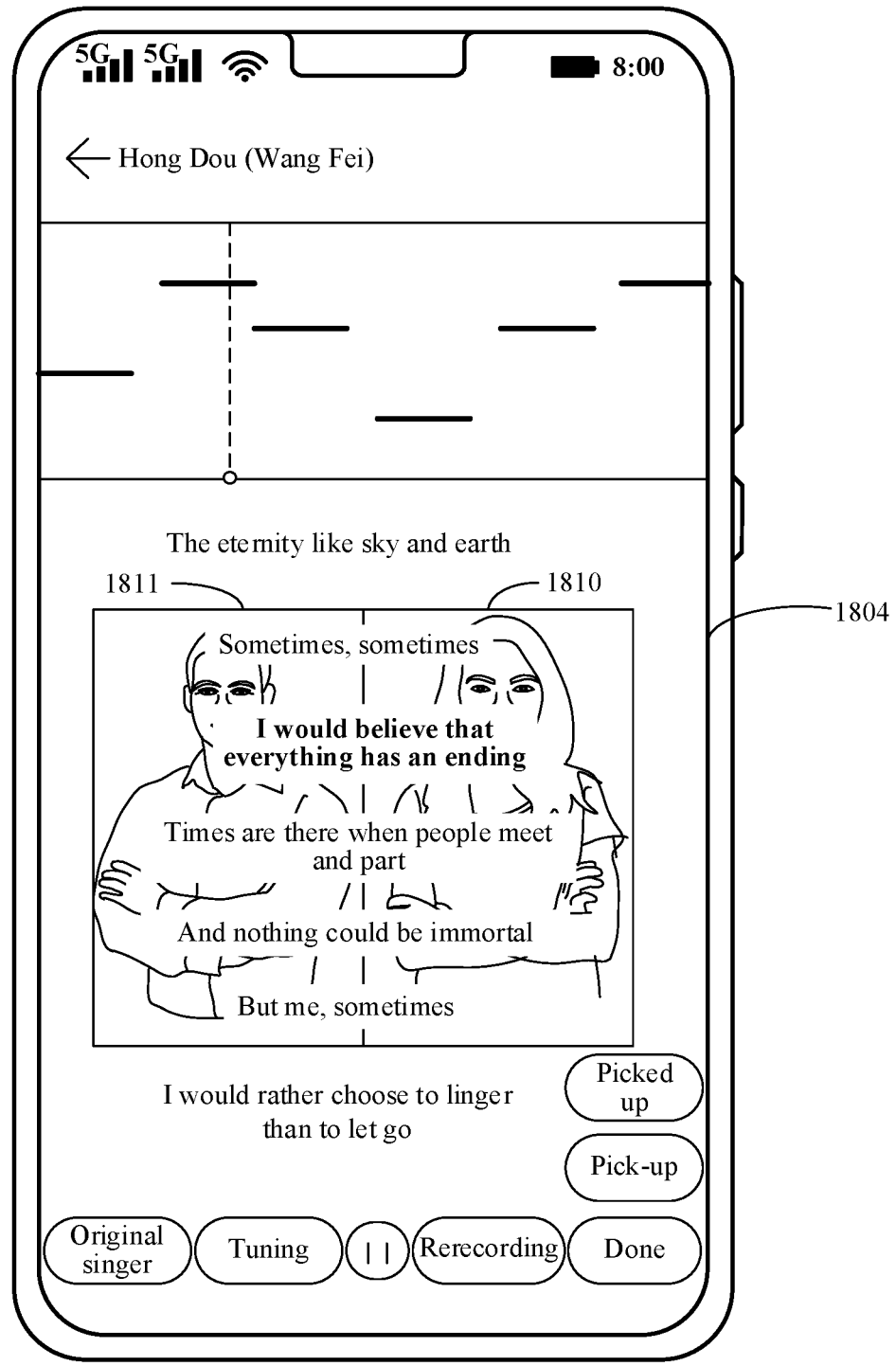
FIG. 18E is another schematic diagram of displaying according to an embodiment of this disclosure.

For example, as shown in FIG. 18A, a user A may select a "Migrate" option 1801 (where the "Migrate" option 1801 is for migrating (sending) a karaoke interface of a television to another device (for example, a mobile phone B)) in the karaoke interface 1800 of the television. Optionally, the user A may select the "Migrate" option through a control device (for example, a remote control or a mobile phone). Alternatively, if the television is a touch device, the user A may directly tap the "Migrate" option to select the "Migrate" option. As shown in FIG. 18B, the television may pop up a pop-up box 1802. The pop-up box 1802 may include a two-dimensional code image generated by the television, and may further include prompt information 1803 "Scan for authentication. Allow another device to scan to join my music room". A user B may scan, by using a mobile phone B, the two-dimensional code image displayed by the television (where the mobile phone B may use a scanning entry provided by a third-party application (for example, a karaoke application), or may use a scanning entry provided by a system). Then, as shown in FIG. 18C, the mobile phone B may display a karaoke interface 1804, and a profile photo 1805 (a profile photo of an account for the karaoke application that the television logs in to or a profile photo of a device account (for example, a HUAWEI account) that the television logs in to) of the user A may be displayed at a deepest layer of lyrics, to indicate that the user A is currently singing a song. In response to an operation of tapping a "Sing" button 1806 by the user, as shown in FIG. 18D, the mobile phone B may display a pop-up box 1807. In response to an operation of tapping a "Chorus" button 1808 by the user, as shown in FIG. 18E, a profile photo 1811 (the profile photo of the account for the karaoke application that the television logs in to or the profile photo of the device account (for example, the HUAWEI account) that the television logs in to) of the user A and a profile photo 1810 (a profile photo of an account for the karaoke application that the mobile phone B logs in to or a profile photo of a device account (for example, a HUAWEI account) that the mobile phone B logs in to) of the user B indicate that the user B and the user A sing a same song together.

Figure 19A:
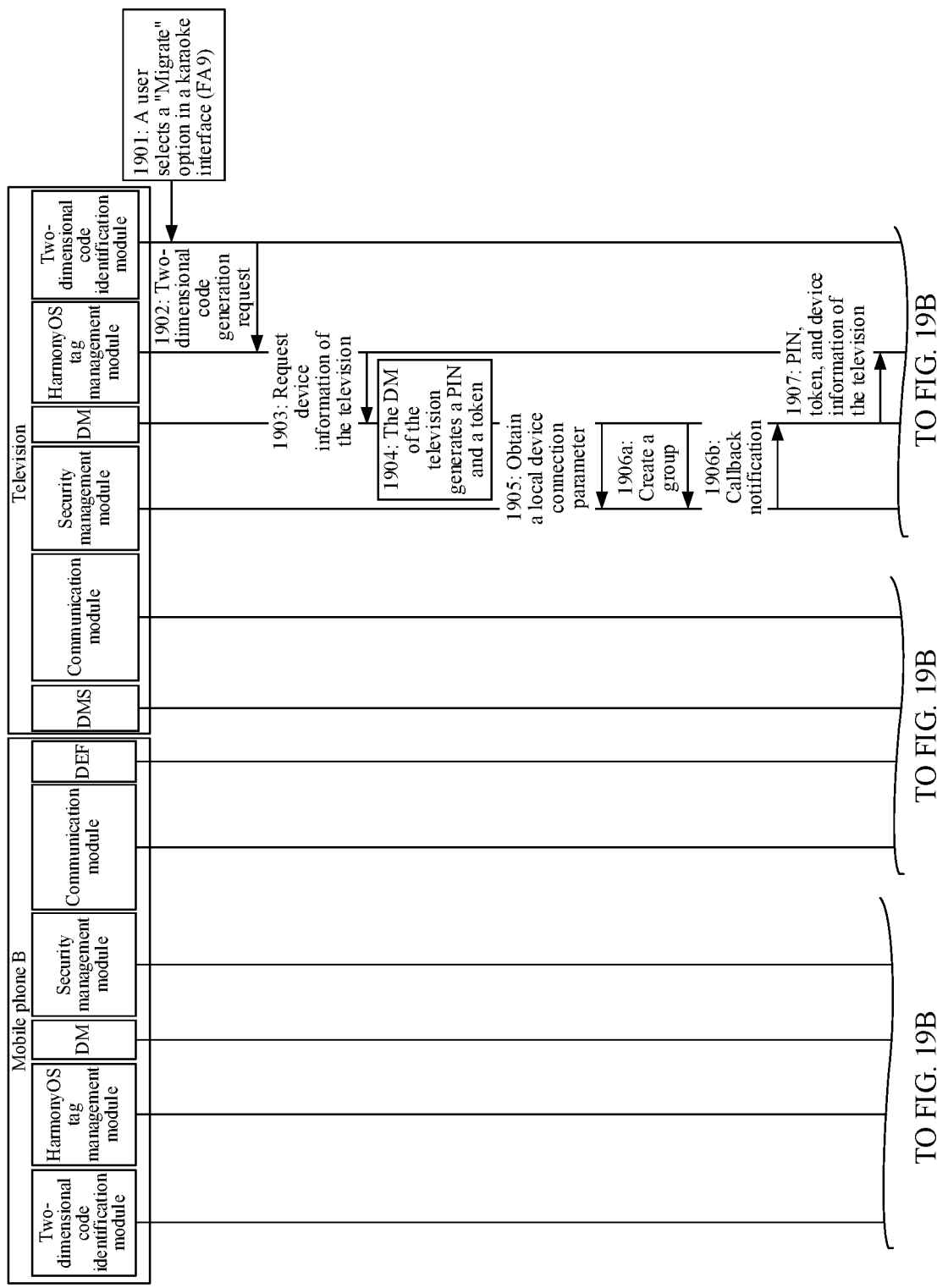

The following uses the karaoke application as an example to describe a specific implementation of the application-level authentication method provided in embodiments of this disclosure. A method provided in an embodiment of this disclosure may be applied to two near-field devices, for example, a television and a mobile phone B. The television and the mobile phone B are devices with different accounts (for example, with different Huawei account), and a karaoke application is opened on both the television and the mobile phone B. As shown in FIG. 19A to FIG. 19C, the method includes the following steps.

1901: A user selects a "Migrate" option in a karaoke interface of the television.

For example, as shown in FIG. 18A, the user may select the "Migrate" option 1801 in the karaoke interface of the television (where the "Migrate" option 1801 is for migrating (sending) a series of karaoke interfaces (where for example, the series of karaoke interfaces may be considered as FA9) of the television to another device (for example, the mobile phone B)). The "Migrate" option may also be referred to as a "Share" option, a "Send" option, or the like. This is not limited in this disclosure.

Optionally, the user may select the "Migrate" option through a control device (for example, a remote control or a mobile phone). Alternatively, if the television is a touch device, the user may directly tap the "Migrate" option to select the "Migrate" option.

Optionally, after selecting the "Migrate" option 1801, the user may further select a device to which the series of karaoke interfaces are to be migrated, for example, may select the mobile phone B.

1902: A two-dimensional code identification module of the television initiates a two-dimensional code generation request to a HarmonyOS tag management module of the television.

For example, input parameters of the two-dimensional code generation request include one bundle object and one asynchronous callback. The bundle object includes a source package name (a local karaoke application package name) and a destination package name (a peer karaoke application package name or a package name of a to-be-migrated FA) required by a karaoke service. The asynchronous callback includes a two-dimensional code creation result. If the two-dimensional code is created successfully, a two-dimensional code field may be obtained. If the two-dimensional code fails to be created, an error code is obtained.

1903: The HarmonyOS tag management module of the television requests device information of the television from a DM of the television.

The device information of the television may include a name, a network ID (netId), a device IP (deviceIP), and the like of the television.

The bundle object is for storing the device information obtained by the HarmonyOS tag management module to the device manager for creating a group and subsequently sending information such as a client application package name to the peer device through a channel.

1904: The DM of the television generates a PIN.

The DM of the television may generate a random PIN. The PIN may be a random number having several digits. Optionally, the DM of the television may further generate a token, where the token may be a random character string having several bits.

1905: Optionally, the DM of the television calls a security management module to obtain a local device connection parameter.

The local device connection parameter may include the network ID (netId), the device IP (deviceIP), a BLUETOOTH address (BtMac), and a WI-FI address (WI-FIPort) of the local device. The netId is stored locally.

1906a: The DM of the television calls the security management module to create the group.

The created group may be (local device name (namely, the television, for example, HUAWEI TV), local karaoke application package name, (peer device name, which may be empty), peer karaoke application package name/package name of the to-be-migrated FA). The group currently lacks at least one member, and another device is allowed to join the group as a member.

1906b: Optionally, after successfully creating the group, the security management module sends a callback notification to the DM of the television.

1907: After receiving the callback notification, the DM of the television sends the PIN, the token, and the device information of the television to the HarmonyOS tag management module.

The DM of the television stores a group name (groupName) locally, packs the PIN, the token, and the device information of the television into a bundle type, and transmits the bundle type to the HarmonyOS tag management module through a callback by the device manager.

1908a: The HarmonyOS tag management module generates a two-dimensional code image based on the PIN, the token, and the device information of the television.

1908b: The HarmonyOS tag management module sends two-dimensional code information to the two-dimensional code identification module.

1908c: The two-dimensional code identification module generates the two-dimensional code image based on the two-dimensional code information and displays the two-dimensional code image.

The two-dimensional code identification module may call a display function of the television, to display the two-dimensional code image on a display screen of the television.

1909a: The mobile phone B turns on a two-dimensional code identification module to scan the two-dimensional code image displayed by the television.

1909b: The two-dimensional code identification module of the mobile phone B identifies the two-dimensional code information (or a two-dimensional code tag) in the two-dimensional code image, triggers a HarmonyOS tag management module, and transfers the two-dimensional code information into the HarmonyOS tag management module.

1909c: The HarmonyOS tag management module parses the two-dimensional code information, and extracts a field (a character string) stored in the two-dimensional code information.

1910: The HarmonyOS tag management module of the mobile phone B sends an authentication request message to a DM of the mobile phone B and registers a callback.

The authentication request message includes the field obtained by parsing the two-dimensional code information.

1911a: The DM of the mobile phone B processes the authentication request message.

The DM of the mobile phone B may split the field included in the authentication request message to obtain deviceIp and WI-FIPort fields, and call an interface of a communication module based on the deviceIp and WI-FIPort fields to create a communication channel between the mobile phone B and the television.

1911b: Optionally, the DM of the mobile phone B sends an authentication request message to the DM of the television through the communication module.

The DM of the mobile phone B may set a token as a parameter requestId. It may be understood that the DM of the mobile phone B may further send information such as a device ID of the mobile phone B to the DM of the television through the communication module.

1912: Optionally, the DM of the television verifies the token.

The DM of the television extracts the token based on the parameter requestId, compares the extracted token with the token stored locally, and if the tokens are consistent, agrees to create a secure communication channel (where for example, the secure communication channel may be a communication channel protected through encryption) between the two devices (namely, the television and the mobile phone B), and sends group information to the mobile phone B through the secure communication channel, where the group information includes the network ID of the television and a group ID (groupId), a group type (groupType), the group name (groupName), and the like of the group created by the television.

1913: The DM of the mobile phone B receives and stores the group information sent by the television.

1914: The DM of the mobile phone B calls a security management module to obtain all group information that has a trusted relationship with the peer device, and then queries, through traversing using the security management module, whether the karaoke application of the television has group access permission.

If the karaoke application of the television does not have the permission, the device manager joins a specified group through HiChain. If the device manager successfully joins the group, an onFinish callback of the devices at both ends is triggered. In this method, HiChain is invoked to write package name information of the peer end for subsequent query of an application-level trusted relationship. If the karaoke application of the television already has the permission, step 1915 is performed.

1915: A DMS of the mobile phone B receives related information of FA9 from a DEF of the television.

The related information of FA9 may include song information of karaoke, and the song information includes at least one of a song title (for example, Hong Dou), lyrics, audio information, and video information.

Optionally, operations such as song pick-up and song cut-off performed on the mobile phone B and song list information are synchronously sent to the television through the secure communication channel, to control music playing on a television side.

In some embodiments, if one of the television and the mobile phone B logs in to an account (for example, a Huawei account), and the other one does not log in to the account, the television and the mobile phone B may perform step 1901 to step 1915. In this way, verification (namely, device-level authentication) is performed when the FA migration is performed between the television and the mobile phone B, to ensure security of data between the devices.

In some embodiments, if neither of the television and the mobile phone B logs in to an account (for example, a HUAWEI account), the television and the mobile phone B may perform step 1901 to step 1915. In this way, verification is performed when the FA migration is performed between the television and the mobile phone B, to ensure security of data between the devices.

In some embodiments, if the television and the mobile phone B log in to a same account (for example, a HUAWEI account), the television and the mobile phone B may perform step 1901 to step 1915. In this way, verification is performed when the FA migration is performed between the television and the mobile phone B, to further ensure security of data (for example, the related information of the FA9) between the devices.

It should be noted that a part of step 1901 to step 1915 may be optional, in other words, are not necessary technical features of the device-level authentication solution. For example, step 1905 may be an optional step. For example, the DM of the television may obtain the local device connection parameter from another module. For another example, step 1906*b* may be an optional step, in other words, after successfully creating the group, the security management module may not send the callback notification to the DM of the television. For another example, step 1911*b* and step 1912 may be optional steps, in other words, the DM of the mobile phone B may not send the token to the DM of the television, and the DM of the television does not need to verify the token.

Certainly, a mobile phone C (where the mobile phone C and the mobile phone B have different device accounts, for example, do not log in to a same HUAWEI account) may also join, by scanning a two-dimensional code, the group created by the television (where for a specific process, refer to step 1809 to step 1818). In this way, a plurality of devices may quickly trigger FA9 by scanning the two-dimensional code without pre-installation, to use a service immediately.

In addition, after scanning the two-dimensional code, the plurality of devices may establish a trust circle for information exchange. For example, information such as a song list may be updated and synchronized in real time between the plurality of devices. The plurality of devices (for example, the mobile phone B or the mobile phone C) may coordinately control a chair end (for example, the television) to implement multi-device collaborative control and achieve real mobile KTV experience.

In some other embodiments, an initiator (an active migration device, for example, the television) may generate the two-dimensional code image (for example, perform steps 1901 to 1908*c*), and one or more receivers (one or more passive migration devices, for example, the mobile phone B and the mobile phone C) may perform authentication based on the two-dimensional code image of the television (for example, perform steps 1909*a* to 1914). After the authentication succeeds, the receiver may migrate the shopping cart, the live streaming studio, the e-mail, or the like to the television, so that information such as the shopping cart, the live stream, and the e-mail is shared between a plurality of devices (for example, the television, the mobile phone B, and the mobile phone C). Information such as commodity information in a shopping cart, a live video stream, and e-mail content between the plurality of devices can be updated and synchronized in real time, and the plurality of devices (for example, the television, the mobile phone B, and the mobile phone C) may collaboratively control a chair end (for example, the television), to implement multi-device collaborative control and achieve real experience of collaborative shopping, live streaming, or e-mail editing.

It should be noted that, for the UIs provided in embodiments of this disclosure, for example, FIG. 5A and FIG. 5B to FIG. 5L, FIG. 6A and FIG. 6B to FIG. 6D, FIG. 8A to FIG. 8G, FIG. 10A and FIG. 10B, FIG. 12A and FIG. 12B to FIG. 12G, FIG. 14A to FIG. 14G, FIG. 16A to FIG. 16F, and FIG. 18A to FIG. 18C and FIG. 18D above, interface designs of the UIs are merely examples, and a location, a name, a shape, and the like of each element (for example, a button, an icon, or text) in the UI are not limited. For example, the button 802 (originally in the upper right corner of the interface 801) in FIG. 8A may alternatively be located in a lower right corner of the interface 801, and the text displayed on the button 802 may alternatively be "Share", "Transfer", or the like. In some embodiments, elements of different UIs may be rearranged to be combined into a same UI. For example, the button 502 in FIG. 5A may be replaced with the button 503 and the button 504 in FIG. 5B. A jump relationship between the UIs is not limited in embodiments of this disclosure. For example, if a description, namely, jumping from a first UI to a second UI, appears in embodiments of this disclosure, the description is merely an example of a jump relationship between the first interface and the second interface, and another jump relationship is not limited. For example, as shown in FIG. 5F, in response to the operation of tapping the "Bind" button 509 by the user, as shown in FIG. 5H, the mobile phone may directly display the scanning interface 512. A manner of jumping between the UIs is not limited in embodiments of this disclosure either (where for example, if a description, namely, tapping a first button in the first UI to jump to the second UI, appears in embodiments of this disclosure, the description is merely an example of the manner of jumping between the first interface and the second interface, and another jump manner is not limited). For example, as shown in FIG. 8A, in response to the operation performed by the user with the specific gesture (for example, the three-finger sliding or the knuckle tapping), as shown in FIG. 8B, the mobile phone may display the pop-up box 803.

Figure 20:
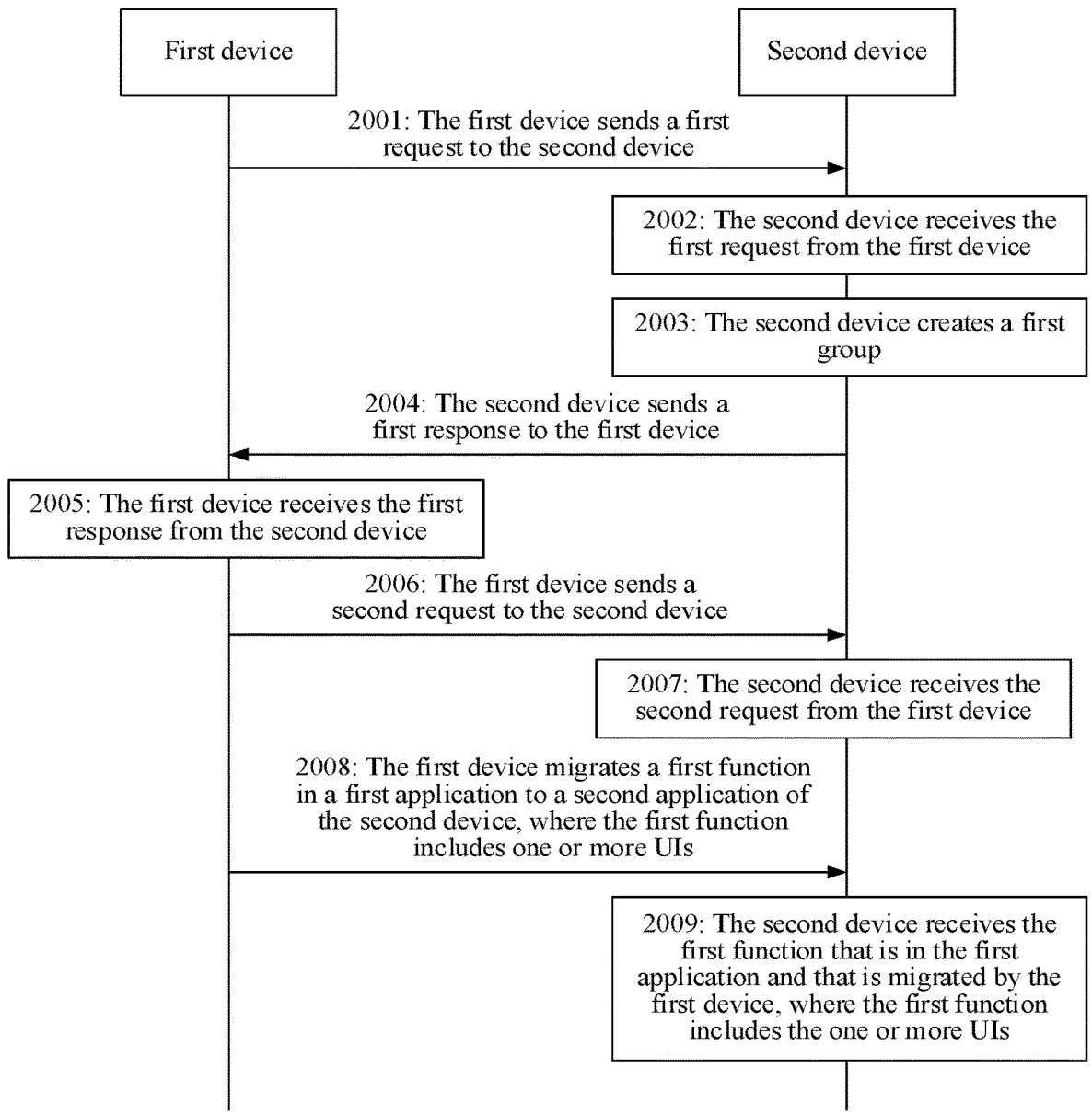
FIG. 20 is another schematic diagram of signal exchange according to an embodiment of this disclosure.

An embodiment of this disclosure provides a function migration method. As shown in FIG. 20, the method includes the following steps.

2001: A first device sends a first request to a second device.

The first request carries an identifier of the first device, an identifier of a first application, and an identifier of a second application. The first request may be the authentication request message in the foregoing embodiments, and related descriptions are not provided herein again.

In a possible implementation, a first pop-up box is displayed in response to a first operation performed by a user on the first application of the first device, where the first pop-up box includes an identifier of a device that is in a same network as the first device, and the first request is sent to the second device in response to a second operation of selecting the second device by the user in the first pop-up box. For example, the first pop-up box herein may be the pop-up box 508 shown in FIG. 5F, the pop-up box 803 shown in FIG. 8B, or the like.

The device that is in the same network as the first device includes a trusted device and an untrusted device, where the trusted device includes a device that logs in to a same account as the first device, a device that has performed device-level authentication with the first device, or a device that has performed application-level authentication with the first application of the first device, and the untrusted device includes a device that does not log in to the same account as the first device, a device that has not performed device-level authentication with the first device, or a device that has not performed application-level authentication with the first application of the first device. The first device may be the mobile phone A in the foregoing embodiments.

2002: The second device receives the first request from the first device.

After receiving the first request, the second device may display a first pop-up box, where the first pop-up box notifies a user whether to agree to add the first application of the first device to the first group, and receive an agreement instruction from the user. For example, the first pop-up box herein may be the pop-up box 531 shown in FIG. 6A, the pop-up box 812 shown in FIG. 8D, or the like.

The second device may be the mobile phone B in the foregoing embodiments.

2003: The second device creates a first group, where a member in the first group includes the second application of the second device.

Before creating the first group, the second device may determine, based on the identifier of the first device, that the second device currently has no second group, where members in the second group include the first device and the second device.

Before creating the first group, the second device may determine, based on the identifier of the first device, the identifier of the first application, and the identifier of the second application, that the second device currently has no third group, where members in the third group include the first application of the first device and the second application of the second device.

2004: The second device sends a first response to the first device.

The first response may include a PIN corresponding to the first group and/or communication connection information of the second device.

2005: The first device receives the first response from the second device.

The first response indicates the first group created by the second device, and the member in the first group includes the second application of the second device.

2006: The first device sends a second request to the second device.

The second request is for applying for adding the first application of the first device to the first group.

In a possible implementation, the second device may display a two-dimensional code image, where the two-dimensional code image includes the PIN corresponding to the first group and/or the communication connection information of the second device. The first device may scan the two-dimensional code image displayed by the second device, and obtain the PIN corresponding to the first group and/or the communication connection information of the second device. The first device may send the second request to the second device based on the PIN and/or the communication connection information of the second device.

Optionally, the first device sends the second request to the second device based on the PIN and/or the communication connection information of the second device.

2007: The second device receives the second request from the first device.

The second device may add the first application of the first device to the first group based on the second request.

Optionally, the second device may send a second response to the first device, and the first device may receive the second response, where the second response indicates that the first application of the first device has joined the first group.

2008: The first device migrates a first function in the first application to the second application of the second device, where the first function includes one or more UIs.

In a possible implementation, migrating a first function in the first application to the second application of the second device includes sending service information of the first function to the second device, where when the first application is a live streaming application, the service information of the first function includes at least one of a video stream, an audio stream, and bullet screen information of a live streaming studio of the first device, when the first application is a photographing application, the service information of the first function includes a photographing preview image or menu bar information of a photographing interface, when the first application is a karaoke application, the service information of the first function includes at least one of a song title, lyrics, audio information of a song, video information of the song, and a control interface of the song, when the first application is a shopping application, the service information of the first function includes commodity information in a shopping cart, or when the first application is a mailbox application, the service information of the first function includes at least one of a subject, text, and an attachment of an e-mail.

Optionally, the first device may create a second group, where members in the second group include the first application of the first device and the second application of the second device.

2009: The second device receives the first function that is in the first application and that is migrated by the first device, where the first function includes the one or more UIs.

The first device and the second device in the embodiment in FIG. 20 may be respectively the mobile phone A, the mobile phone B, and the like in the foregoing embodiments. For a part that is not described in detail in the embodiment in FIG. 20, refer to the foregoing embodiments. Details are not described herein again.

Figure 21:
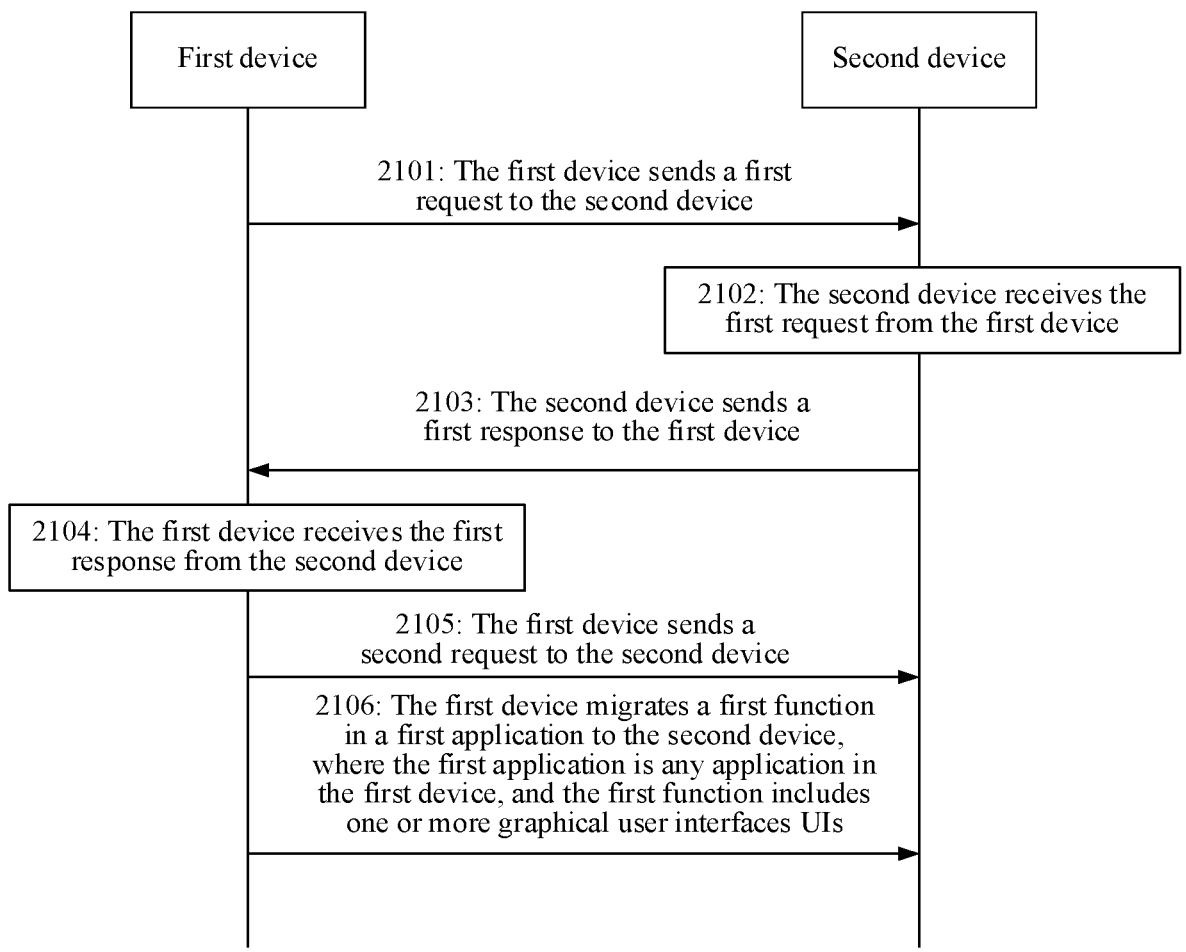
FIG. 21 is another schematic diagram of signal exchange according to an embodiment of this disclosure.

An embodiment of this disclosure provides a function migration method. As shown in FIG. 21, the method includes the following steps.

2101: A first device sends a first request to a second device.

The first request carries an identifier of the first device.

2102: The second device receives the first request from the first device.

2103: The second device sends a first response to the first device.

The first response indicates a first group created by the second device, and a member in the first group includes the second device.

2104: The first device receives the first response from the second device.

2105: The first device sends a second request to the second device, where the second request is for applying for adding the first device to the first group.

2106: The first device migrates a first function in a first application to the second device, where the first application is any application in the first device, and the first function includes one or more graphical UIs.

The first device and the second device in the embodiment in FIG. 21 may be respectively the mobile phone A, the mobile phone B, and the like in the foregoing embodiments, and the first request may be the authentication request message or the like in the foregoing embodiments. For a part that is not described in detail in the embodiment in FIG. 21, refer to the foregoing embodiments. Details are not described herein again.

Figure 22:
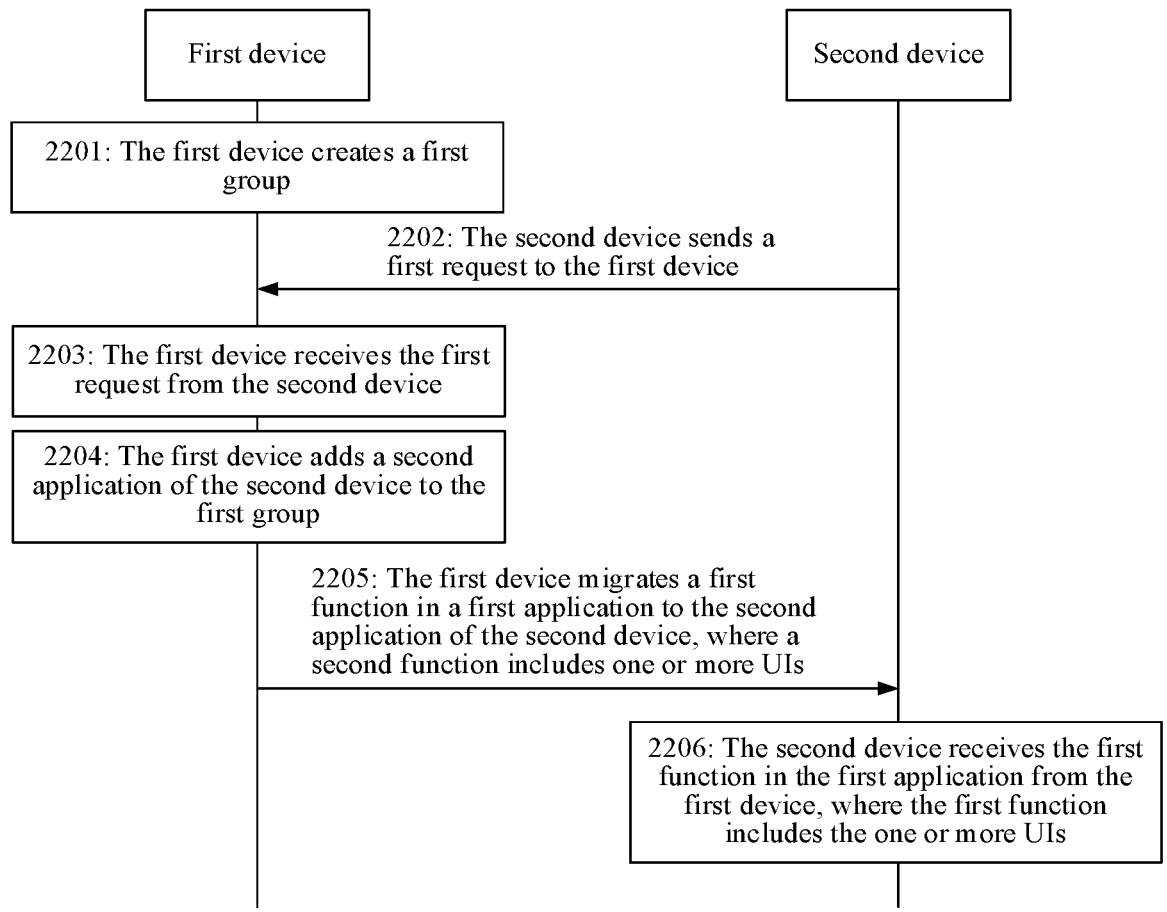
FIG. 22 is another schematic diagram of signal exchange according to an embodiment of this disclosure.

An embodiment of this disclosure provides a function migration method. As shown in FIG. 22, the method includes the following steps.

2201: A first device creates a first group, where a member in the first group includes a first application of the first device.

2202: A second device sends a first request to the first device, where the first request is for applying for adding a second application of the second device to the first group created by the first device, and members in the first group include the first application of the first device and the second application of the second device.

2203: The first device receives the first request from the second device, where the first request is for applying for adding the second application of the second device to the first group.

2204: The first device adds the second application of the second device to the first group.

2205: The first device migrates a first function in the first application to the second application of the second device, where the first function includes one or more UIs.

2206: The second device receives the first function in the first application from the first device, where the first function includes the one or more UIs.

The first device and the second device in the embodiment in FIG. 22 may be respectively the mobile phone A, the mobile phone B, and the like in the foregoing embodiments, and the first request may be the authentication request message or the like in the foregoing embodiments. For a part that is not described in detail in the embodiment in FIG. 22, refer to the foregoing embodiments. Details are not described herein again.

Some other embodiments of this disclosure provide a first device or a second device. The first device or the second device may be the electronic device 200 shown in FIG. 3. The first device or the second device may include a communication module, a memory, and one or more processors. The communication module, the memory, and the processor are coupled. The memory is configured to store computer program code. The computer program code includes computer instructions.

Figure 23:
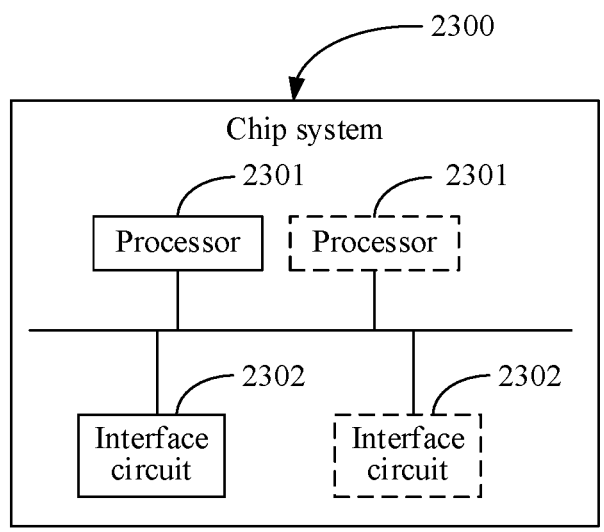
FIG. 23 is a schematic diagram of a structure of a chip system according to an embodiment of this disclosure.

Another embodiment of this disclosure provides a chip system. As shown in FIG. 23, the chip system includes at least one processor 2301 and at least one interface circuit 2302. The processor 2301 and the interface circuit 2302 may be connected to each other through a line. For example, the interface circuit 2302 may be configured to receive a signal from another apparatus (for example, a memory of an electronic device). For another example, the interface circuit 2302 may be configured to send a signal to another apparatus (for example, the processor 2301).

For example, the interface circuit 2302 may read instructions stored in the memory of the electronic device, and send the instructions to the processor 2301. When the instructions are executed by the processor 2301, a first device/second device (the electronic device 230 shown in FIG. 6) may be enabled to perform the steps in the foregoing embodiments.

For another example, the interface circuit 2302 may read instructions stored in a memory of a server, and send the instructions to the processor 2301. When the instructions are executed by the processor 2301, the server may be enabled to perform the steps in the foregoing embodiments.

Certainly, the chip system may further include another discrete device. This is not limited in this embodiment of this disclosure.

The foregoing descriptions of the implementations allow a person skilled in the art to clearly understand that, for the purpose of convenient and brief description, division into the foregoing functional modules is used as an example for description. During actual application, the foregoing functions may be allocated to different functional modules based on a requirement for implementation, that is, an inner structure of an apparatus is divided into different functional modules to implement all or some of the functions described above.

In the several embodiments provided in this disclosure, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or other forms.

The units described as separate parts may or may not be physically separate, and parts displayed as units may be one or more physical units, in other words, may be located in one place, or may be distributed to a plurality of different places. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this disclosure essentially, the part contributing to the other approaches, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this disclosure. The foregoing storage medium includes: any medium that can store program code, such as a USB flash drive, a removable hard disk, a read-only memory (ROM), a RAM, a magnetic disk, or an optical disc.

The foregoing content is merely specific implementations of this disclosure, but is not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

The invention claimed is:

1. A method implemented by a first device and comprising:
sending, to a second device, a first request carrying a first identifier of the first device, a second identifier of a first application of the first device, and a third identifier of a second application of the second device;
receiving, from the second device, a first response indicating a first group created by the second device, wherein first members of the first group comprise the second application;
sending, to the second device, a second request requesting to add the first application to the first group; and
migrating a first function in the first application to the second application,
wherein the first function comprises one or more graphical user interfaces (GUIs).

2. The method of claim 1, wherein the first response comprises a personal identification number (PIN) corresponding to the first group or communication connection information of the second device, and wherein the second request comprises the PIN or the communication connection information.

3. The method of claim 1, further comprising receiving a second response indicating that the first application has joined the first group.

4. The method of claim 1, further comprising creating a second group, wherein second members of the second group comprise the first application and the second application.

5. The method of claim 1, further comprising:
obtaining a first operation of a user on the first application;
displaying, in response to the first operation, a first pop-up box comprising a fourth identifier of the second device;
obtaining, from the user, a second operation of selecting the second device in the first pop-up box by selecting the fourth identifier; and
further sending, to the second device in response to the second operation, the first request.

6. The method of claim 5, wherein the second device comprises a trusted device and an untrusted device, wherein the trusted device logs in to a same account as the first device, has performed device-level authentication with the first device, or has performed application-level authentication with the first application, and wherein the untrusted device does not log in to the same account as the first device, has not performed the device-level authentication with the first device, or a has not performed the application-level authentication with the first application.

7. The method of claim 1, further comprising:
scanning a two-dimensional code picture displayed by the second device, wherein the two-dimensional code picture comprises a personal identification number (PIN) corresponding to the first group or communication connection information of the second device; and
further sending, to the second device according to the PIN or the communication connection information, the second request.

8. The method of claim 1, further comprising sending, to the second device, service information of the first function, wherein the service information comprises:
at least one of a video stream, an audio stream, or bullet screen information of a live broadcast room of the first device when the first application is a live broadcast application;
menu bar information of a photographing preview picture or a photographing interface when the first application is a photographing application;
at least one of a song name, a lyric, audio information of a song, video information of a song, or a control interface of a song when the first application is a karaoke application;
commodity information in a shopping cart when the first application is a shopping application; and
at least one of a subject, a body, or an attachment of an email when the first application is an email application.

9. A method implemented by a second device and comprising:
receiving, from a first device, a first request carrying a first identifier of the first device, a second identifier of a first application of the first device, and a third identifier of a second application of the second device;
creating a first group, wherein first members of the first group comprise the second application;
sending, to the first device, a first response indicating the first group;
receiving, from the first device, a second request requesting to add the first application to the first group; and
receiving a first function that is in the first application and that is migrated by the first device,
wherein the first function comprises one or more graphical user interfaces (GUIs).

10. The method of claim 9, wherein the first response comprises a personal identification number (PIN) corresponding to the first group or communication connection information of the second device.

11. The method of claim 9, further comprising sending, to the first device, a second response indicating that the first application has joined the first group.

12. The method of claim 9, wherein after receiving the first request, the method further comprises:
displaying a first pop-up box prompting a user whether to agree to add the first application to the first group; and
receiving, from the user, consent instruction.

13. The method of claim 9, wherein before creating the first group, the method further comprises determining, according to the first identifier, that the second device currently does not have a second group, and wherein second members of the second group comprise the first device and the second device.

14. The method of claim 9, wherein before creating the first group, the method further comprises determining, according to the first identifier, the second identifier, and the third identifier, that the second device currently does not have a second group, and wherein second members of the second group comprise the first application and the second application.

15. The method of claim 9, further comprising displaying a two-dimensional code picture, wherein the two-dimensional code picture comprises a personal identification number (PIN) corresponding to the first group or communication connection information of the second device.

16. The method of claim 9, further comprising receiving, from the first device, service information of the first function, wherein the service information comprises:
- at least one of a video stream, an audio stream, or bullet screen information of a live broadcast room of the first device when the first application is a live broadcast application;
- menu bar information of a photographing preview picture or a photographing interface when the first application is a photographing application;
- at least one of a song name, a lyric, audio information of a song, video information of a song, or a control interface of a song when the first application is a karaoke application;
- commodity information in a shopping cart when the first application is a shopping application; and
- at least one of a subject, a body, or an attachment of an email when the first application is an email application.

17. A first device comprising:
a memory configured to store program instructions;
one or more processors coupled to the memory and configured to execute the program instructions to cause the first device to:
- send, to a second device, a first request carrying a first identifier of the first device, a second identifier of a first application of the first device, and a third identifier of a second application of the second device;
- receive, from the second device, a first response indicating a first group created by the second device, wherein first members of the first group comprise the second application;
- send, to the second device, a second request requesting to add the first application to the first group; and
- migrate a first function in the first application to the second application,
wherein the first function comprises one or more graphical user interfaces (GUIs).

18. The first device of claim 17, wherein the first response comprises a personal identification number (PIN) corresponding to the first group or communication connection information of the second device, and wherein the one or more processors are further configured to execute the program instruction to cause the first device to further send, to the second device according to the PIN or the communication connection information, the second request.

19. The first device of claim 17, wherein the one or more processors are further configured to execute the program instruction to cause the first device to receive a second response indicating that the first application has joined the first group.

20. The first device of claim 17, wherein the one or more processors are further configured to execute the program instruction to cause the first device to create a second group, and wherein second members of the second group comprise the first application and the second application.

* * * * *